(12) United States Patent
Kishima et al.

(10) Patent No.: US 12,405,047 B2
(45) Date of Patent: Sep. 2, 2025

(54) ELECTRIC DEVICE

(71) Applicant: Koki Holdings Co., Ltd., Tokyo (JP)

(72) Inventors: Yuji Kishima, Ibaraki (JP); Takuya Kataoka, Ibaraki (JP); Kazuki Noguchi, Ibaraki (JP); Akihiro Kobayashi, Ibaraki (JP); Daisuke Nitawaki, Ibaraki (JP); Ibuki Kanda, Ibaraki (JP); Shingo Kosugi, Ibaraki (JP); Yoshiki Aoki, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 129 days.

(21) Appl. No.: 18/274,720

(22) PCT Filed: Jan. 28, 2022

(86) PCT No.: PCT/JP2022/003216
§ 371 (c)(1),
(2) Date: Jul. 28, 2023

(87) PCT Pub. No.: WO2022/172775
PCT Pub. Date: Aug. 18, 2022

(65) Prior Publication Data
US 2024/0102718 A1     Mar. 28, 2024

(30) Foreign Application Priority Data

Feb. 9, 2021  (JP) ................................ 2021-018782
Feb. 9, 2021  (JP) ................................ 2021-018783
(Continued)

(51) Int. Cl.
*F25D 11/02* (2006.01)
*F25D 11/00* (2006.01)
(Continued)

(52) U.S. Cl.
CPC ............ *F25D 11/02* (2013.01); *F25D 11/003* (2013.01); *F25D 23/069* (2013.01); *F25D 23/12* (2013.01);
(Continued)

(58) Field of Classification Search
CPC ...... F25D 11/003; F25D 11/02; F25D 11/022; F25D 29/00; F25D 29/003; F25D 29/005;
(Continued)

(56) References Cited

U.S. PATENT DOCUMENTS 5,201,888 A * 4/1993 Beach, Jr. ............. F25D 17/045
                                                    62/275
2010/0115973 A1   5/2010 Kondou et al.

FOREIGN PATENT DOCUMENTS

CN       101097790       1/2008
CN       205536777       8/2016
(Continued)

OTHER PUBLICATIONS

"Search Report of Europe Counterpart Application", issued on Jun. 6, 2024, p. 1-p. 11.
(Continued)

*Primary Examiner* — Jonathan Bradford
(74) *Attorney, Agent, or Firm* — JCIPRNET

(57) ABSTRACT

Provided is an electrical device. In a setting unit, a right-room temperature display unit displays a set temperature or the current temperature of a first housing room. A left-room temperature display unit displays a set temperature or the current temperature of a second housing room. A right-room temperature setting button is an operation unit for a user to switch the set temperature of the first housing room. A left-room temperature setting button is an operation unit for a user switch the set temperature of the second housing room. The set temperature difference between the first and
(Continued)

second housing rooms is controlled to be within a prescribed value. When the set temperature of one of the first and second housing rooms is changed so that the set temperature exceeds a prescribed value, a microcomputer automatically changes the other set temperature so that the set temperature difference is within a prescribed value.

13 Claims, 65 Drawing Sheets

(30) Foreign Application Priority Data

| Feb. 9, 2021 | (JP) | ................................. 2021-018784 |
| Feb. 9, 2021 | (JP) | ................................. 2021-018785 |
| Feb. 9, 2021 | (JP) | ................................. 2021-018786 |
| Feb. 9, 2021 | (JP) | ................................. 2021-018787 |
| Feb. 9, 2021 | (JP) | ................................. 2021-018788 |
| Apr. 22, 2021 | (JP) | ................................. 2021-072923 |
| Apr. 22, 2021 | (JP) | ................................. 2021-072924 |
| Oct. 29, 2021 | (JP) | ................................. 2021-178367 |

(51) Int. Cl.
*F25D 23/06* (2006.01)
*F25D 23/12* (2006.01)
*F25D 29/00* (2006.01)
*F25D 31/00* (2006.01)
*F25B 5/02* (2006.01)

(52) U.S. Cl.
CPC ........... *F25D 29/00* (2013.01); *F25D 31/005* (2013.01); *F25B 5/02* (2013.01); *F25D 11/022* (2013.01); *F25D 2201/10* (2013.01); *F25D 2400/12* (2013.01); *F25D 2400/38* (2013.01); *F25D 2600/04* (2013.01); *F25D 2700/122* (2013.01)

(58) Field of Classification Search
CPC .... F25D 23/069; F25D 23/12; F25D 2400/12; F25D 2700/122
See application file for complete search history.

(56) References Cited

FOREIGN PATENT DOCUMENTS

| CN | 107131715 | 9/2017 |
| CN | 107643781 | 1/2018 |
| CN | 107763937 | 3/2018 |
| CN | 109579405 | 4/2019 |
| CN | 208952498 | 6/2019 |
| CN | 110411133 | 11/2019 |
| JP | S58173367 | 10/1983 |
| JP | H11257819 | 9/1999 |
| JP | 2001194051 | 7/2001 |
| JP | 2003240409 | 8/2003 |
| JP | 3948876 | 7/2007 |
| JP | 2013076494 | 4/2013 |
| JP | 2015014434 | 1/2015 |
| JP | 2016095076 | 5/2016 |
| JP | 2017150700 | 8/2017 |
| JP | 2018091501 | 6/2018 |
| WO | 2018101144 | 6/2018 |

OTHER PUBLICATIONS

"International Search Report (Form PCT/ISA/210) of PCT/JP2022/003216", mailed on Mar. 15, 2022, with English translation thereof, pp. 1-4.

"The First Office Action of China Counterpart Application", issued on Jul. 9, 2025, with English translation thereof, pp. 1-13.

* cited by examiner

IN CASE WHERE THERE IS
VALVE ON GAS SIDE
(A)
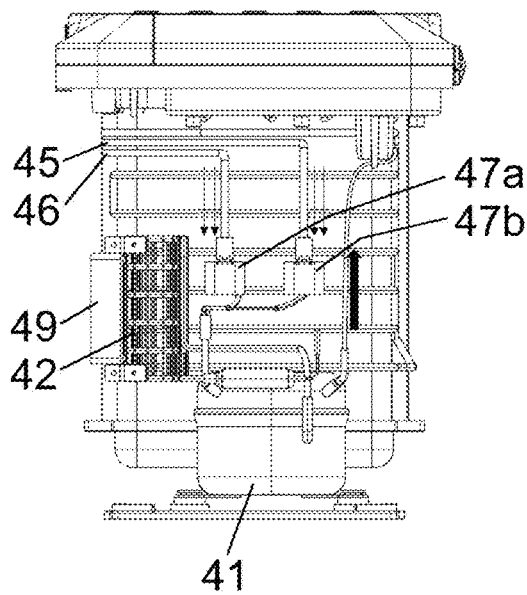
(B)
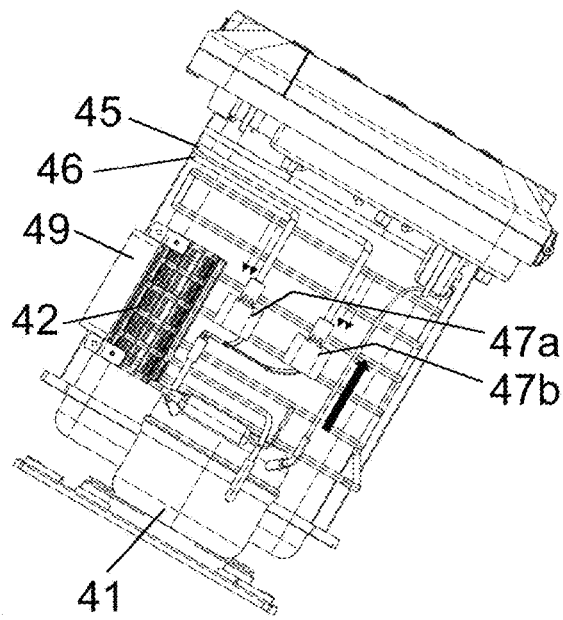
FIG. 16
IN CASE WHERE THERE IS VALVE ON GAS SIDE
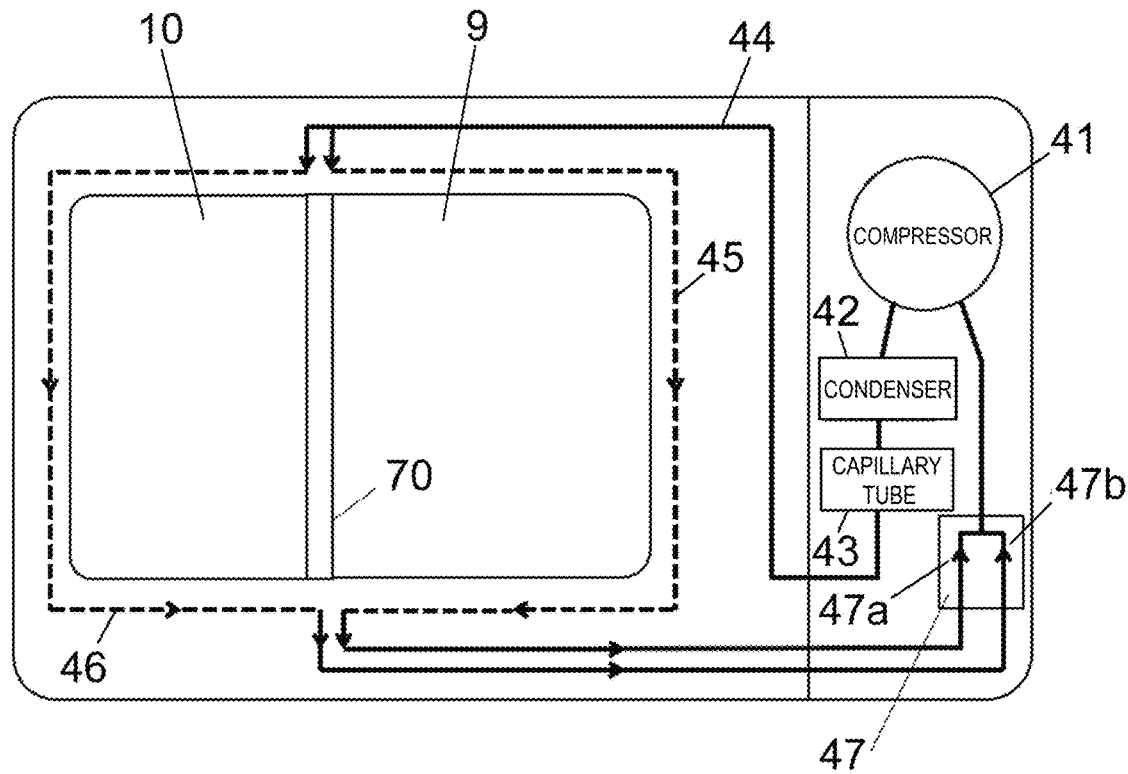
FIG. 17

IN CASE WHERE THERE IS VALVE ON LIQUID SIDE
(A)          (B)
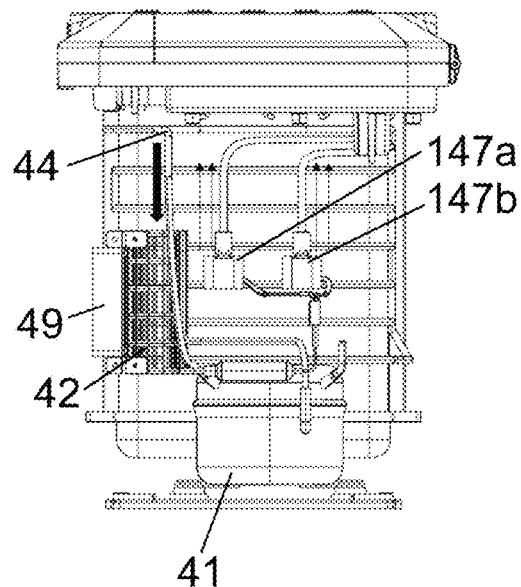
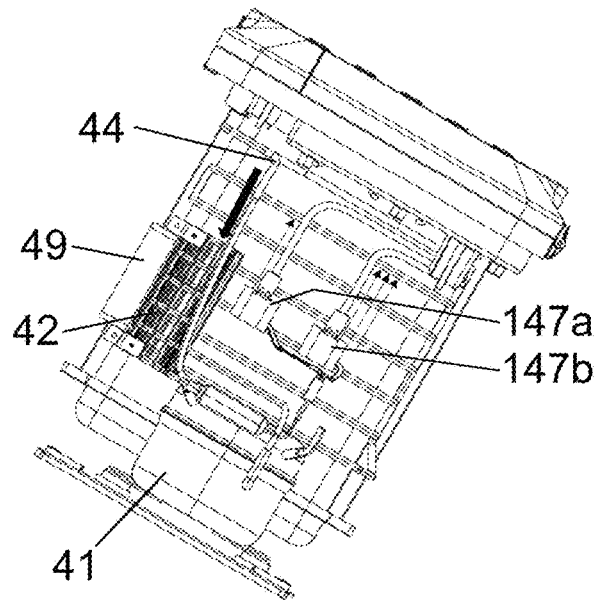
FIG. 18
IN CASE WHERE THERE IS VALVE ON LIQUID SIDE
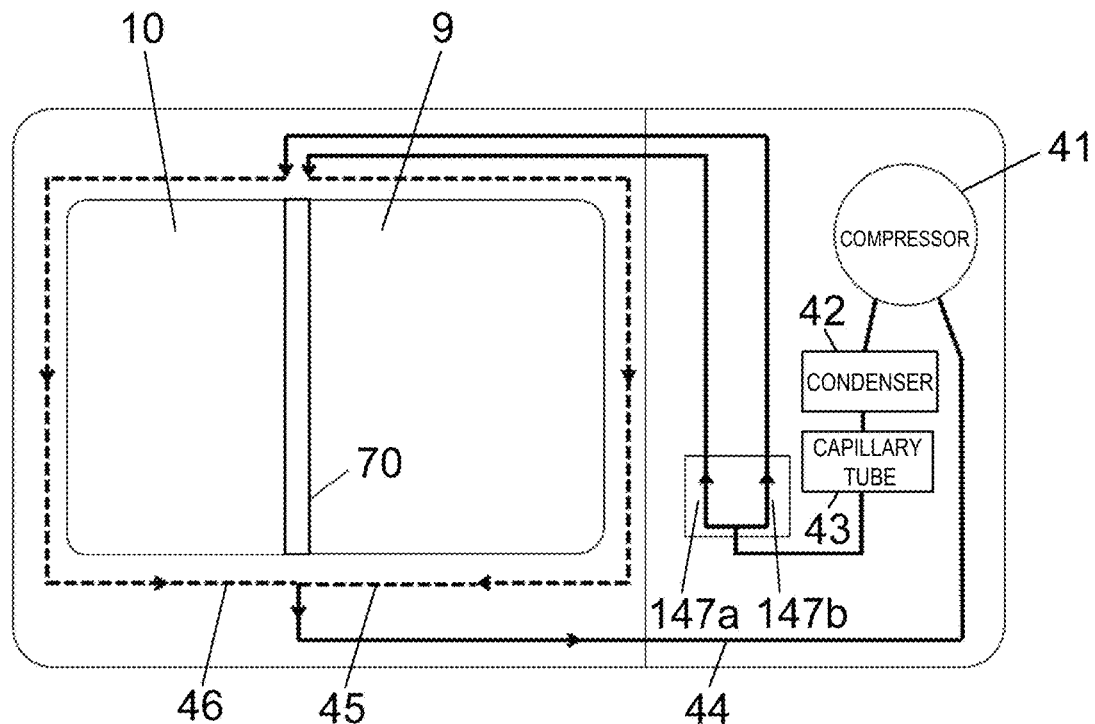
FIG. 19

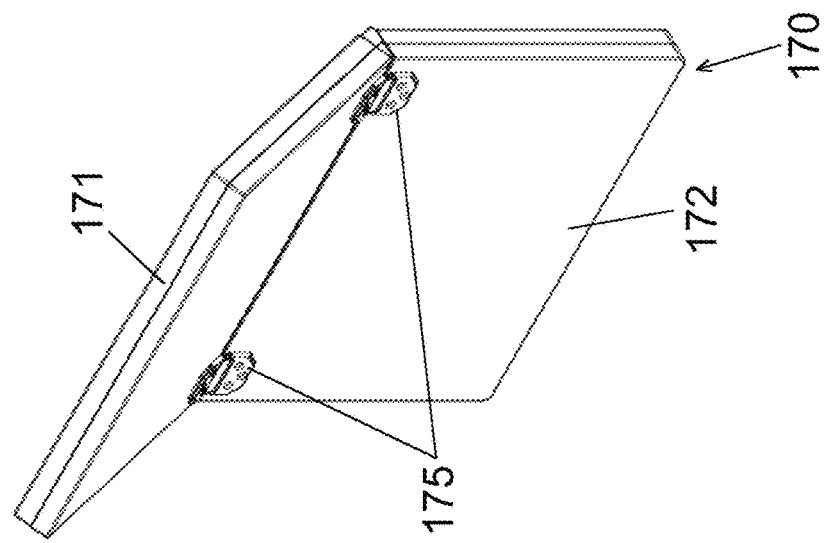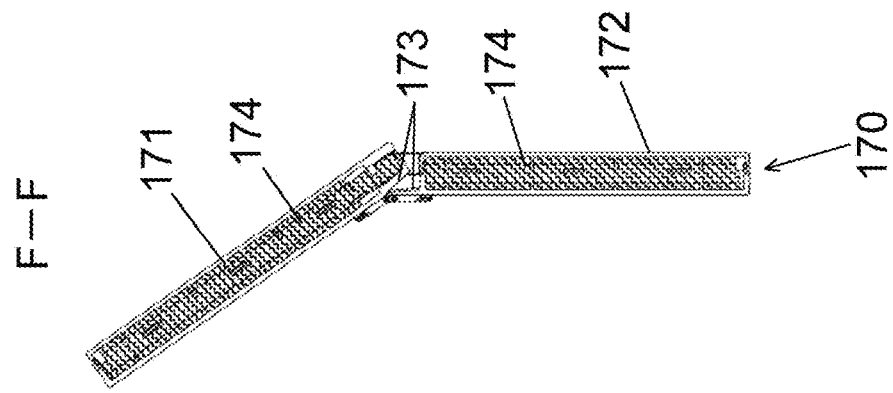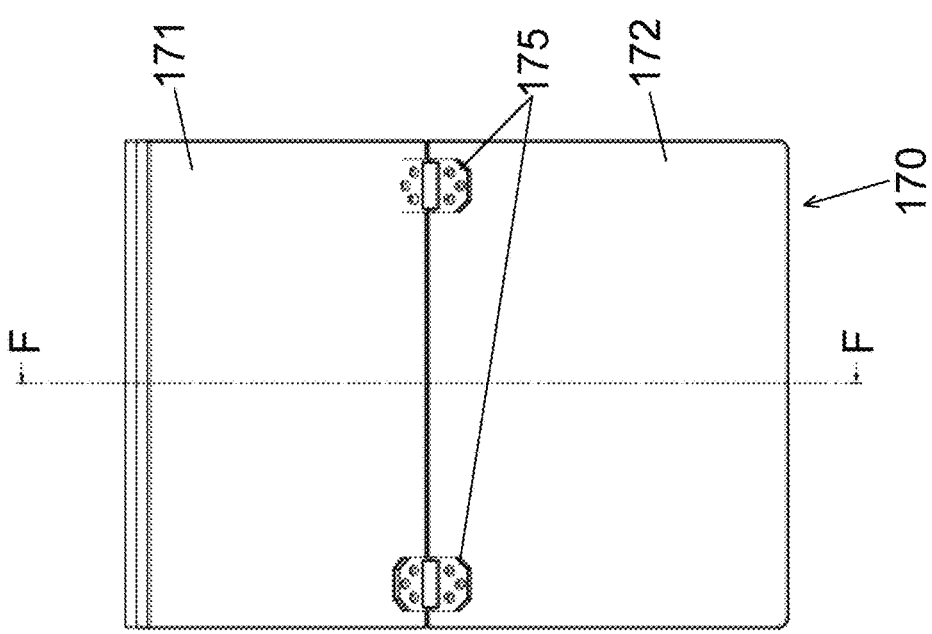
FIG. 30

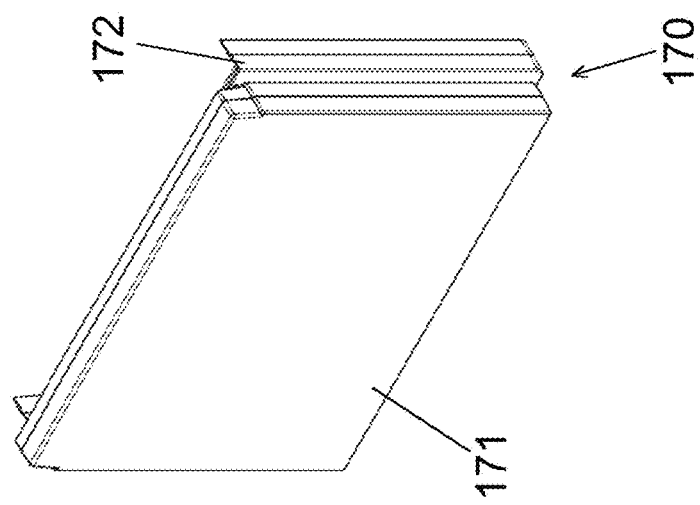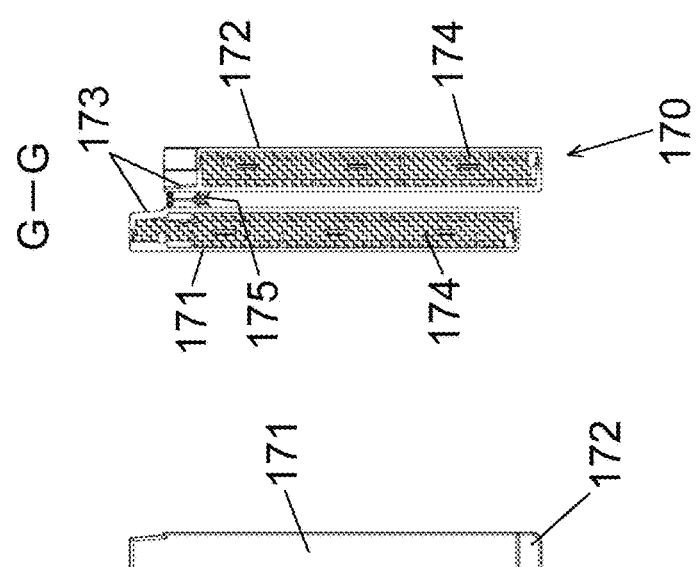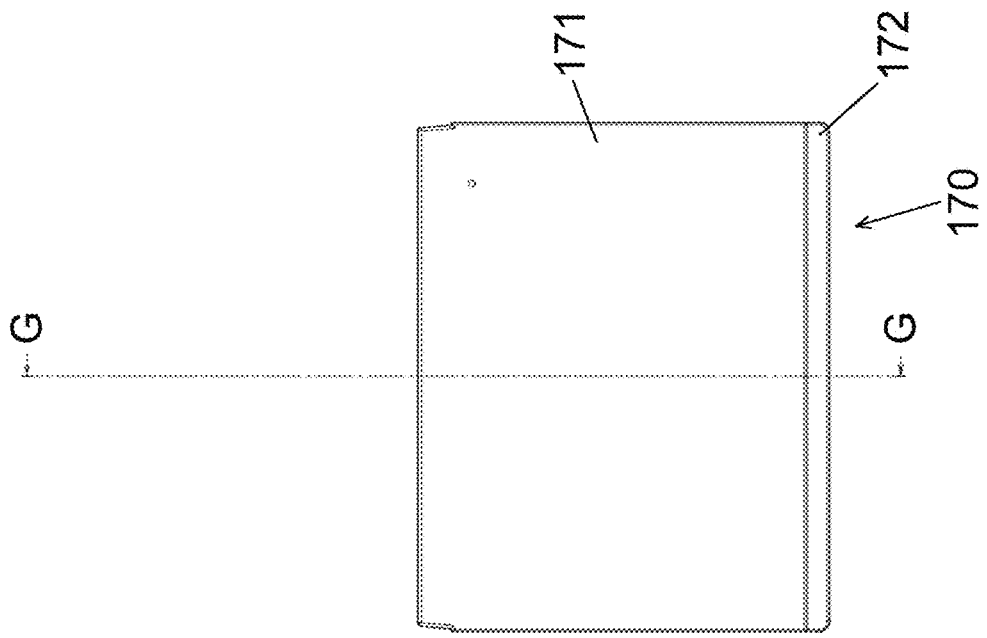
FIG. 31

(A)

| OPERATION | DISPLAY (1) (FOR RIGHT ROOM) | DISPLAY (2) (FOR LEFT ROOM) | ROOM SWITCHING |
|---|---|---|---|
| BEFORE POWER SW ON | - | - | TWO-ROOM |
| AFTER POWER SW ON | 10°C BLINKING | 10°C BLINKING | ↓ |
| AFTER 3 SECONDS | CURRENT TEMPERATURE LIGHTING | CURRENT TEMPERATURE LIGHTING | ↓ |
| TEMPERATURE SETTING BUTTON | 10°C BLINKING | 10°C BLINKING | ↓ |
| ROOM 1 TEMPERATURE SETTING BUTTON DOWN | -5°C BLINKING | 10°C BLINKING | ↓ |
| ROOM 2 TEMPERATURE SETTING BUTTON UP | 0°C BLINKING | 60°C BLINKING | ↓ |
| AFTER 3 SECONDS | CURRENT TEMPERATURE LIGHTING | CURRENT TEMPERATURE LIGHTING | ↓ |
| MODE (ROOM) SWITCHING BUTTON | 10°C BLINKING | - | LARGE ROOM (RIGHT ROOM) SINGLE |
| AFTER 3 SECONDS | CURRENT TEMPERATURE LIGHTING | - | LARGE ROOM (RIGHT ROOM) SINGLE |
| MODE (ROOM) SWITCHING BUTTON | - | 10°C BLINKING | SMSMALL ROOM (LEFT ROOM) SINGLE |
| AFTER 3 SECONDS | CURRENT TEMPERATURE LIGHTING | CURRENT TEMPERATURE LIGHTING | SMSMALL ROOM (LEFT ROOM) SINGLE |
| MODE (ROOM) SWITCHING BUTTON | - | 10°C BLINKING | ONE-ROOM |
| AFTER 3 SECONDS | - | CURRENT TEMPERATURE LIGHTING | ONE-ROOM |

(B)

| TEMPERATURE SETTING | DISPLAY |
|---|---|
| ↑ | OFF |
| ↑ | 60°C |
| ↑ | 55°C |
| ↑ | 50°C |
| ↑ | 45°C |
| ↑ | 40°C |
| ↑ | 35°C |
| ↑ | 30°C |
| ↑ | 25°C |
| ↑ | 20°C |
| ↑ | 15°C |
| DEFAULT | 10°C |
| ↓ | 5°C |
| ↓ | 0°C |
| ↓ | -10°C |
| ↓ | -15°C |
| ↓ | -18°C |

* NONE IS OFF (C) DISPLAY OF BATTERY

| CHARGING | REPEAT DISPLAY OF REMAINING CAPACITY IN INCREMENTS OF 1, 2, 3, AND 4 |
|---|---|
| CHARGING COMPLETED | FOUR LIGHTING |
| OPERATED WITH BATTERY | BLINK LEVEL IN USE |
| | LIGHT BATTERY NOT IN USE |
| LOW CAPACITY OF BATTERY | DISPLAY ONLY FRAME |

(D) DC POWER SUPPLY DISPLAY

| POWER SUPPLY PRESENT | LIGHT |
|---|---|
| POWER SUPPLY ABSENT | LIGHT OFF |

(E) USB DISPLAY

| USB ON | LIGHT |
|---|---|
| USB OFF | LIGHT OFF |

(F) ERROR DISPLAY

| ERROR OCCURRENCE | BLINK, AND SIMULTANEOUSLY DISPLAY ERROR CODE IN NUMBERS (FOR EXAMPLE, ABNORMAL TEMPERATURE OF COMPRESSOR, ABNORMAL OVERCURRENT, ABNORMAL INPUT POWER SUPPLY (LOW VOLTAGE)) |
|---|---|

FIG. 33

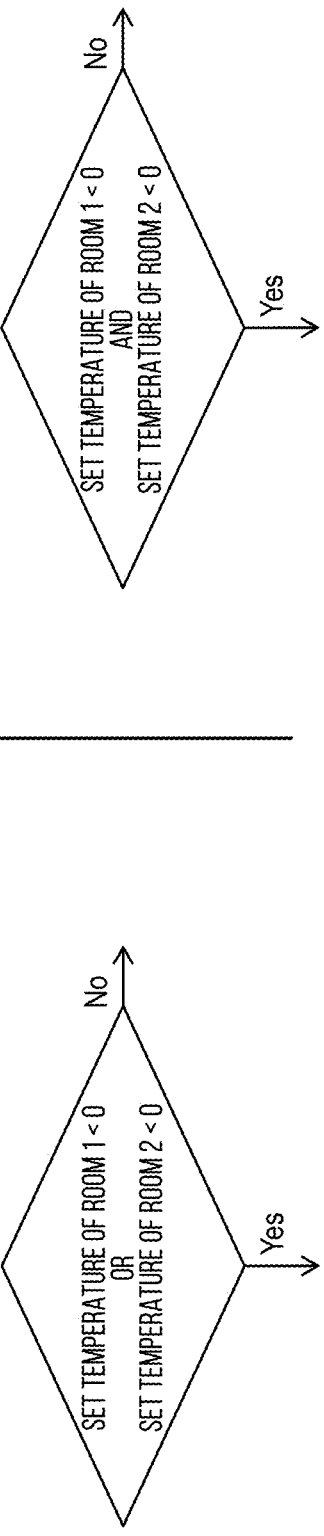

PATTERN OF DETERMINATION 2

PATTERN ① WHEN SETTING OF ONE ROOM IS EQUAL TO OR LOWER THAN DESIGNATED TEMPERATURE
E.G.) IN CASE WHERE DESIGNATED TEMPERATURE IS 0°C

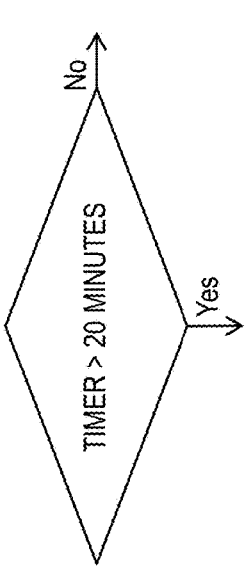

TEMPERATURE IN STORAGE OF ROOM 1 < 0
OR
TEMPERATURE IN STORAGE OF ROOM 2 < 0

No → 
Yes →

PATTERN ② BOTH SIDES HAVE REACHED DESIGNATED TEMPERATURE
E.G.) IN CASE WHERE DESIGNATED TEMPERATURE IS 0°C

TEMPERATURE IN STORAGE OF ROOM 1 < 0
AND
TEMPERATURE IN STORAGE OF ROOM 2 < 0

No →
Yes →

PATTERN ③ COOL BOTH ROOMS FOR DESIGNATED TIME
E.G.) IN CASE WHERE DESIGNATED TEMPERATURE IS 20°C

TIMER > 20 MINUTES

No →
Yes →

PATTERN ④ OUTSIDE AIR TEMPERATURE IS EQUAL TO OR HIGHER THAN DESIGNATED TEMPERATURE
E.G.) IN CASE WHERE DESIGNATED TEMPERATURE IS 35°C

OUTSIDE AIR TEMPERATURE > 35°C

No →
Yes →

PATTERN ⑤ DRIVE CURRENT IS EQUAL TO OR MORE THAN DESIGNATED CURRENT VALUE
E.G.) IN CASE WHERE DESIGNATED CURRENT VALUE IS 8A

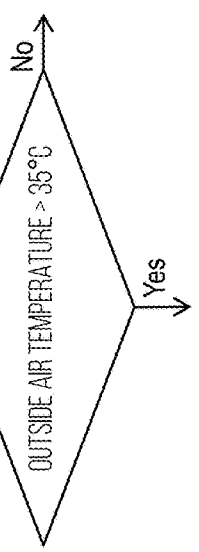

LOAD > 8 A

No →
Yes →

PATTERN ⑥ INPUT VOLTAGE IS EQUAL TO OR LOWER THAN DESIGNATED VOLTAGE
E.G.) IN CASE WHERE DESIGNATED VOLTAGE IS 12V

INPUT VOLTAGE < 12 V

No →
Yes →

PATTERN ⑦ TEMPERATURE DIFFERENCE BETWEEN LARGE ROOM AND SMALL ROOM IS EQUAL TO OR MORE THAN DESIGNATED TEMPERATURE DIFFERENCE
E.G.) IN CASE WHERE DESIGNATED TEMPERATURE DIFFERENCE IS 2°C

| TEMPERATURE IN STORAGE OF ROOM 1 - TEMPERATURE IN STORAGE OF ROOM 2 | > 2

No →
Yes →

FIG. 51

ELECTRIC DEVICE

CROSS-REFERENCE TO RELATED APPLICATION

This application is a 371 application of the international PCT application serial no. PCT/JP2022/003216, filed on Jan. 28, 2022, which claims priority benefits of Japan Patent Application No. 2021-018782, filed on Feb. 9, 2021, Japan Patent Application No. 2021-018783, filed on Feb. 9, 2021, Japan Patent Application No. 2021-018784, filed on Feb. 9, 2021, Japan Patent Application No. 2021-018785, filed on Feb. 9, 2021, Japan Patent Application No. 2021-018786, filed on Feb. 9, 2021, Japan Patent Application No. 2021-018787, filed on Feb. 9, 2021, Japan Patent Application No. 2021-018788, filed on Feb. 9, 2021, Japan Patent Application No. 2021-072923, filed on Apr. 22, 2021, Japan Patent Application No. 2021-072924, filed on Apr. 22, 2021, and Japan Patent Application No. 2021-178367, filed on Oct. 29, 2021. The entirety of each of the above-mentioned patent applications is hereby incorporated by reference herein and made a part of this specification.

TECHNICAL FIELD

The present invention relates to an electric device having a cooling or heating function.

BACKGROUND ART

Patent Literature 1 discloses a storage having a cooling/heating function, which includes two accommodation sections partitioned by a partition wall and capable of individually regulating a temperature of each accommodation section. Patent Literature 2 discloses a cold/hot switching type storage that can cool a plurality of accommodation sections with one compressor. Patent Literature 3 discloses a refrigerator with a detachable partition plate.

Patent Literature 4 discloses an electric device capable of cooling the inside of a refrigerator by using a Peltier element, such as a cold-hot storage. Patent Literatures 5 and 6 disclose an electric device capable of cooling the inside of a storage by using a compressor. Patent Literatures 4 and 5 disclose that a battery pack detachable from a main body is used as a drive source and that the battery pack is charged. Patent Literature discloses a fan for cooling a condenser. Patent Literature 6 discloses a condenser (radiator) and an air blower for cooling a control device. Patent Literature 7 discloses an electric device that includes a thermoelectric element that is operated with the power of a battery pack, has a heat or cold insulation space, and can be used outdoors by using the power of the battery pack. A heat or cold insulation storage in Patent Literature 7 includes a DC input part.

CITATION LIST

Patent Literature

[Patent Literature 1]: Japanese Patent Laid-Open No. 2001-194051
[Patent Literature 2]: Japanese Patent Laid-Open No. S58-173367
[Patent Literature 3]: Japanese Patent Laid-Open No. 2013-76494
[Patent Literature 4]: International Publication No. 2018-101144
[Patent Literature 5]: Japanese Patent Laid-Open No. 2017-150700
[Patent Literature 6]: Japanese Patent Laid-Open No. 2015-014434
[Patent Literature 7]: Japanese Patent Laid-Open No. 2018-91501

SUMMARY OF INVENTION

Technical Problem

Patent Literature 1 has a configuration in which the heating/cooling means is disposed on a bottom surface of the accommodation section to cool or heat the bottom surface. Thus, a temperature of the bottom surface side of each accommodation section is easily regulated, but a temperature of the upper side is difficult to regulate. A first objective is to provide an electric device that can individually regulate a temperature in a wide area of each accommodation section and that improves convenience. The present inventor has found a problem that in a case where a plurality of accommodation sections can be cooled by one compressor as in Patent Literature 2, a flow rate of the refrigerant changes when the main body is tilted, and thus a temperature of the accommodation section deviates from a set temperature. In addition, the present inventor has found a problem that in a case where a plurality of accommodation sections can be cooled by one compressor as in Patent Literature 2, a temperature of the accommodation section deviates from a set temperature when two rooms are cooled at the same time due to individual differences between electric devices (dimensional errors in diameters of refrigerant pipes, a difference in a length due to a difference in how the refrigerant pipe is laid, or the like). The present inventor has found the problem that if the set temperatures of a plurality of accommodation sections are set to have temperature differences, temperatures of the respective accommodation sections deviate from the set temperatures. A second objective is to provide an electric device that can accurately control a temperature of an accommodation section even if the electric device has a plurality of accommodation sections.

The present inventor has found a problem that it is difficult to make a temperature of at least one of the accommodation sections reach a set temperature when a difference between set temperatures of the plurality of accommodation sections exceeds a predetermined value. A third objective is to provide an electric device that can reduce the risk that a temperature of an accommodation section cannot reach a set temperature.

The present inventor has found a problem that, in an electric device in which a plurality of accommodation sections is cooled by using a common compressor, if the drive strength of the compressor when cooling only one accommodation section is the same as the driving strength of the compressor when cooling a plurality of accommodation section, a refrigerant may return to the compressor in a liquid state. A fourth objective is to provide an electric device that increases a life of the compressor, that is, reduces a load on the compressor.

The detachable partition plate of the refrigerator in Patent Literature 3 is a single plate, and it is difficult to carry and store the partition plate. A fifth objective is to provide an electric device with improved convenience in carrying and storing a partition plate.

Patent Literatures 4 and 5 disclose that the battery pack can be charged by a built-in charging circuit, but no consideration is given to cooling the charging circuit. Patent Literature 6 does not disclose how to cool the condenser and the control device. A sixth objective is to provide an electric device capable of efficiently cooling a circuit (circuit board).

The heat or cold insulation storage in Patent Literature 7 has no accommodation function other than the heat insulation or cold insulation space, and is inconvenient in a case where a user wants to carry small items such as a replacement battery pack or a bottle opener. If there is no accommodation function other than the heat or cold insulation space, in a case of employing a configuration having a detachable partition plate, it is inconvenient to carry and place the detached partition plate. A seventh objective is to provide an electric device capable of adding an accommodation function other than a heat or cold insulation space.

In a case where an electric device is used in a vehicle, there is a demand to use an in-vehicle power supply. In the heat or cold insulation storage in Patent Literature 7, it is conceivable to input power from an in-vehicle power supply to the DC input part. However, depending on a state of the in-vehicle power supply, use of the in-vehicle power supply may not be suitable. An eighth objective is to provide an electric device that can appropriately use an in-vehicle power supply and a battery pack.

An objective of the present invention is to provide an electric device that achieves at least the third objective among of the above objectives.

Solution to Problem

One aspect of the present invention is an electric device. The electric device includes a main body having a first accommodation chamber and a second accommodation chamber adjacent to each other and each having a bottom surface and a side surface; a lid capable of being opened and closed with respect to the main body; and a cooling mechanism having a first cooling part that cools the first accommodation chamber and a second cooling part that cools the second accommodation chamber, in which the first cooling part is provided on at least the side surface of the first accommodation chamber, and the second cooling part is provided on at least the side surface of the second accommodation chamber.

Advantageous Effects of Invention

According to the present invention, it is possible to provide an electric device that solves at least the third objective among the above objectives.

(A) of FIG. 16 is a right side view of the inside of the electric device 1 in a case where the electric device 1 is in a horizontal state. (B) of FIG. 16 is a right side view of the inside of the electric device 1 in a case where the electric device 1 is in an inclined state.

FIG. 17 is a simplified block diagram of a mechanical configuration of the electric device 1.

(A) of FIG. 18 is a right side view of the inside of an electric device according to a modification example in a case where the electric device is in a horizontal state. (B) of FIG. 18 is a right side view of the inside of the electric device of the modification example in a case where the electric device is in an inclined state.

FIG. 19 is a simplified block diagram of a mechanical configuration of the electric device according to the modification example.

Figure 20:
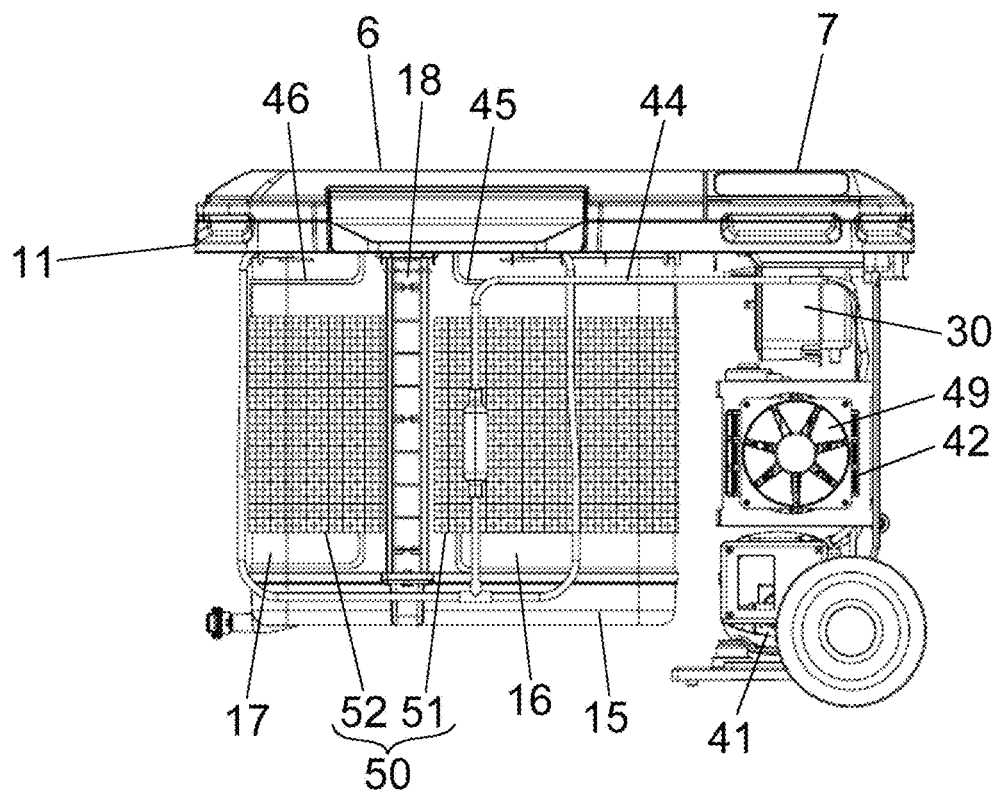

FIG. 20 is a front view of the inside of the electric device 1.

Figure 21:
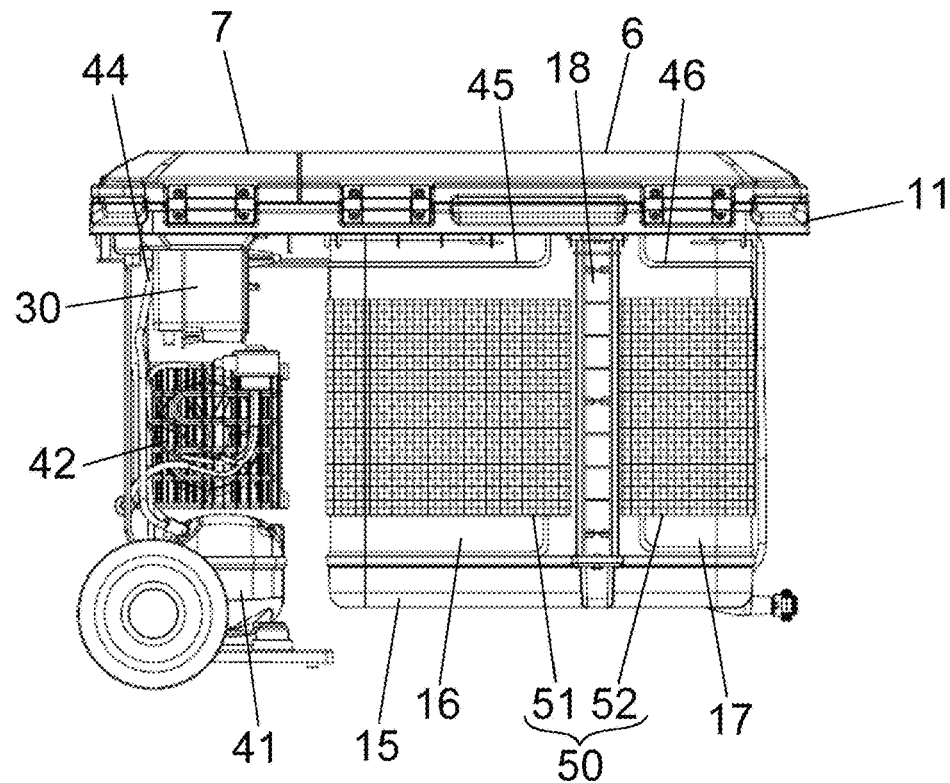

FIG. 21 is a rear view of the inside of the electric device 1.

Figure 22:
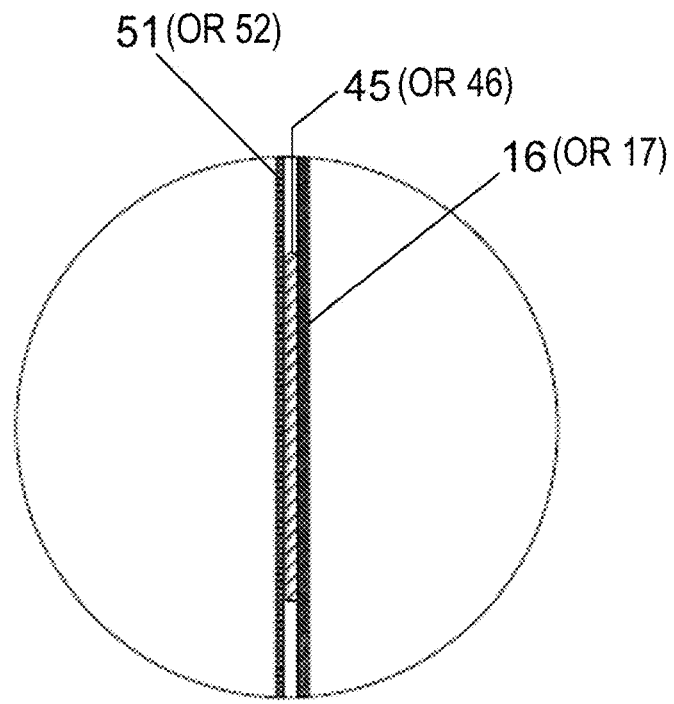

FIG. 22 is an enlarged sectional view illustrating an overlapping part of the right-side member 16 (or the left-side member 17), a first refrigerant pipe 45 (or a second refrigerant pipe 46), the first heating mechanism 51 (or a second heating part 52) in the electric device 1.

Figure 23:
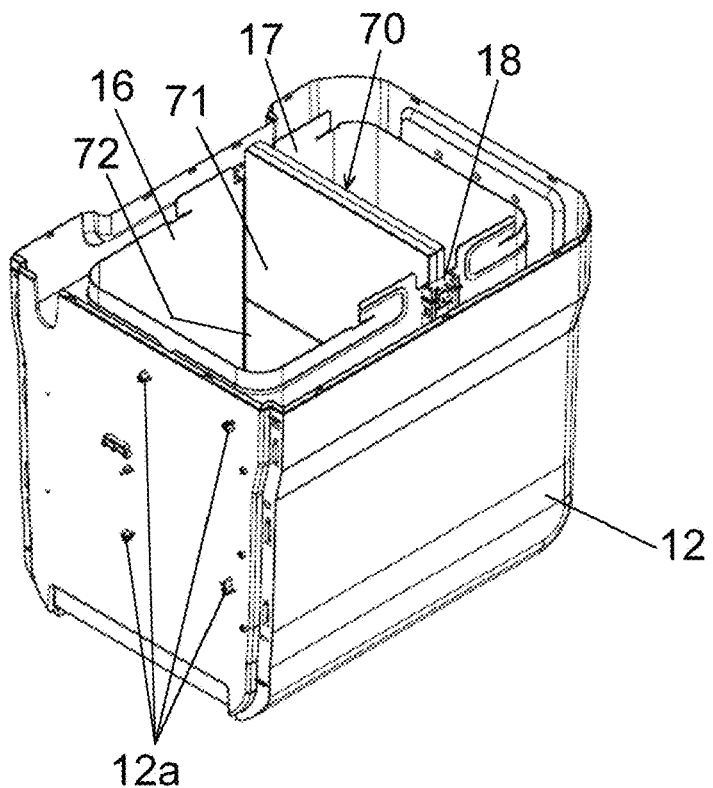

FIG. 23 is a perspective view of the left outer box 12 of the electric device 1 and the inside thereof viewed from the upper right rear.

Figure 24:
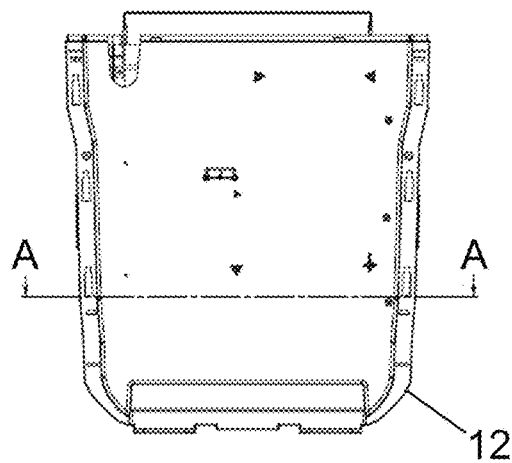

FIG. 24 is a right side view of the same.

Figure 25:
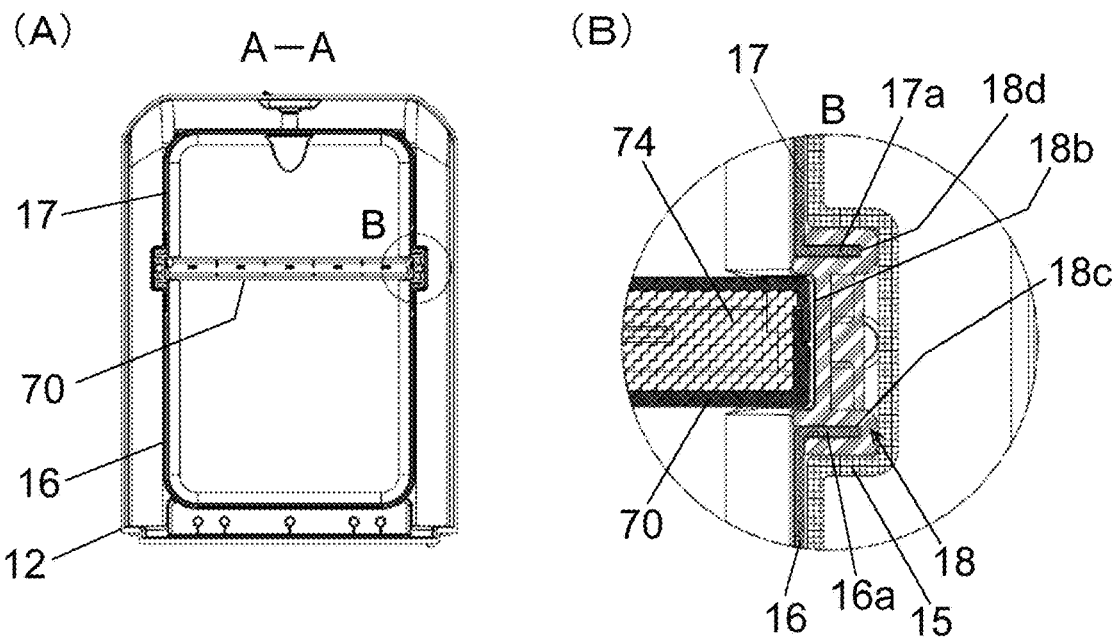

(A) of FIG. 25 is a sectional view taken along the line A-A in FIG. 24. (B) of FIG. 25 is an enlarged view of a B part in (A) of FIG. 25.

Figure 26:
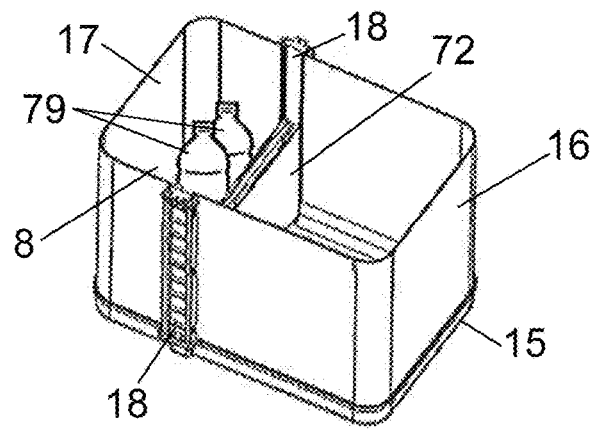

FIG. 26 is a schematic perspective view illustrating a state in which the lower partition plate 72 is attached without attaching an upper partition plate 71 to the bottom member 15, the right-side member 16, the left-side member 17, and the rail member 18 of the electric device 1, and an accommodation object 79 is accommodated.

Figure 27:
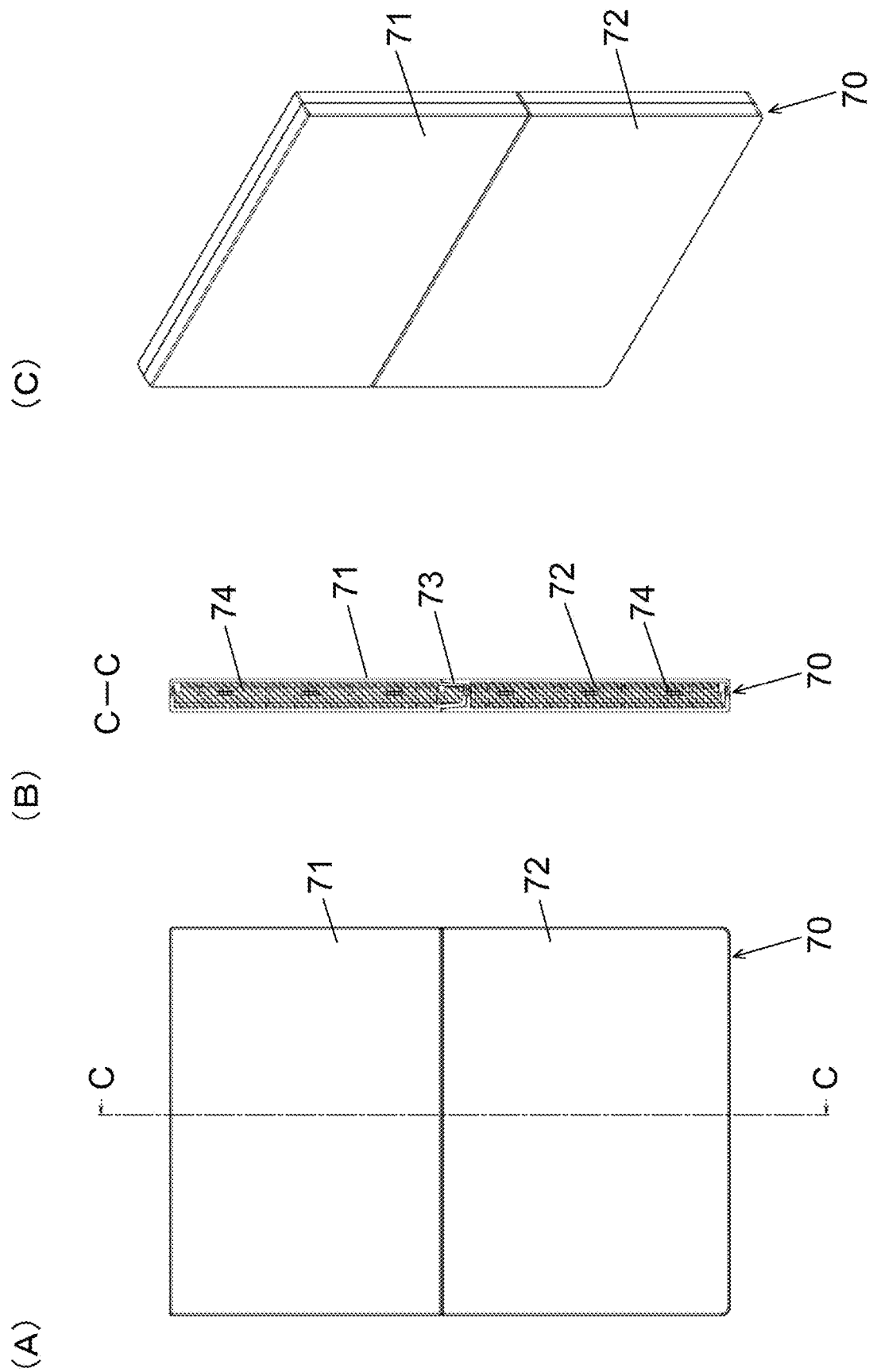

(A) of FIG. 27 is a view of the partition plate 70 of the electric device 1 viewed from a surface normal direction. (B) of FIG. 27 is a sectional view taken along line C-C in (A) of FIG. 27. (C) of FIG. 27 is a perspective view of the partition plate 70.

Figure 28:
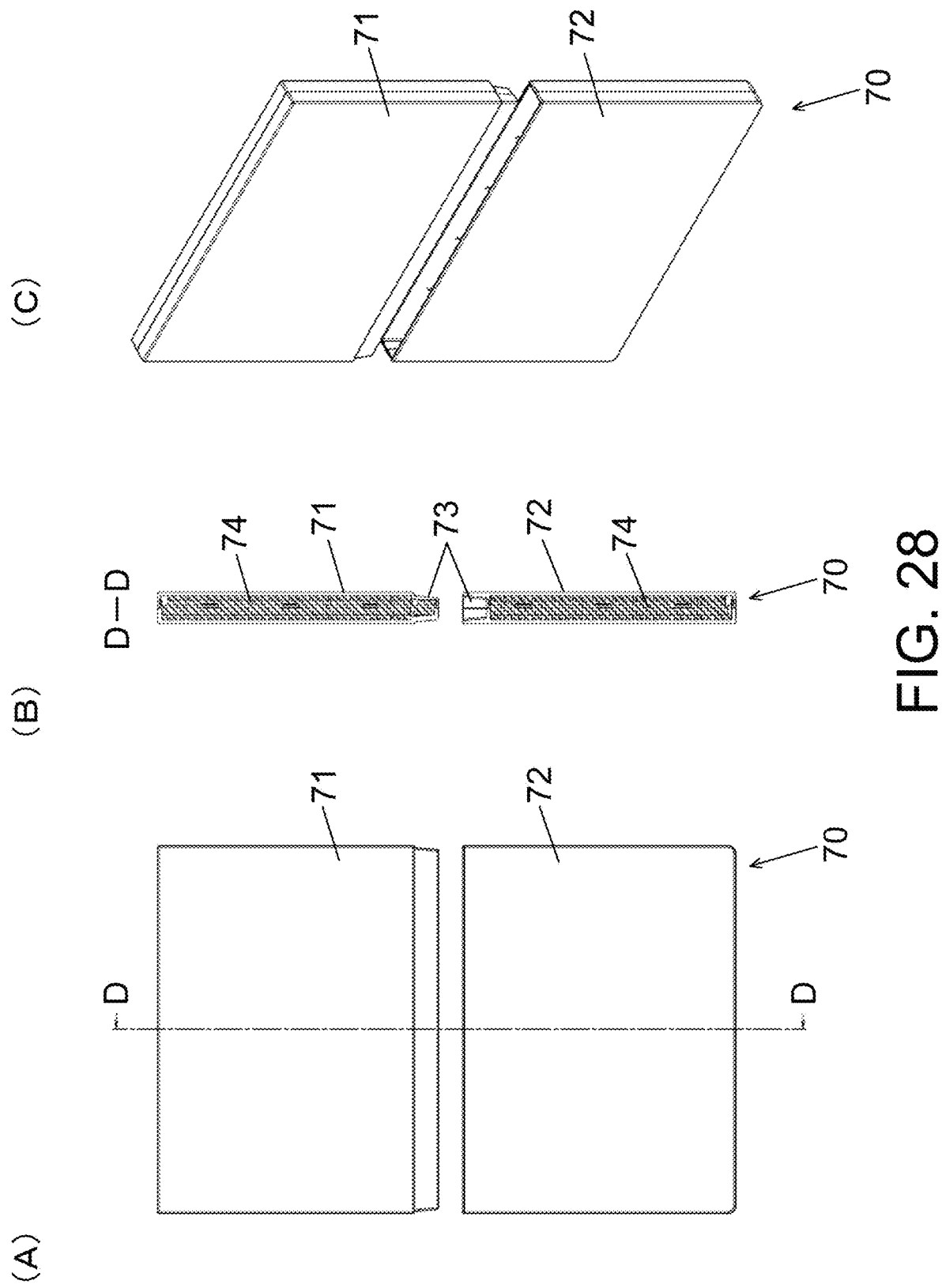

(A) of FIG. 28 is a view of the partition plate 70 viewed from the surface normal direction in a state in which the upper partition plate 71 and the lower partition plate 72 are separated. (B) of FIG. 28 is a sectional view taken along line D-D in (A) of FIG. 28. (C) of FIG. 28 is a perspective view of the partition plate 70 in a state in which the upper partition plate 71 and the lower partition plate 72 are separated.

Figure 29:
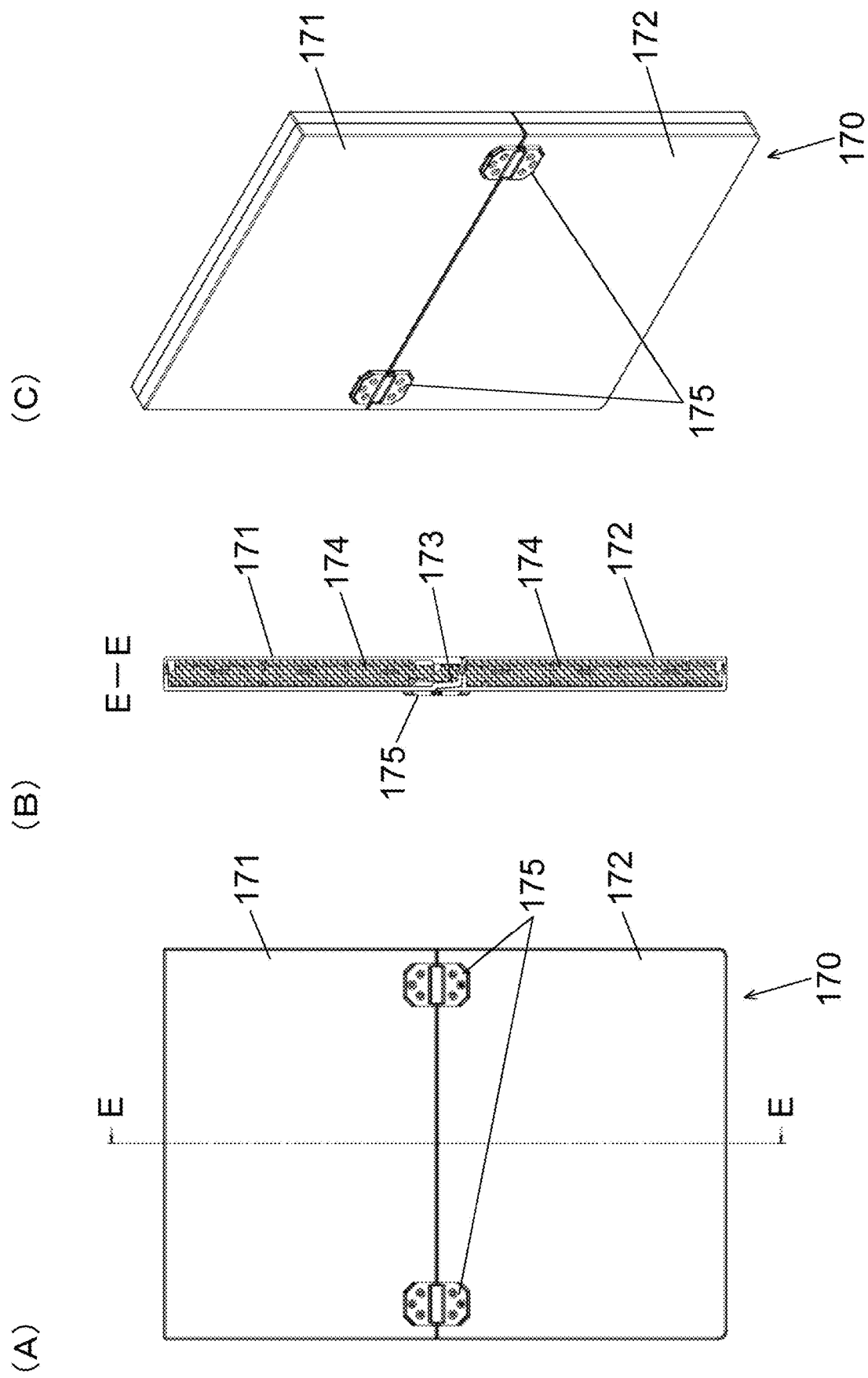

(A) of FIG. 29 is a diagram of a partition plate 170 having another configuration viewed from the surface normal direction. (B) of FIG. 29 is a sectional view taken along line E-E in (A) of FIG. 29. (C) of FIG. 29 is a perspective view of the partition plate 170.

(A) of FIG. 30 is a diagram of the partition plate 170 viewed from the surface normal direction while being folded. (B) of FIG. 30 is a sectional view taken along line F-F in (A) of FIG. 30. (C) of FIG. 30 is a perspective view of the partition plate 170 while being folded.

(A) of FIG. 31 is a diagram of the partition plate 170 viewed from the surface normal direction in a state of being folded. (B) of FIG. 31 is a sectional view taken along line G-G in (A) of FIG. 31. (C) of FIG. 31 is a perspective view illustrating a state in which the partition plate 170 is folded.

Figure 32:
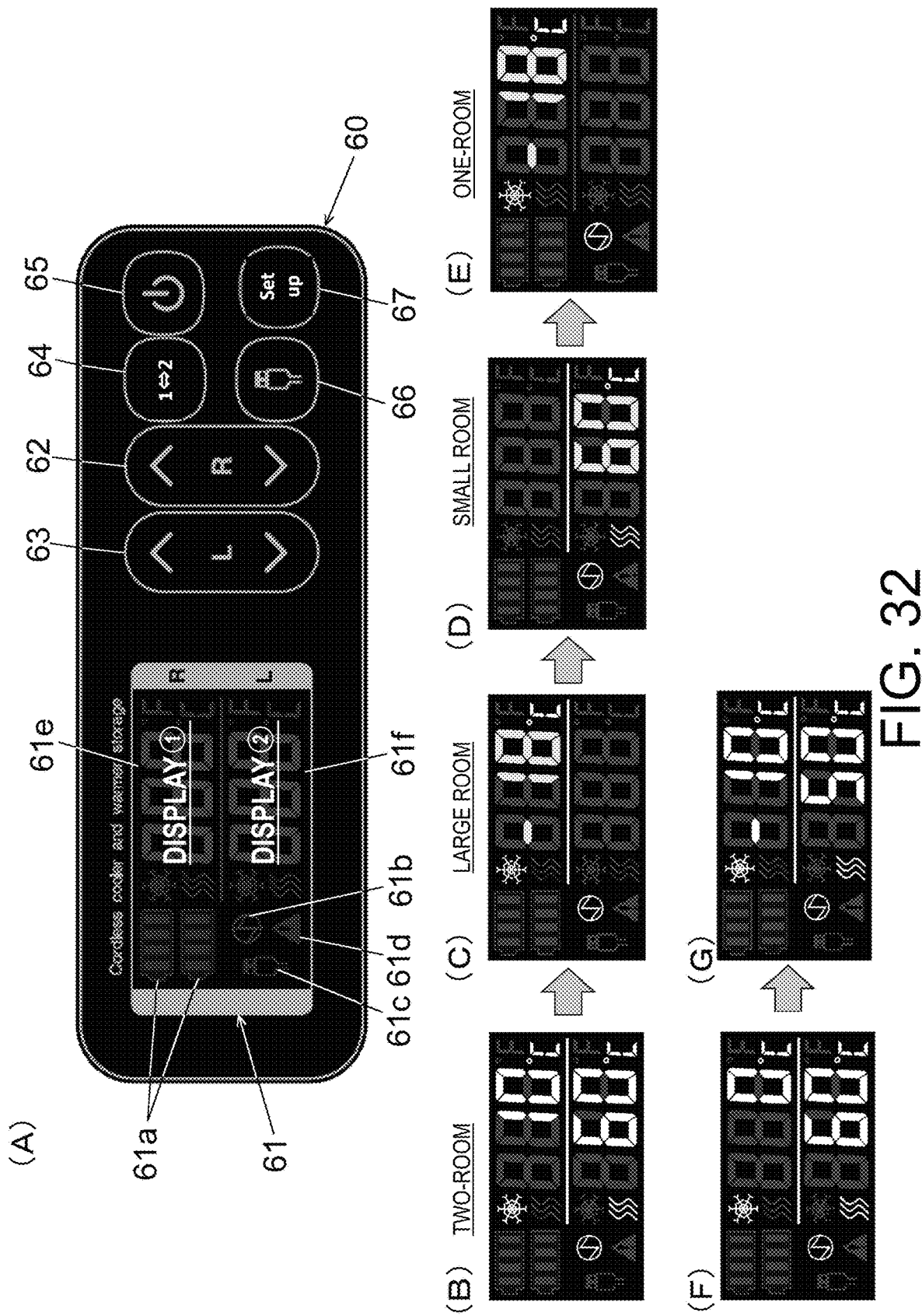

(A) of FIG. 32 is an external view of a setting part 60 of the electric device 1. (B) of FIG. 32 is a diagram illustrating a display example of a display part 61 of the setting part 60 in a two-room mode in which temperatures of a first accommodation chamber 9 and a second accommodation chamber 10 are individually controlled. (C) of FIG. 32 is a diagram illustrating a display example of the display part 61 in a large room single mode in which a temperature of only the first accommodation chamber 9 side is controlled. (D) of FIG. 32 is a diagram illustrating a display example of the display part 61 in a small room single mode in which a temperature of only the second accommodation chamber 10 side is controlled. (E) of FIG. 32 is a diagram illustrating a display example of the display part 61 in a one-room mode in which temperatures of the first accommodation chamber 9 and the second accommodation chamber 10 are collectively controlled. (F) of FIG. 32 is a diagram illustrating a display example of the display part 61 in a state in which a set temperature of the first accommodation chamber 9 is 0° C. and a set temperature of the second accommodation chamber 10 is 60° C. in the two-room mode. (G) of FIG. 32 is a diagram illustrating a display example of the display part 61 after the set temperature of the second accommodation chamber 10 is automatically changed to 50° C. in a case where the set temperature of the first accommodation chamber 9 is changed to −10° C. from the state in (F) of FIG. 32.

(A) of FIG. 33 is a table illustrating examples of an operation on the setting part 60, display corresponding to the operation, and a flow of mode switching. (B) of FIG. 33 is a table illustrating examples of an operation on a right room temperature setting button 62 or a left room temperature setting button 63 of the setting part 60 and display corresponding to the operation. (C) of FIG. 33 is a table illustrating a display example of a remaining battery level display part 61a of the display part 61 according to a state of a battery pack 29. (D) of FIG. 33 is a table illustrating a display example of an external power supply connection display part 61b of the display part 61 according to the presence or absence of input of an external DC power supply. (E) of FIG. 33 is a table illustrating a display example of a USB device energization display part 61c of the display part 61 according to the presence or absence of the supply of power to the USB device. (F) of FIG. 33 is a table illustrating a display example of an error display part 61d of the display part 61 when an error occurs.

Figure 34:
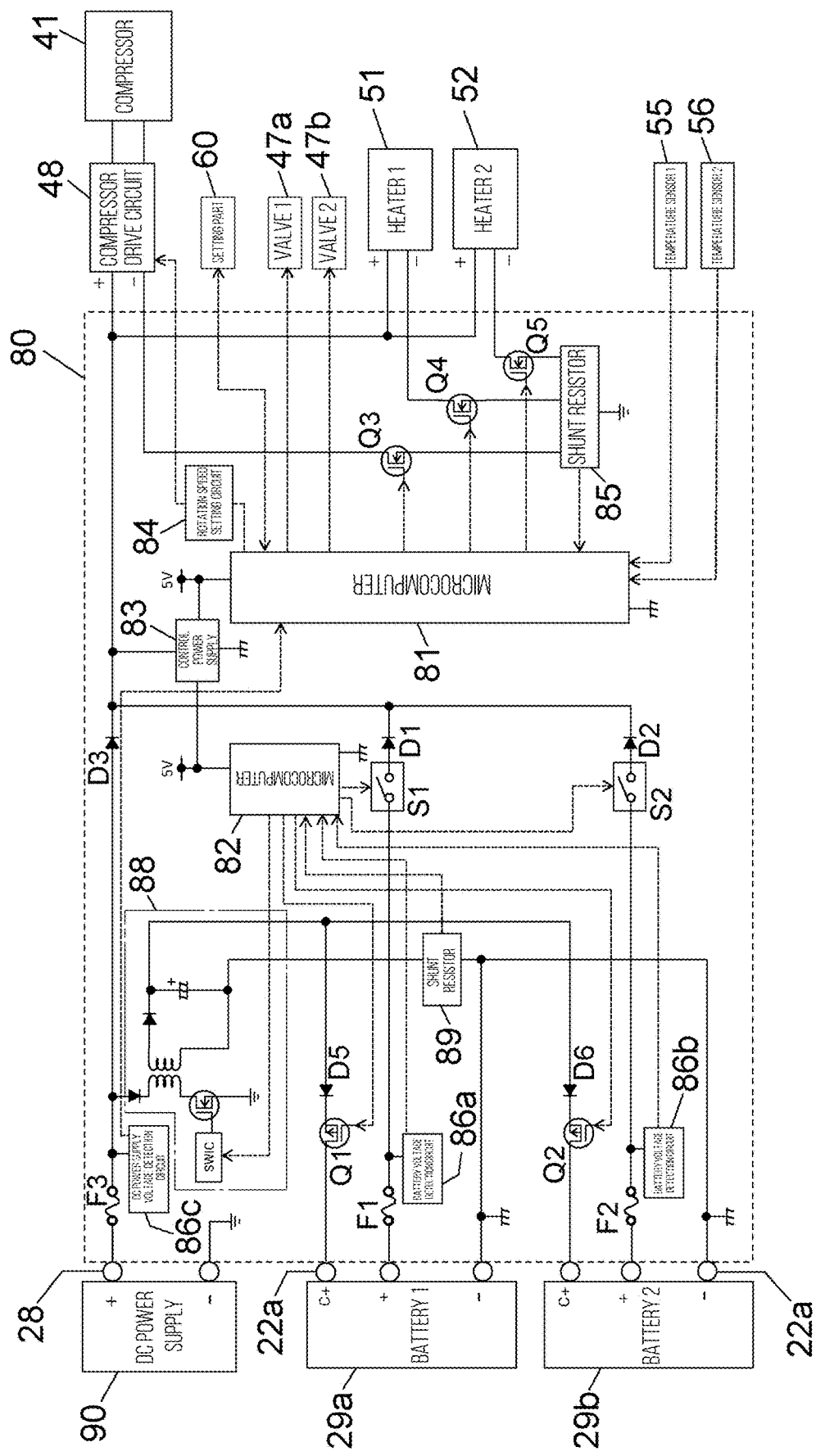

FIG. 34 is a circuit block diagram of the electric device 1.

Figure 35:
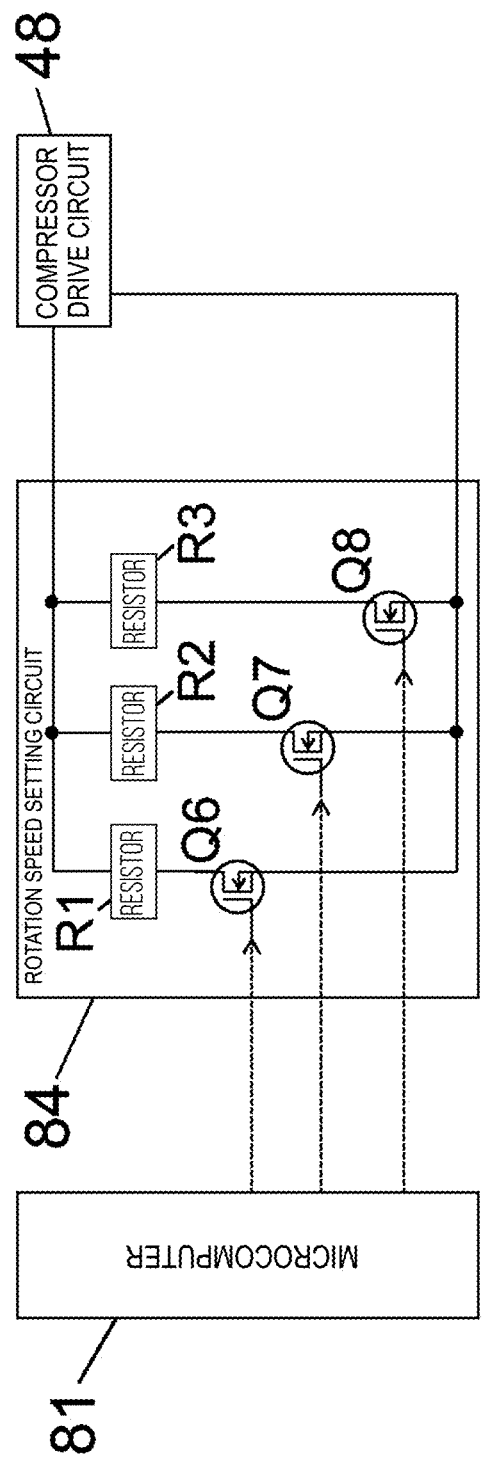

FIG. 35 is a circuit block diagram illustrating an internal configuration of a rotation speed setting circuit 84 in FIG. 34.

Figure 36:
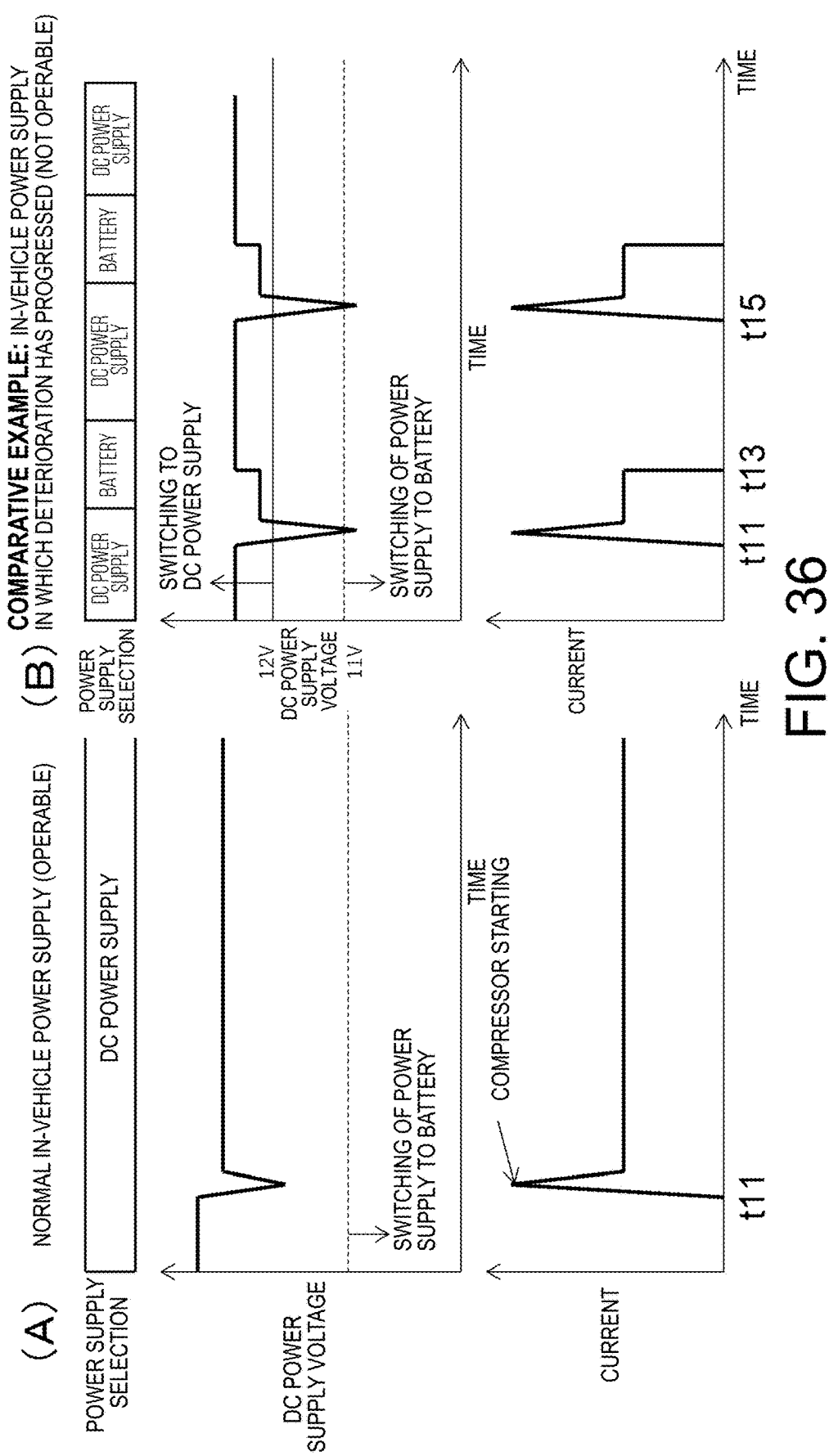

(A) of FIG. 36 is a time chart illustrating power supply selection, a voltage of a DC power supply 90, and a drive current for a compressor in a case where the DC power supply 90 is a normal in-vehicle power supply. (B) of FIG. 36 is a time chart illustrating power supply selection, a voltage of the DC power supply 90, and a drive current for a compressor 41 in a case where the DC power supply 90 is an in-vehicle power supply in which deterioration has progressed in an operation of the electric device 1 in a comparative example.

Figure 37:
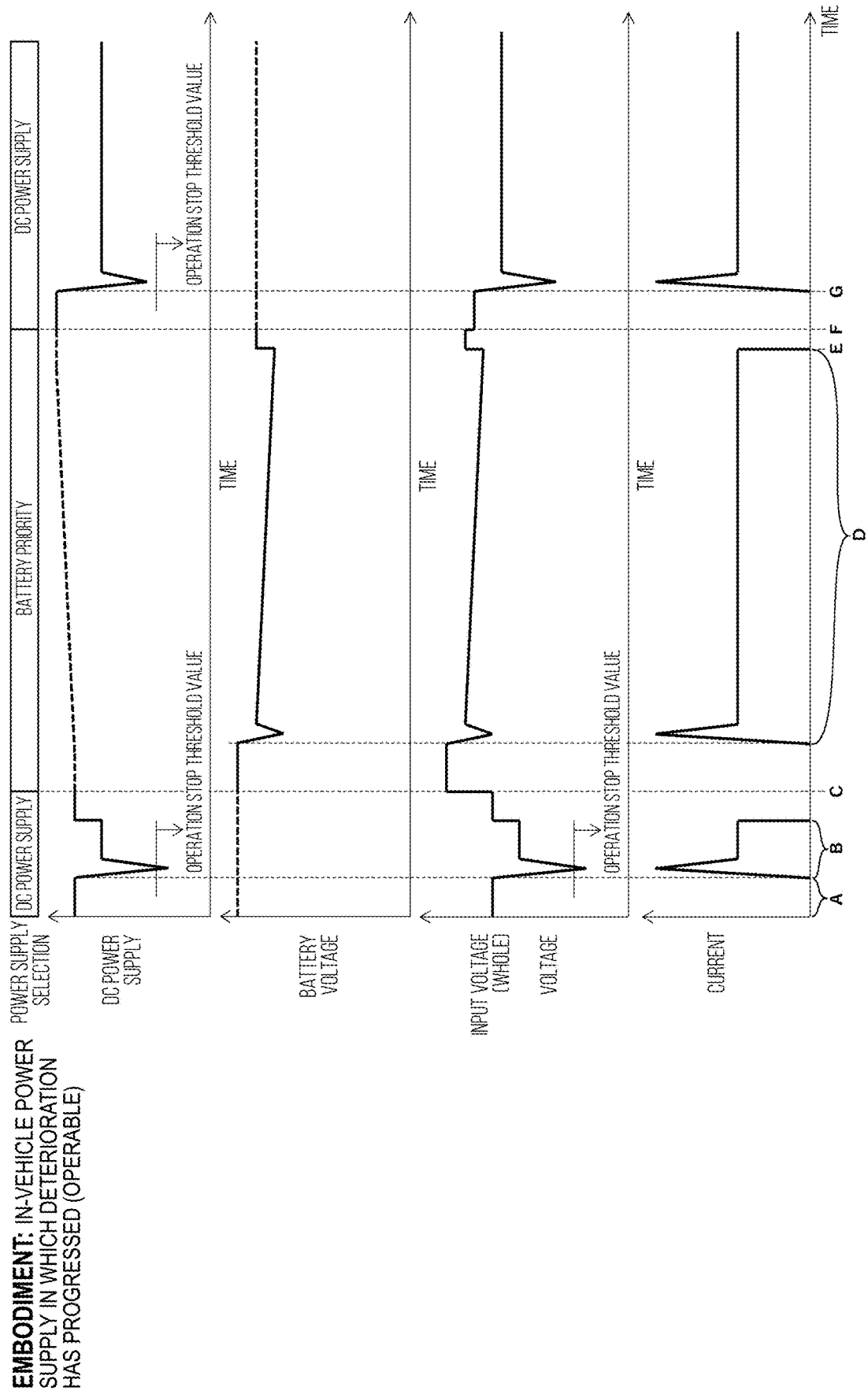

FIG. 37 is a time chart illustrating power supply selection, a voltage of the DC power supply 90, a voltage of the battery pack 29a or 29b, a voltage input to a compressor drive circuit 48, and a drive current for the compressor 41 in a case where the DC power supply 90 is an in-vehicle power supply in which deterioration has progressed in an operation of the electric device 1 of the embodiment.

Figure 38:
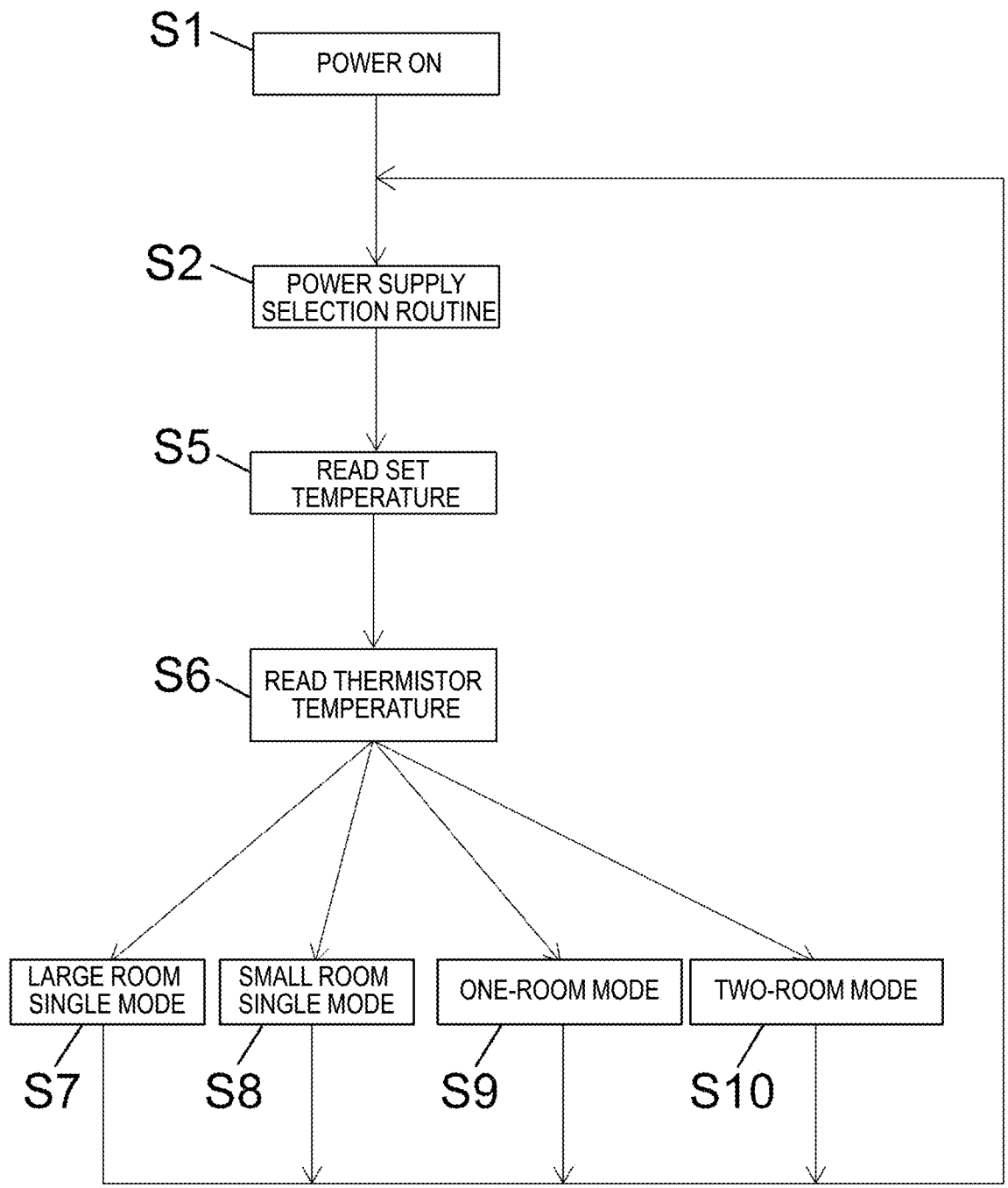

FIG. 38 is a flowchart illustrating a main routine of the electric device 1.

Figure 39:
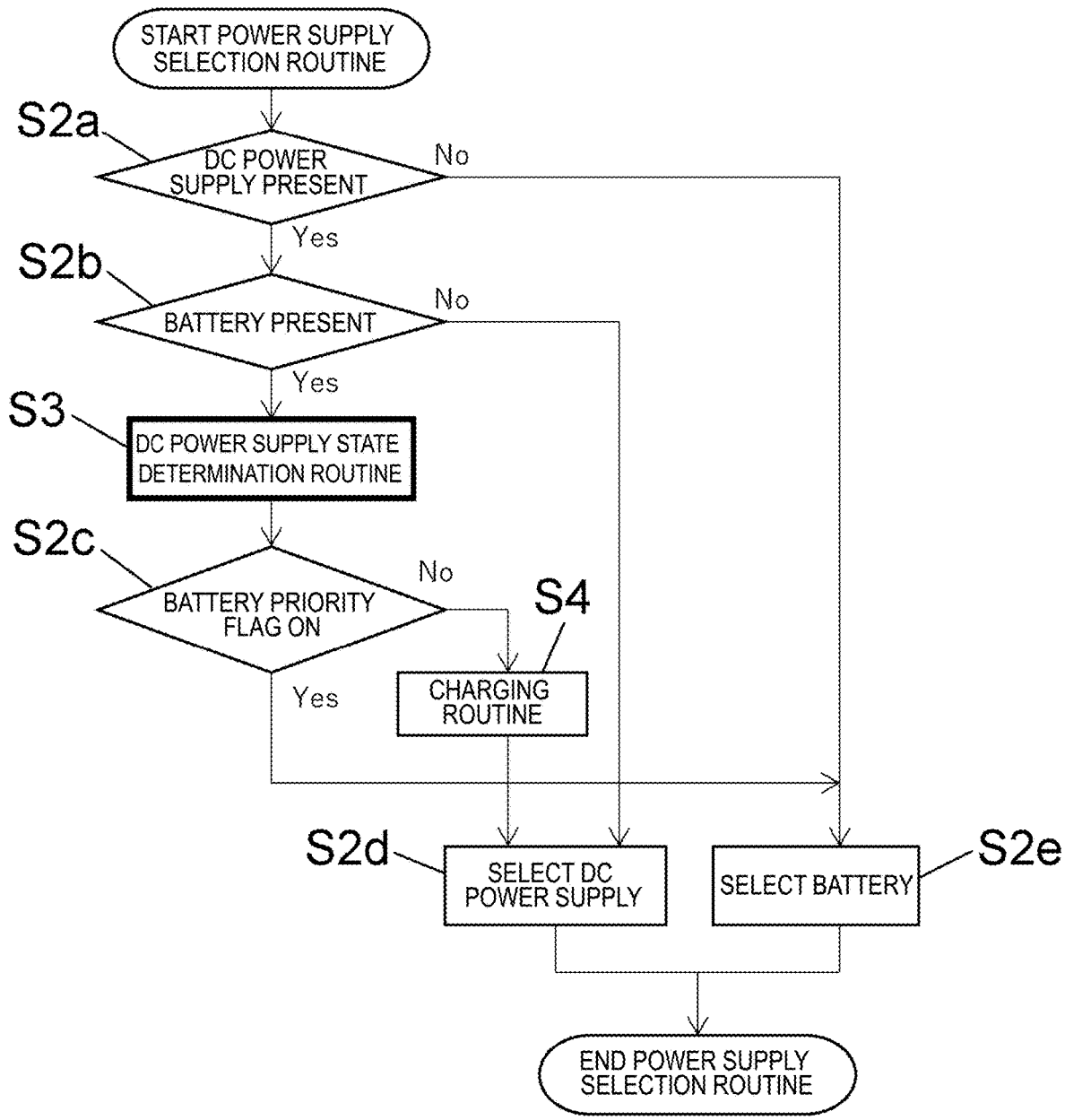

FIG. 39 is a flowchart illustrating a power supply selection routine in FIG. 38.

Figure 40:
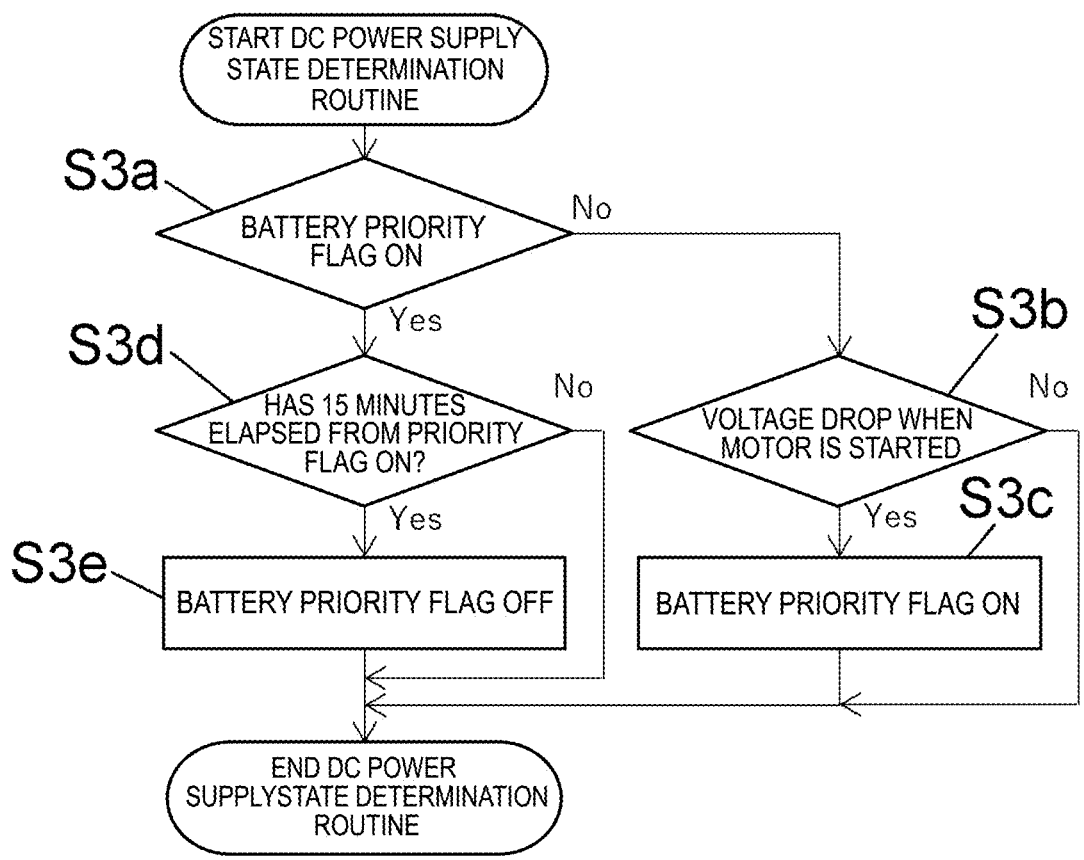

FIG. 40 is a flowchart illustrating a DC power state determination routine in FIG. 39.

Figure 41:
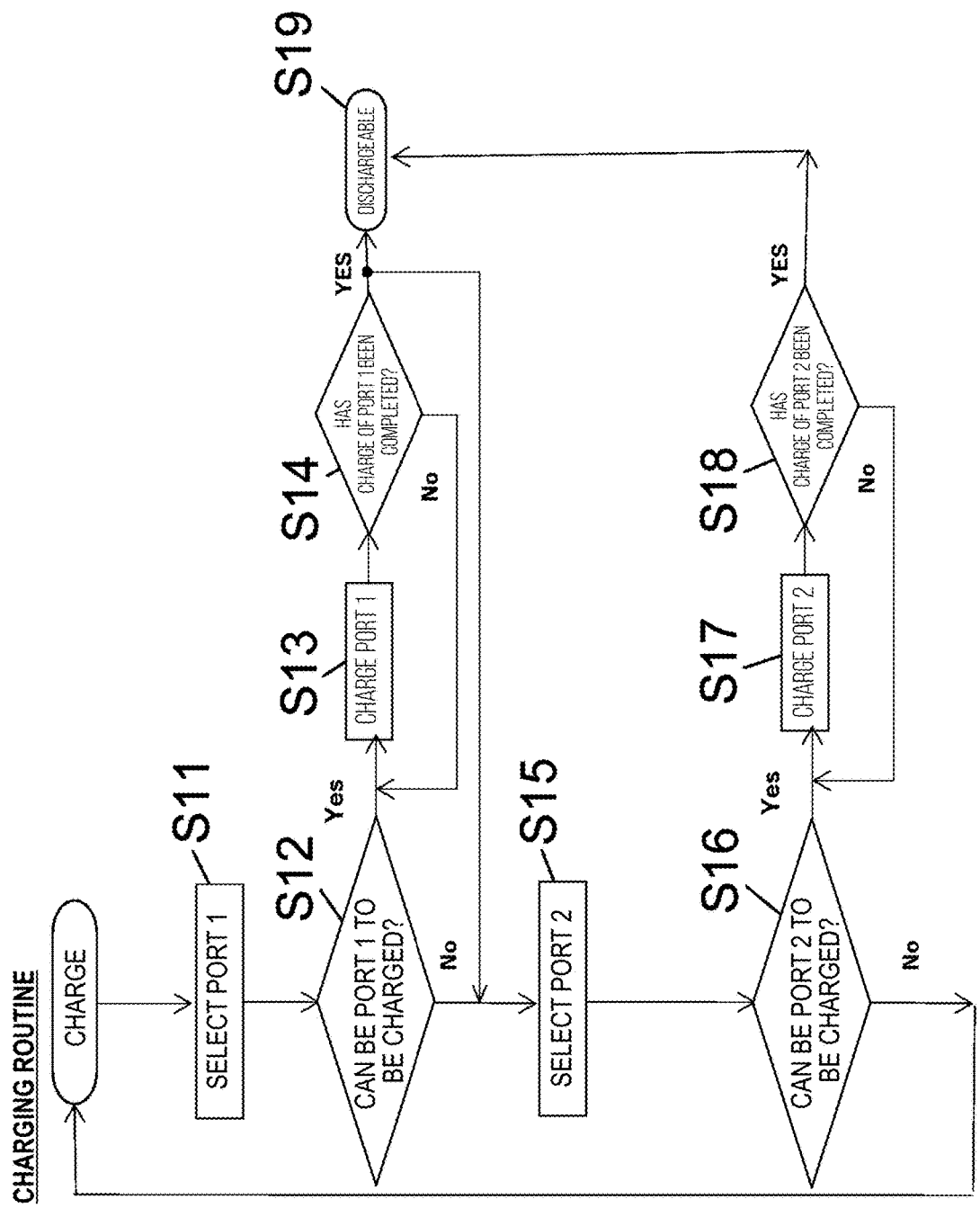

FIG. 41 is a flowchart illustrating a charging routine of the electric device 1.

Figure 42:
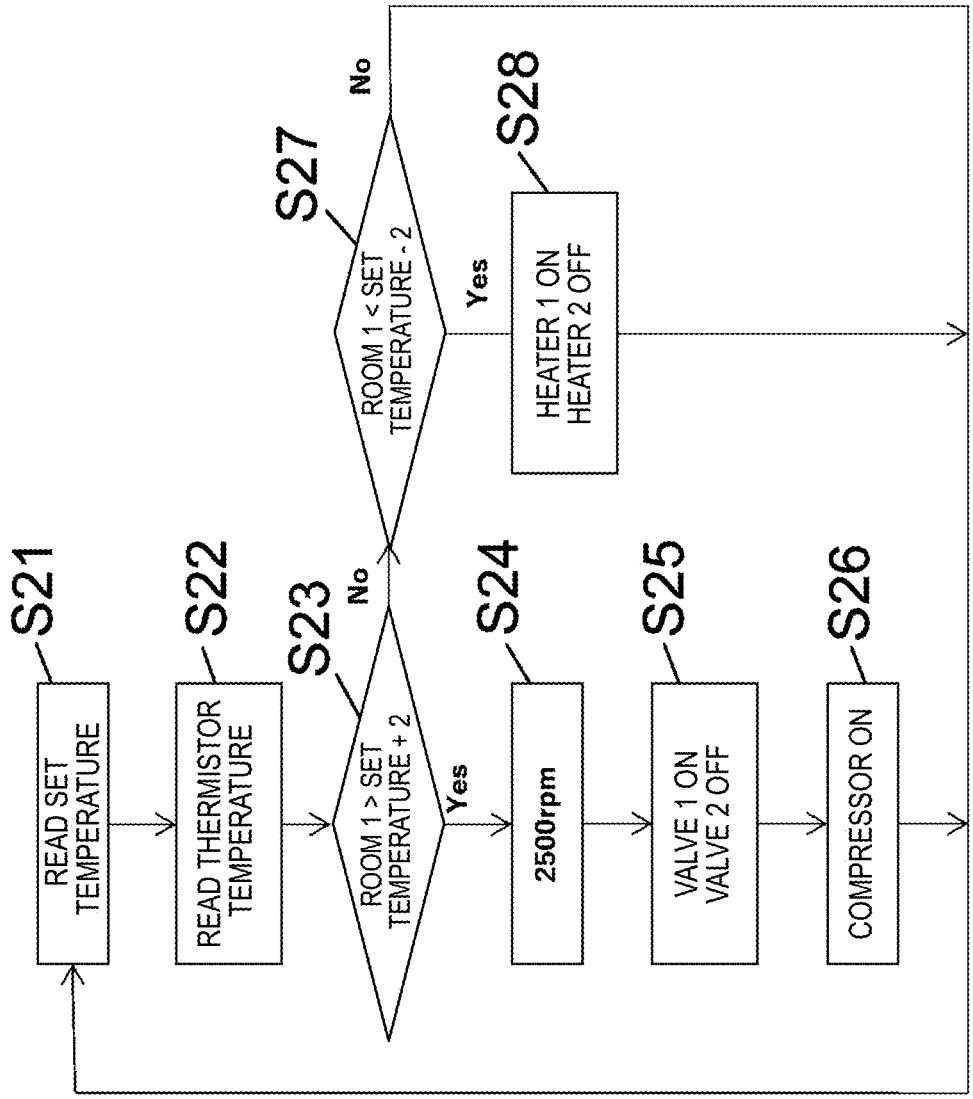

FIG. 42 is a flowchart illustrating an operation of the electric device 1 in the large room single mode.

Figure 43:
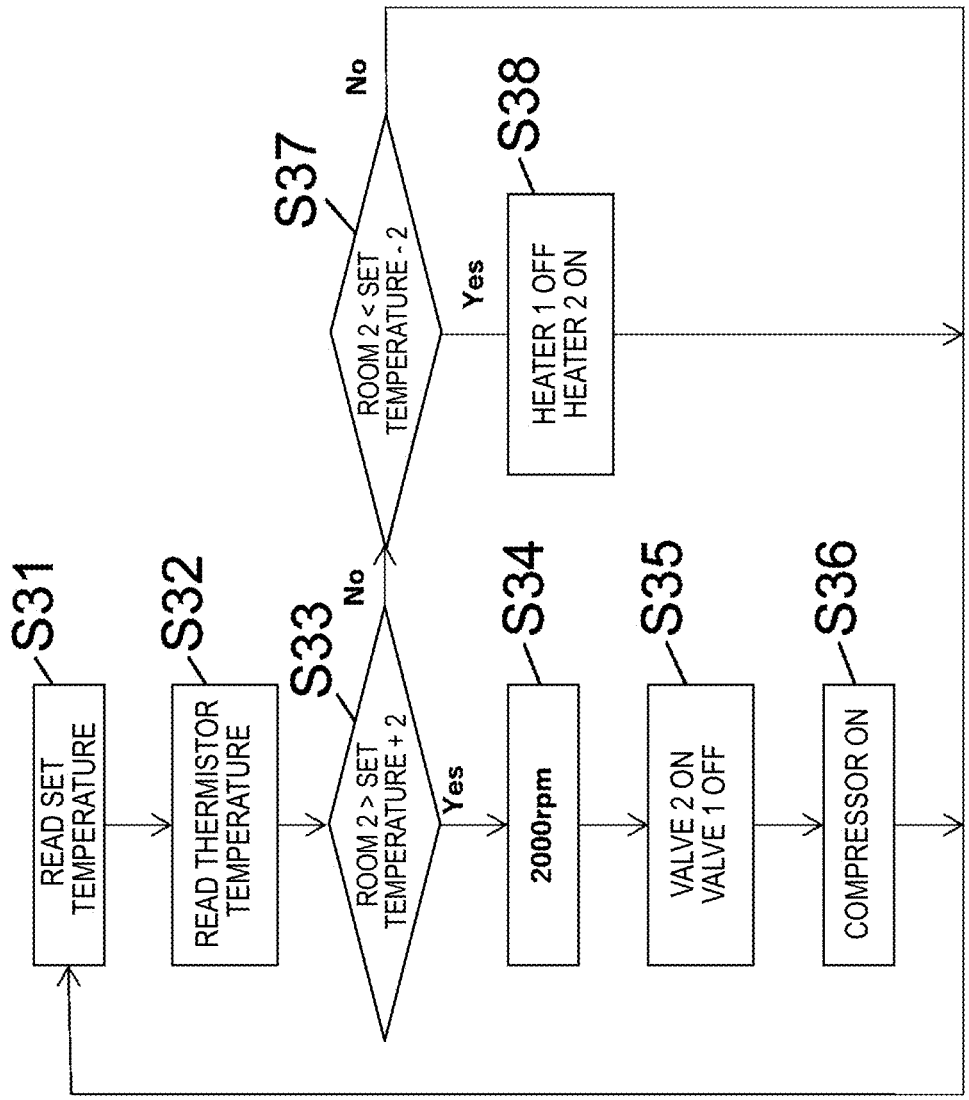

FIG. 43 is a flowchart illustrating an operation of the electric device 1 in the small room single mode.

Figure 44:
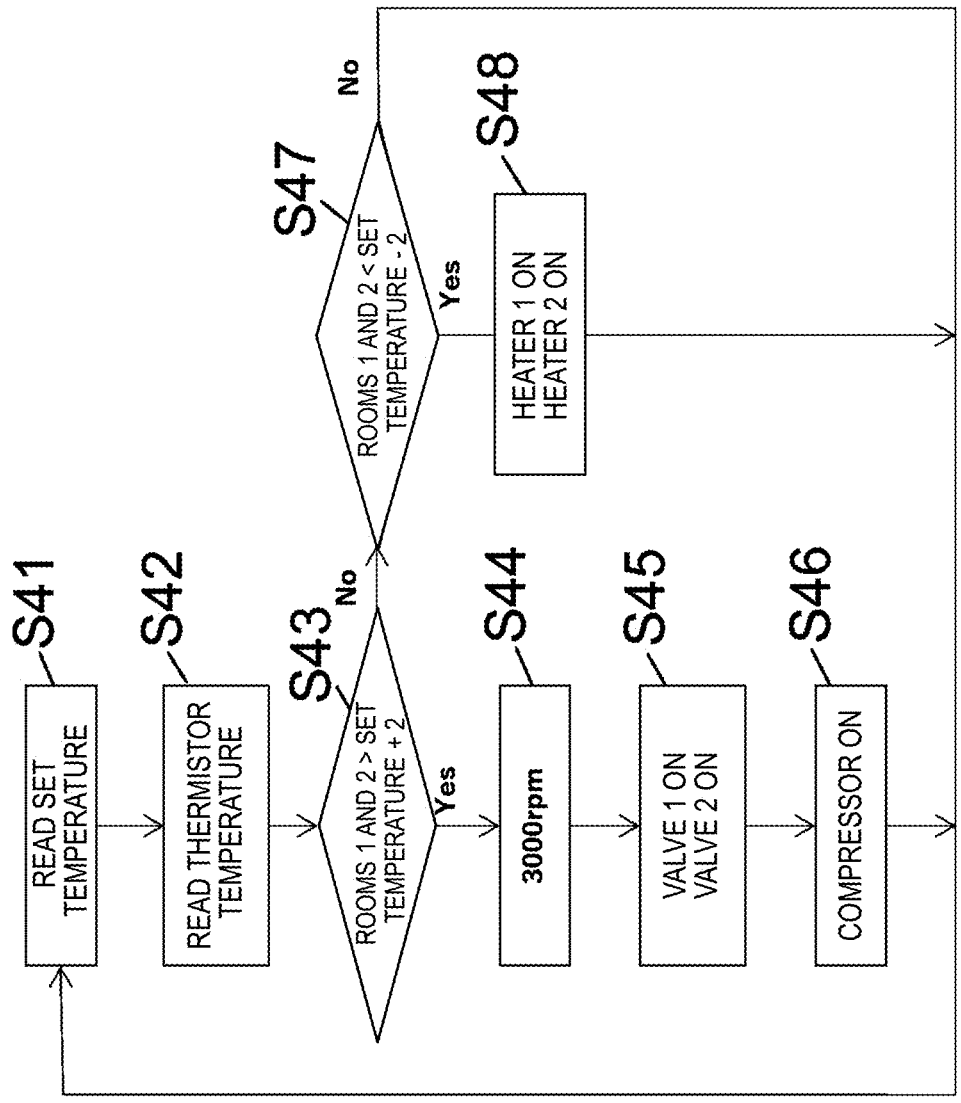

FIG. 44 is a flowchart illustrating an operation of the electric device 1 in the one-room mode.

Figure 45:
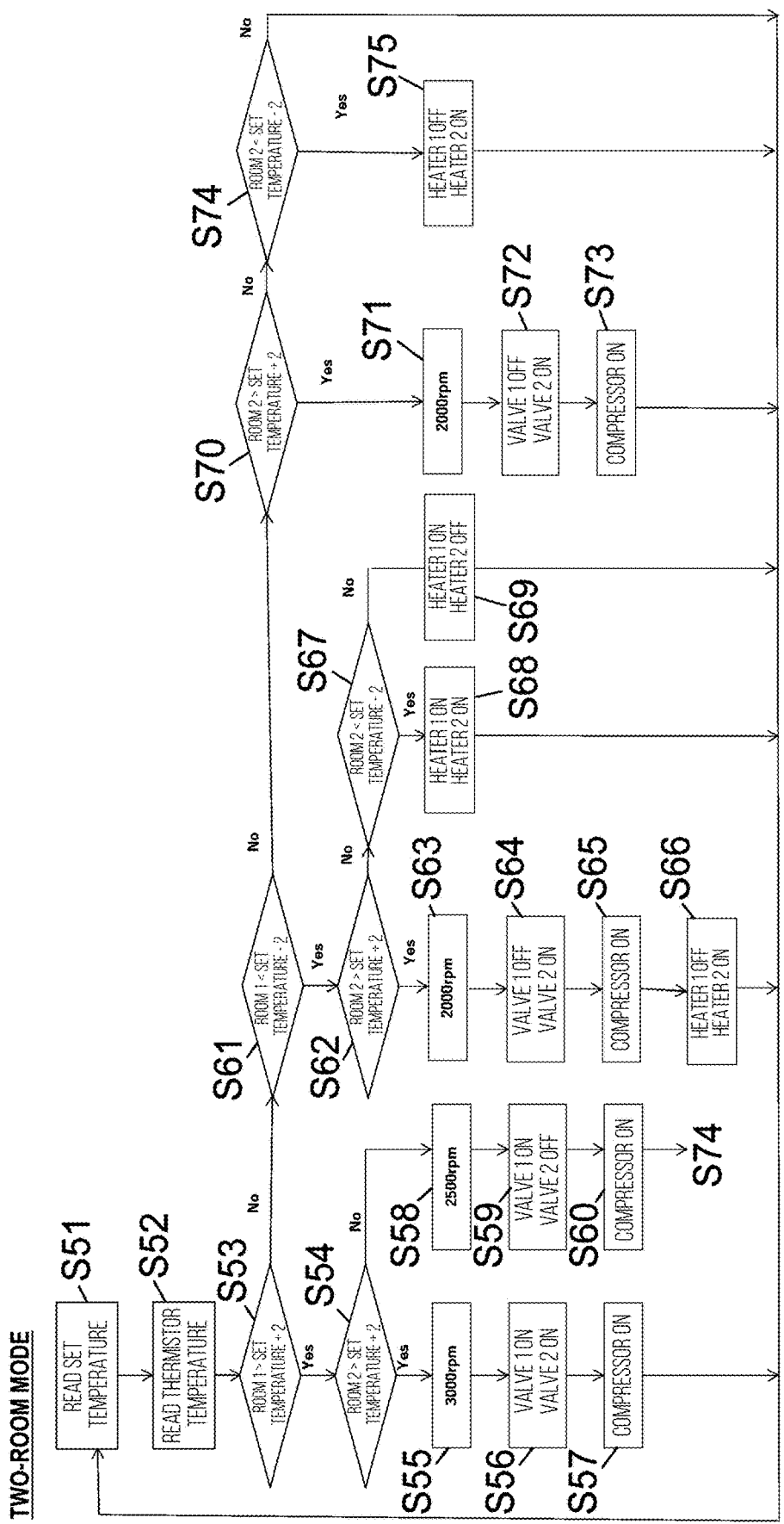

FIG. 45 is a flowchart illustrating an operation of the electric device 1 in the two-room mode.

Figure 46:
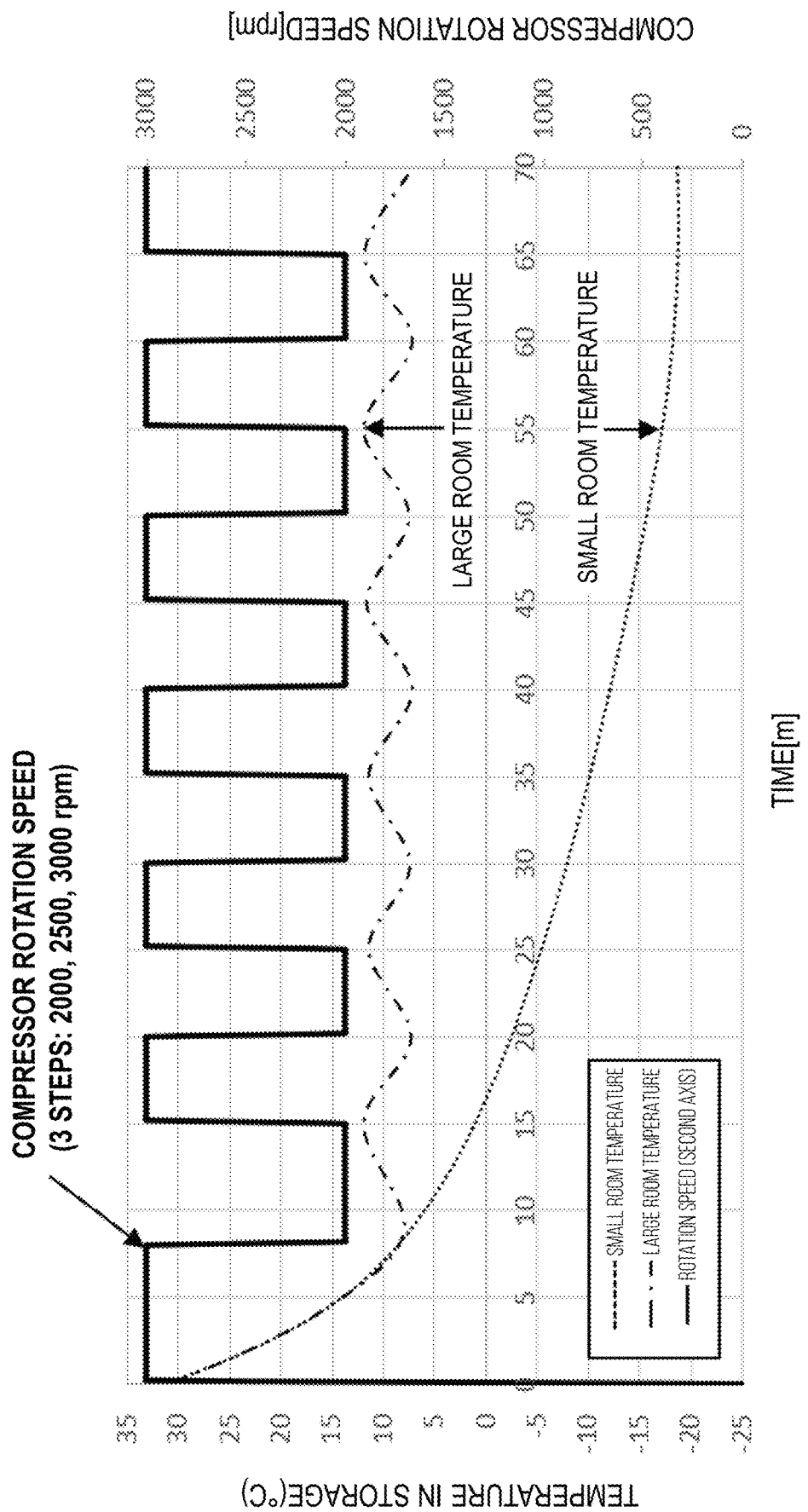

FIG. 46 is a graph illustrating temporal changes in temperatures of the first accommodation chamber 9 and the second accommodation chamber 10 and a rotation speed of the compressor 41 in a case where an operation is performed in the two-room mode when a set temperature of the first accommodation chamber 9 is 10° C. and a set temperature of the second accommodation chamber 10 is −18° C.

Figure 47:
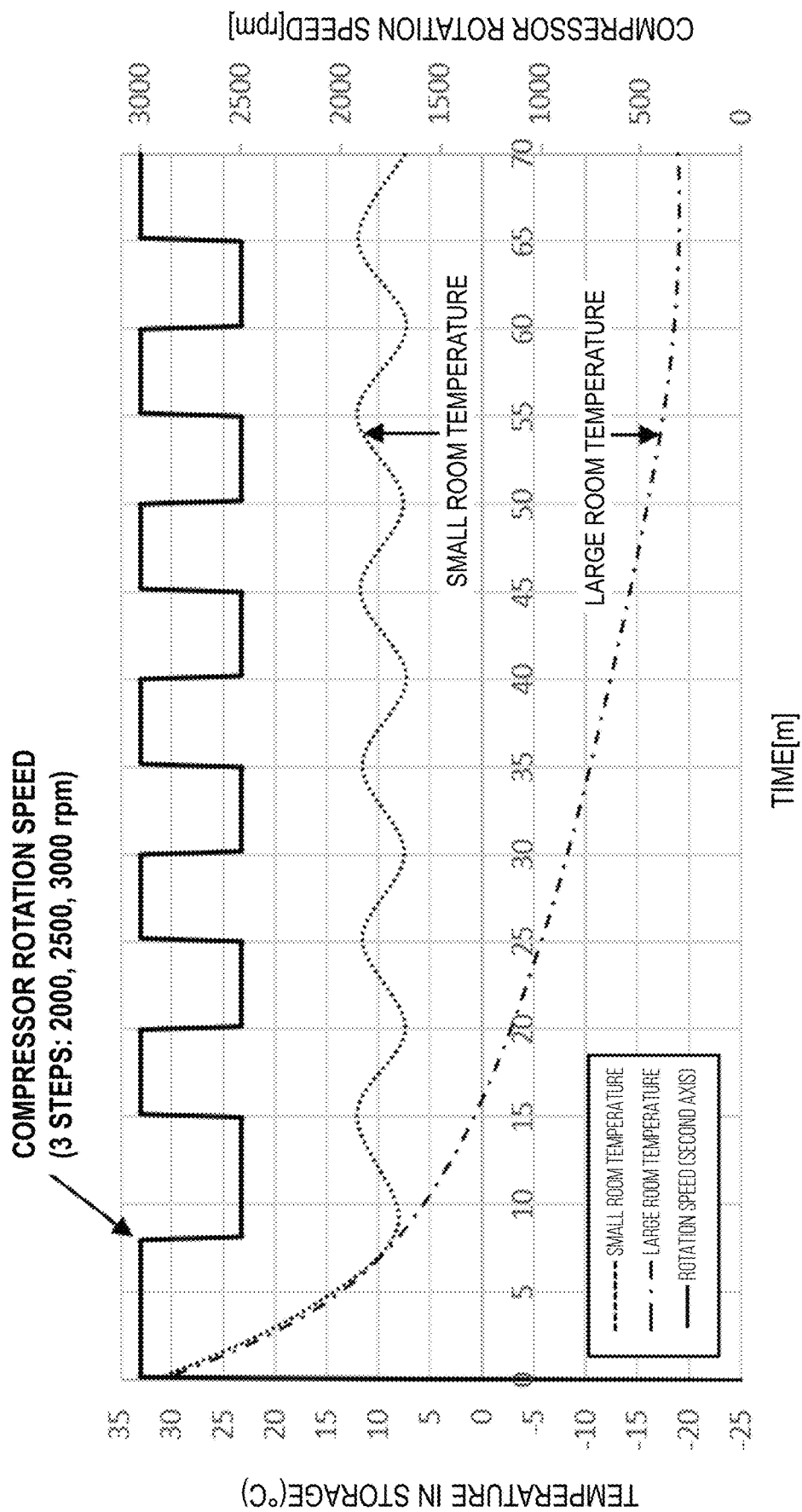

FIG. 47 is a graph illustrating temporal changes in temperatures of the first accommodation chamber 9 and the second accommodation chamber 10 and a rotation speed of the compressor 41 in a case where an operation is performed in the two-room mode when a set temperature of the first accommodation chamber 9 is −18° C. and a set temperature of the second accommodation chamber 10 is 10° C.

Figure 48:
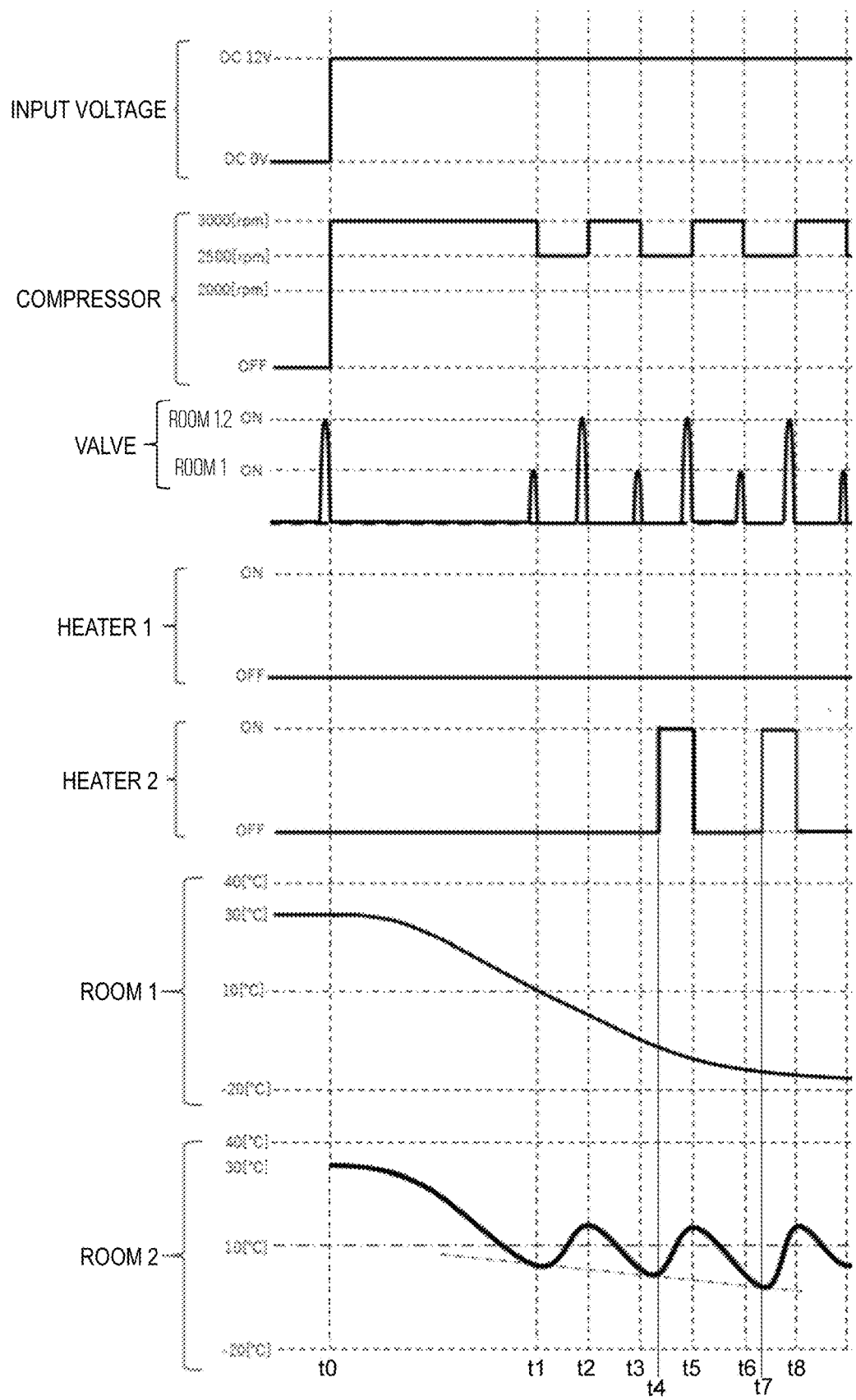

FIG. 48 is a time chart illustrating a voltage input to the compressor 41, a rotation speed of the compressor 41, opening and closing signals for a first regulating valve 47a and a second regulating valve 47b, turning-on and turning-off of a first heating part 51 and a second heating part 52, and temperatures of the first accommodation chamber 9 and the second accommodation chamber 10 in the two-room mode.

Figure 49:
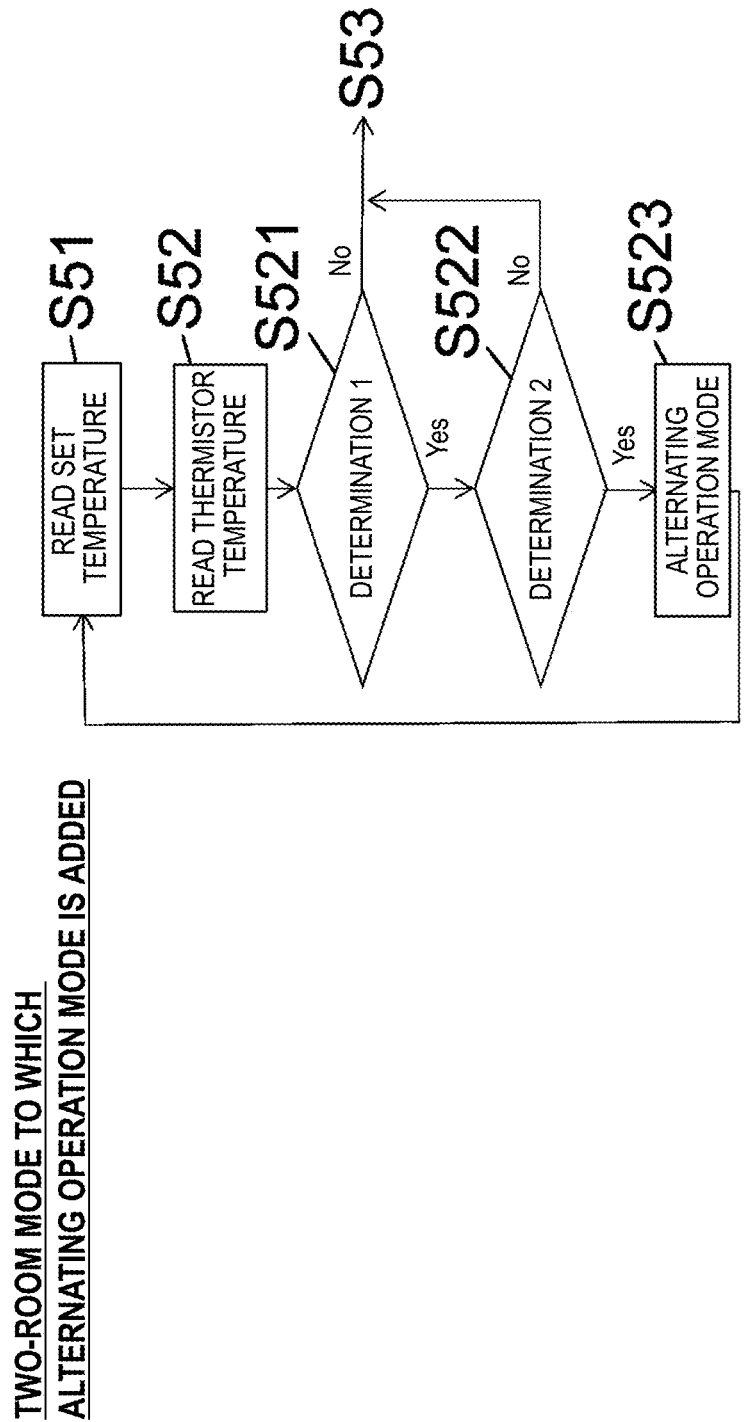

FIG. 49 is a flowchart illustrating an operation in a two-room mode in which an alternating operation mode is added to the two-room mode in FIG. 45.

FIG. 50 is an explanatory diagram illustrating a specific example of determination 1 (S521) in FIG. 49.

FIG. 51 is an explanatory diagram illustrating a specific example of determination 2 (S522) in FIG. 49.

Figure 52:
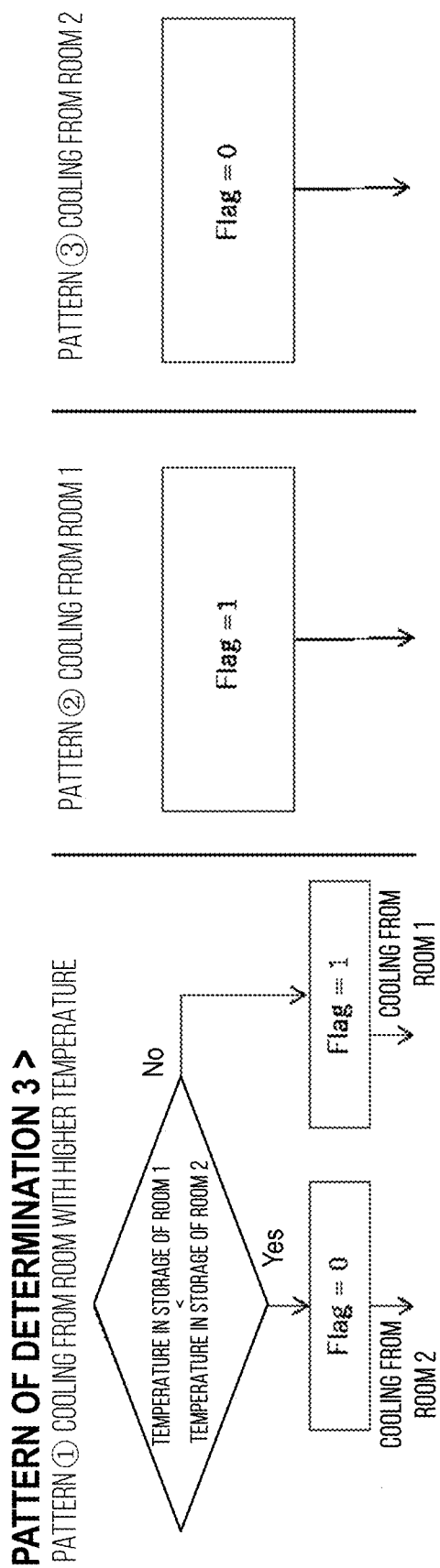
Figure 53:
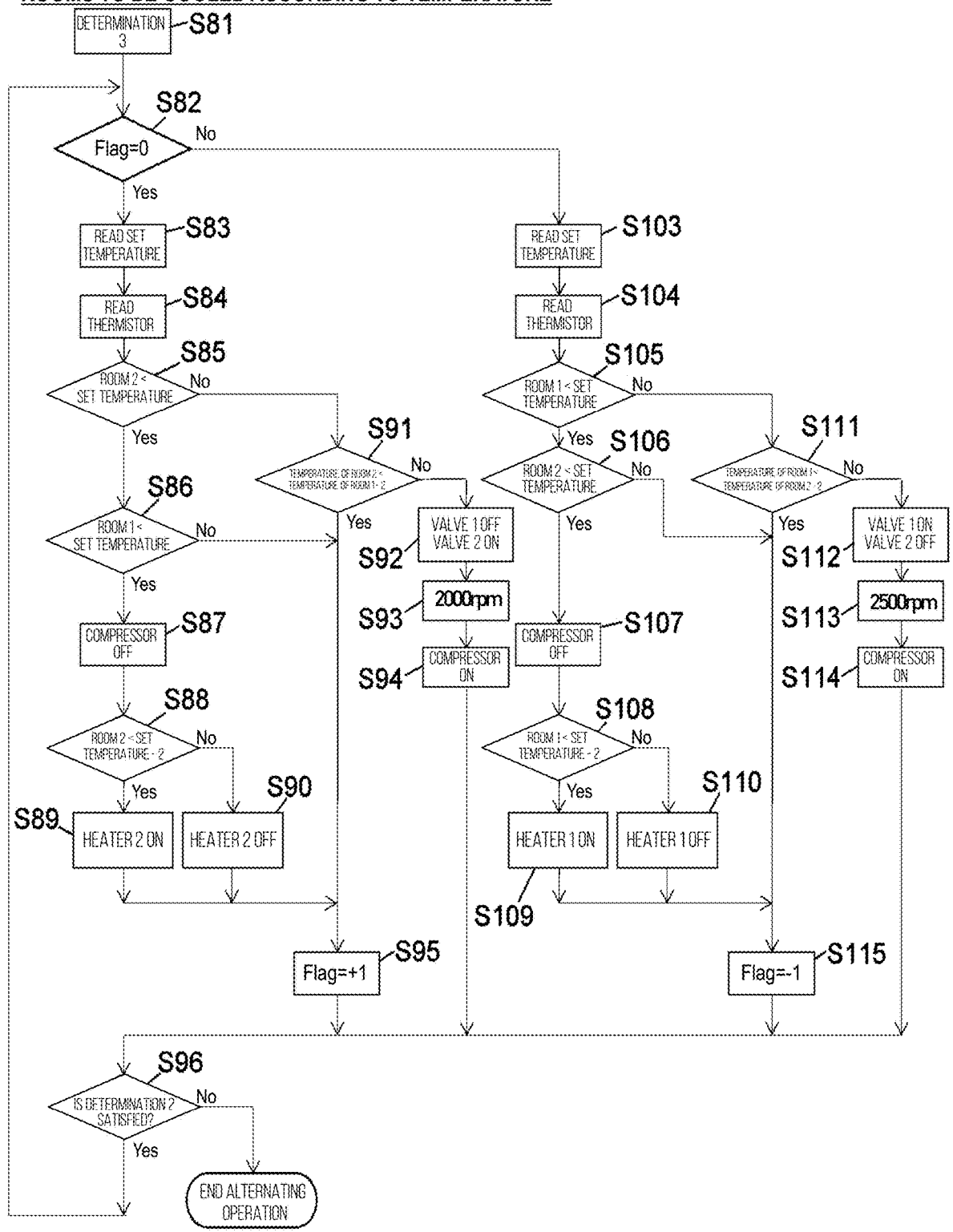

FIG. 52 is an explanatory diagram illustrating a specific example of determination 3 (S80) in FIG. 53.

FIG. 53 is a flowchart illustrating a first pattern of the alternating operation mode (S523) in FIG. 49.

Figure 54:
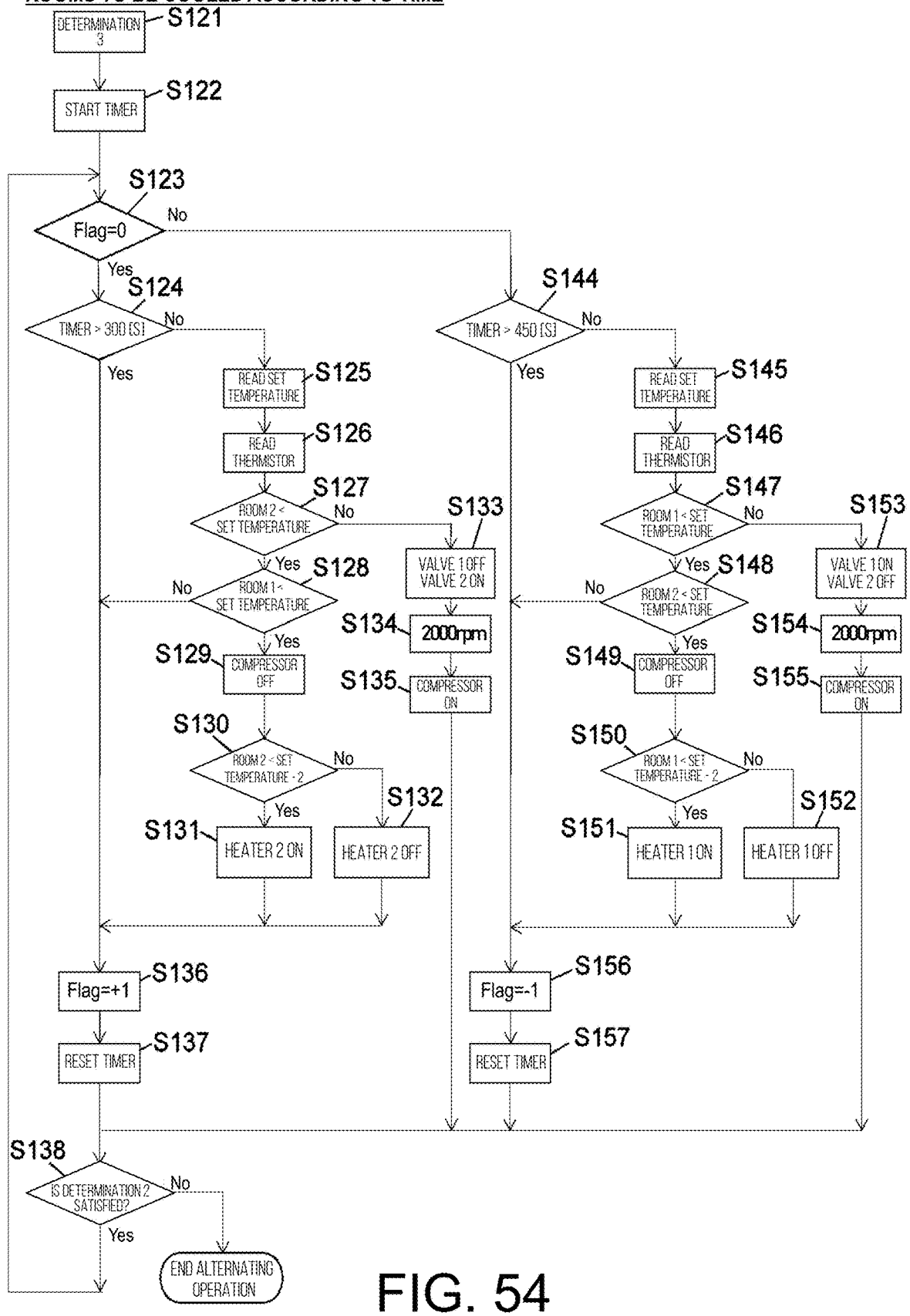

FIG. 54 is a flowchart illustrating a second pattern of the alternating operation mode (S523) in FIG. 49.

Figure 55:
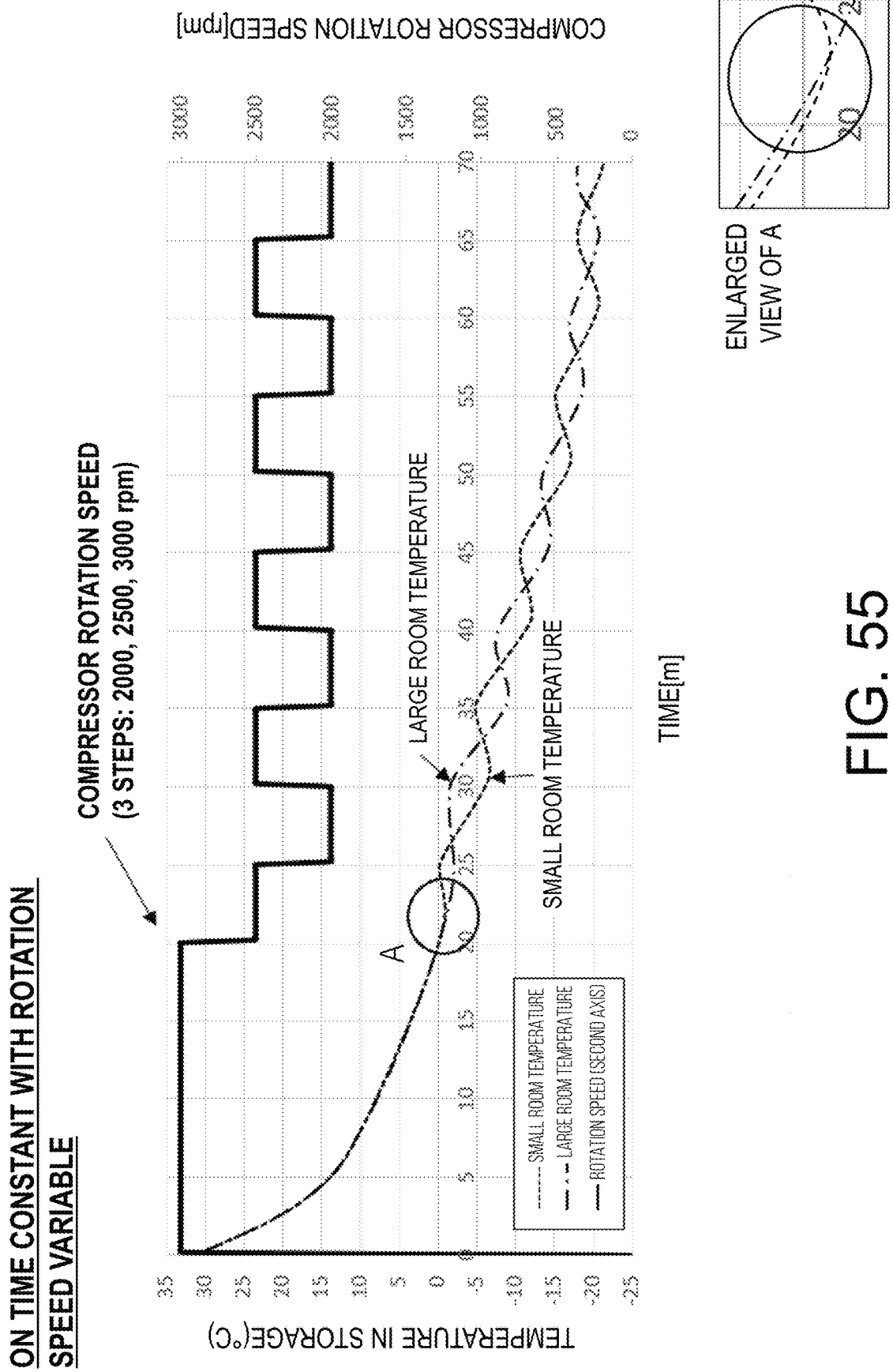

FIG. 55 is a graph (part 1) illustrating temporal changes in temperatures of the first accommodation chamber 9 and the second accommodation chamber 10 and a rotation speed of the compressor 41 in a case where set temperatures of both the first accommodation chamber 9 and the second accommodation chamber 10 are −18° C., and an operation associated with transition from a simultaneous operation mode to the alternating operation mode is performed in the two-room mode.

Figure 56:
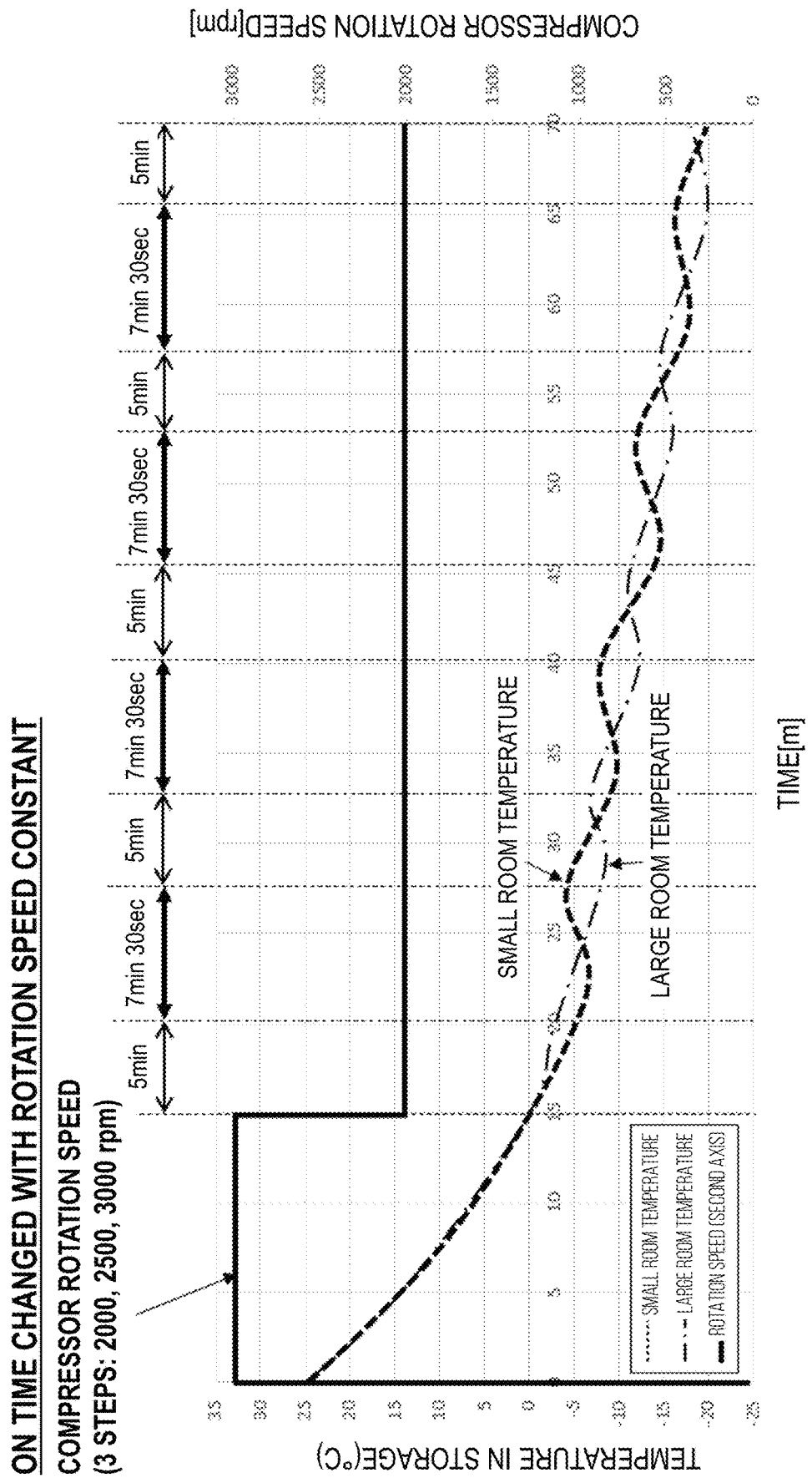

FIG. 56 is a graph (part 2) illustrating temporal changes in temperature of the first accommodation chamber 9 and the second accommodation chamber 10 and a rotation speed of the compressor 41 in a case where set temperatures of both the first accommodation chamber 9 and the second accommodation chamber 10 are −18° C., and an operation associated with transition from the simultaneous operation mode to the alternating operation mode is performed in the two-room mode.

Figure 57:
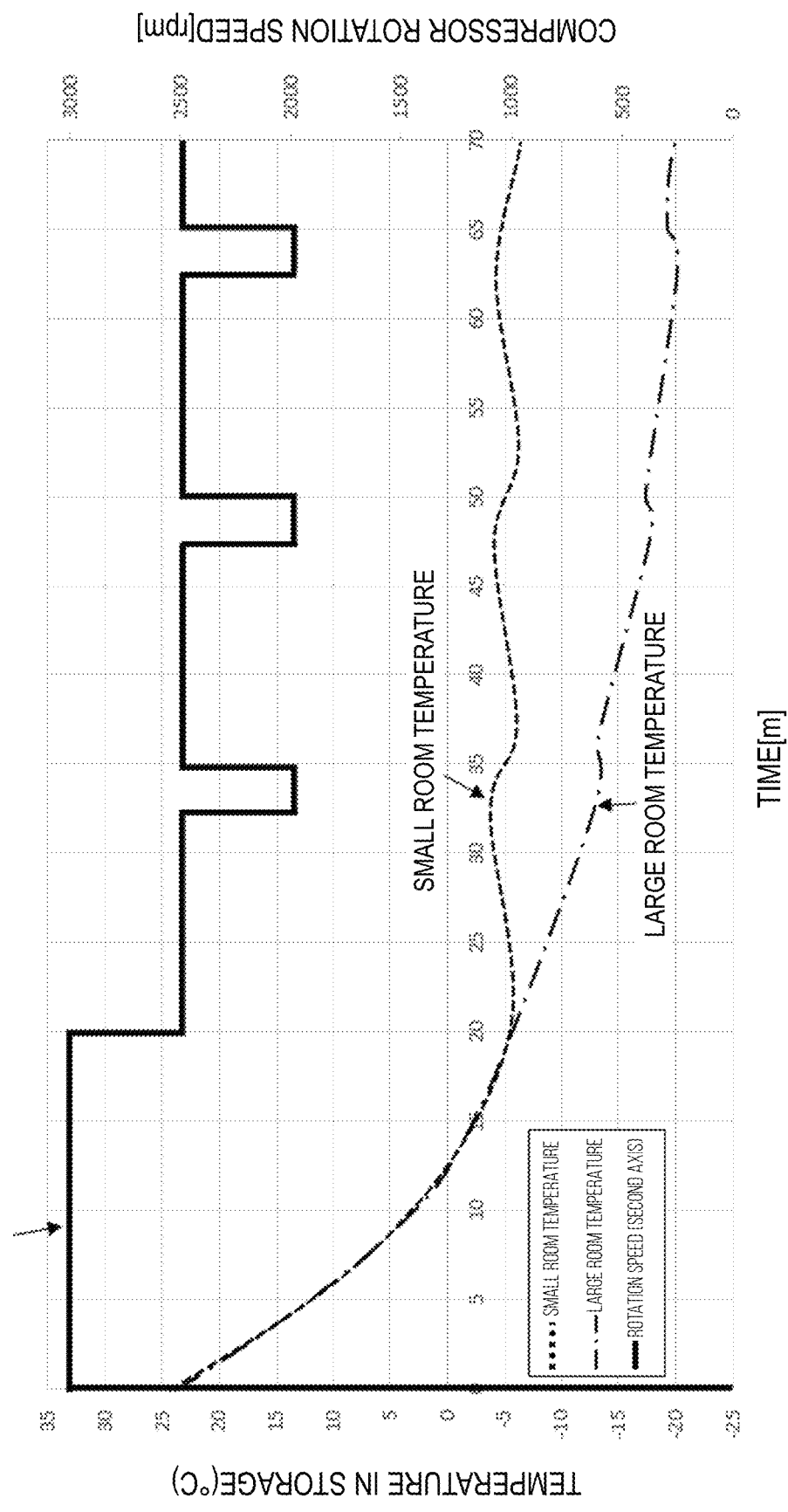

FIG. 57 is a graph illustrating temporal changes in temperature of the first accommodation chamber 9 and the second accommodation chamber 10 and a rotation speed of the compressor 41 in a case where a set temperature of the first accommodation chamber 9 is −18° C., a set temperature of the second accommodation chamber 10 is −5° C., and an operation associated with transition from the simultaneous operation mode to the alternating operation mode is performed in the two-room mode.

Figure 58:
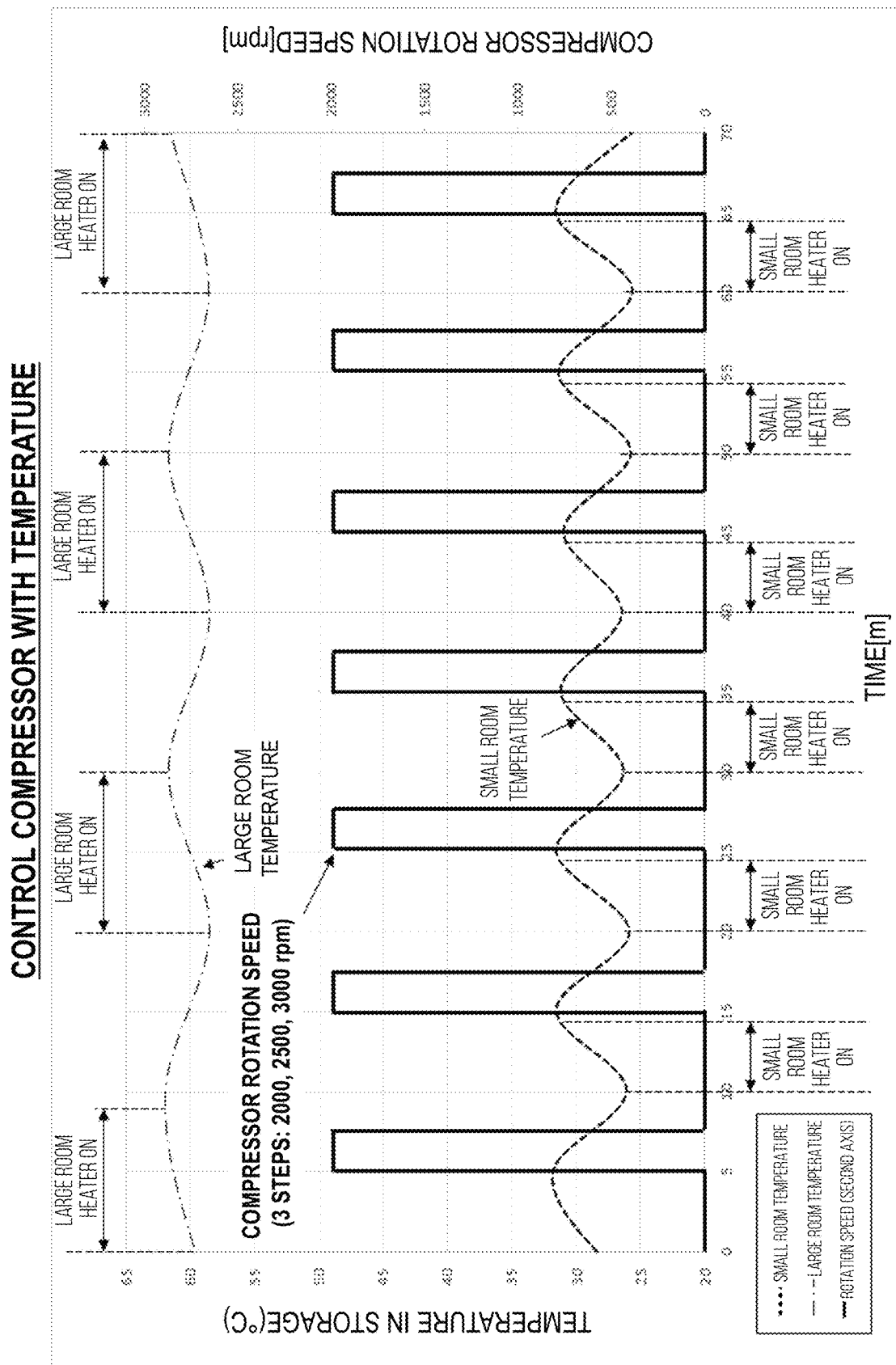

FIG. 58 is a graph illustrating temporal changes in temperatures of the first accommodation chamber 9 and the second accommodation chamber 10 and a rotation speed of the compressor 41 in a case where a set temperature of the first accommodation chamber 9 is 60° C., a set temperature of the second accommodation chamber 10 is 30° C., and cooling of the second accommodation chamber 10 using the compressor 41 is stopped by controlling a temperature of the second accommodation chamber 10 in the two-room mode.

Figure 59:
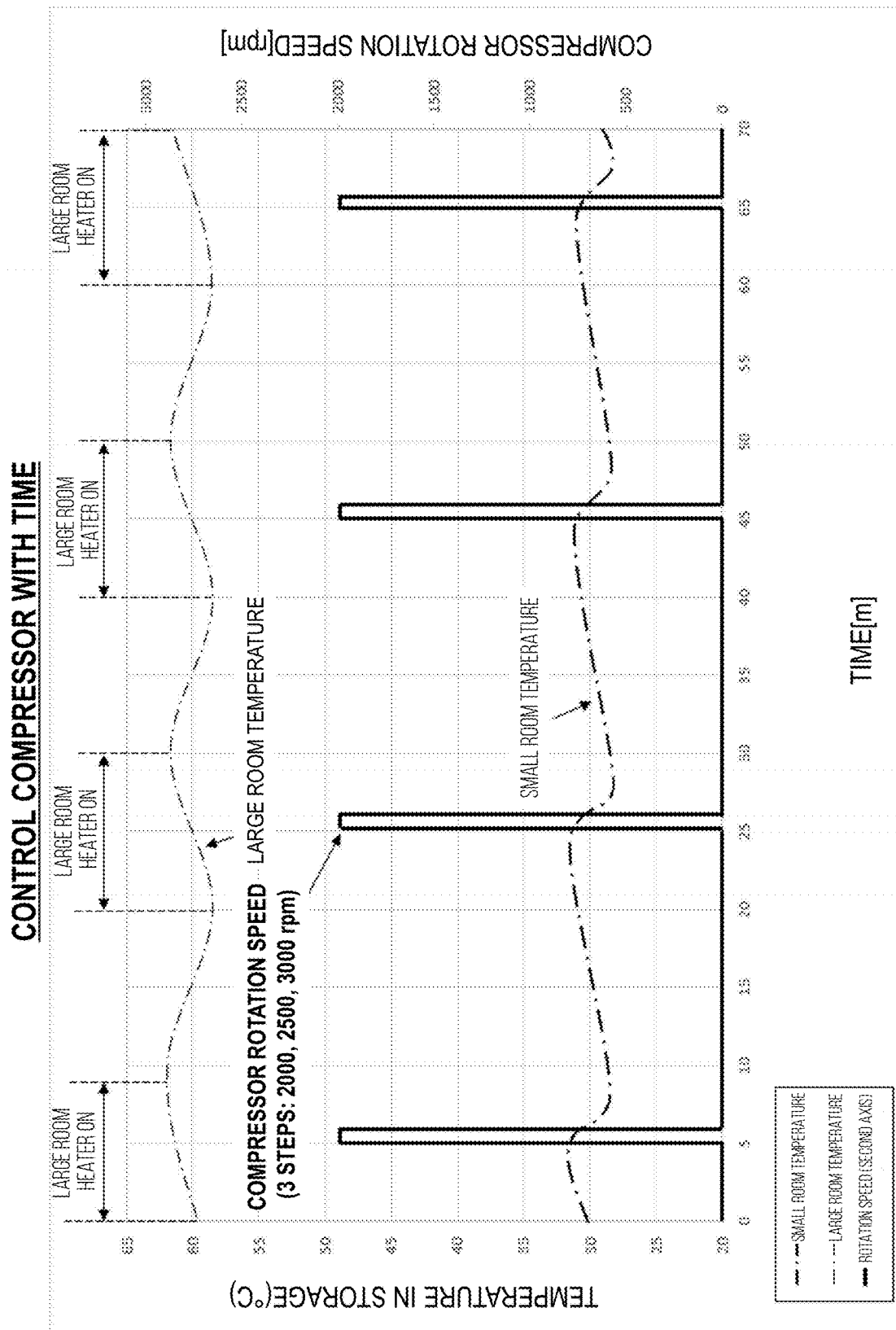

FIG. 59 is a graph illustrating temporal changes in temperatures of the first accommodation chamber 9 and the second accommodation chamber 10 and a rotation speed of the compressor 41 in a case where a set temperature of the first accommodation chamber 9 is 60° C., a set temperature of the second accommodation chamber 10 is 30° C., and cooling of the second accommodation chamber 10 using the compressor 41 is stopped by controlling a time from the start of the cooling in the two-room mode.

Figure 60:
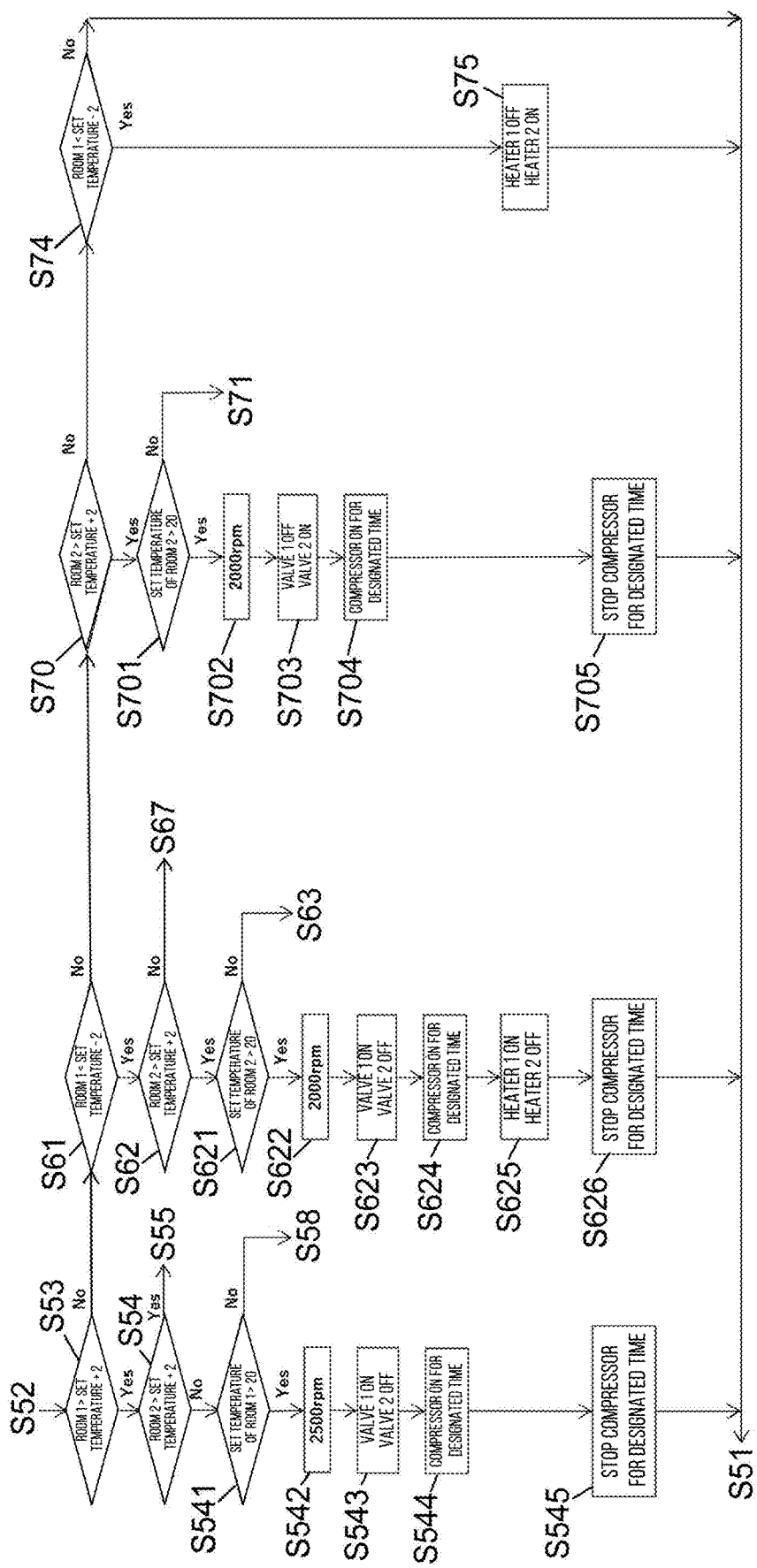

FIG. 60 is a flowchart illustrating an operation in a two-room mode in which time control is added to the two-room mode in FIG. 45.

Figure 61:
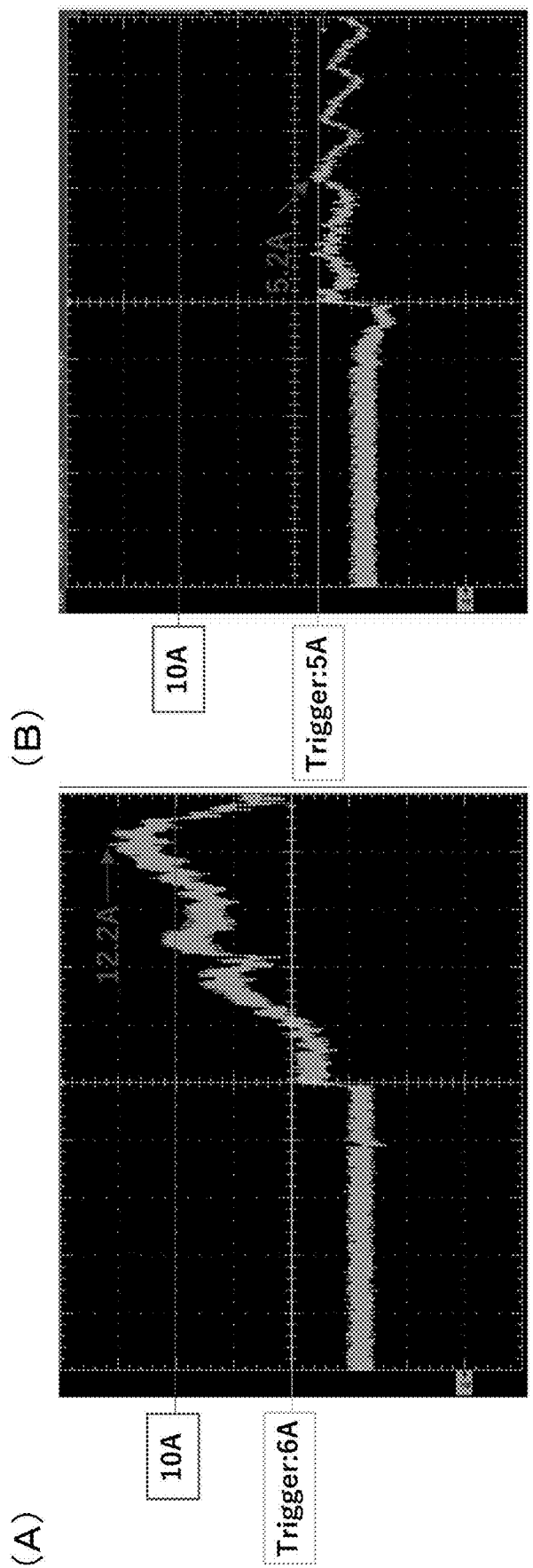

(A) of FIG. 61 is a waveform diagram of a drive current for the compressor 41 before and after an operation is resumed in a case where an operation of the compressor 41 is performed, stopped for one minute, and then resumed. (B) of FIG. 61 is a waveform diagram of a drive current for the compressor 41 before and after an operation is resumed in a case where an operation of the compressor 41 is performed, stopped for two minutes, and then resumed.

Figure 62:
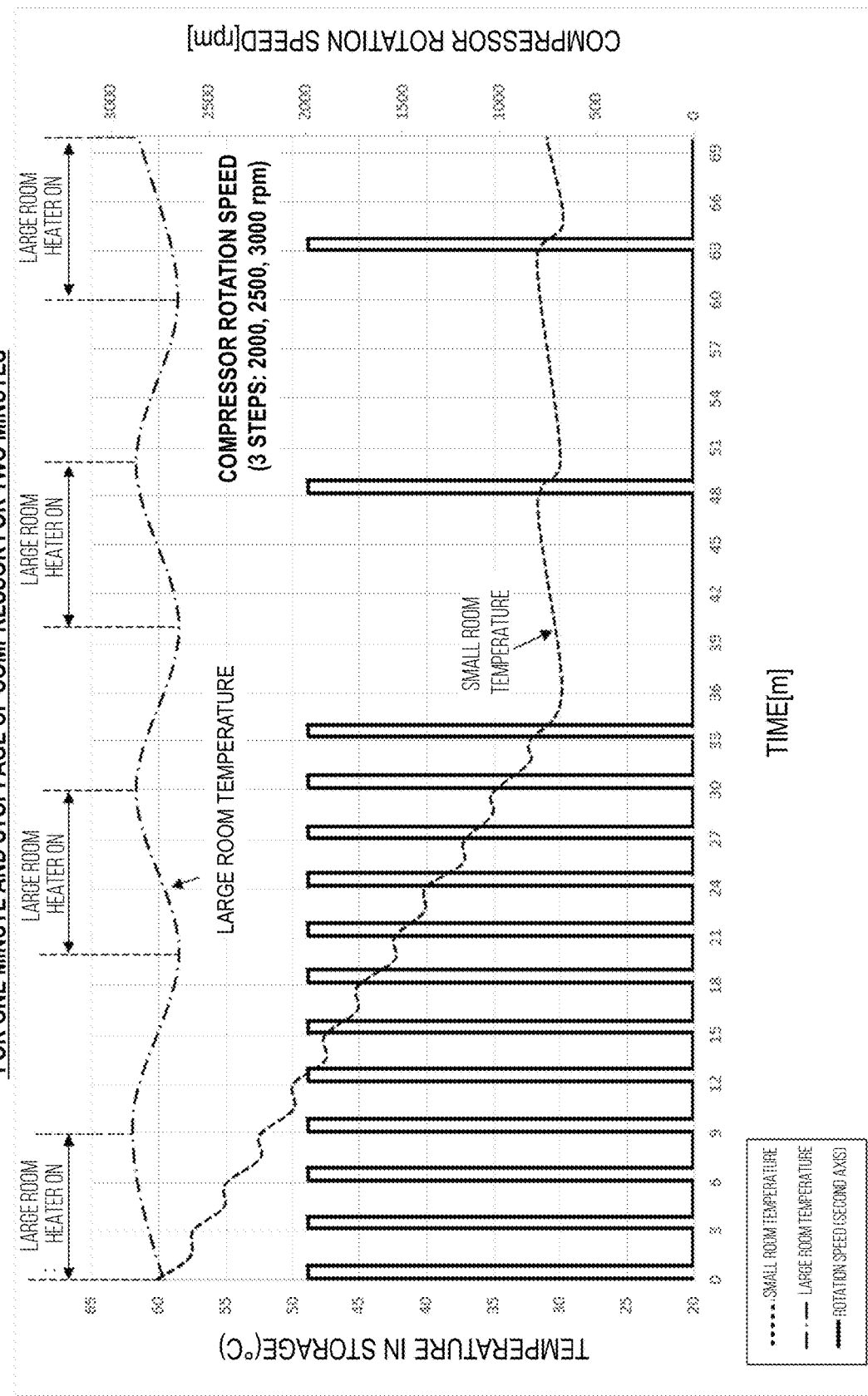

FIG. 62 is a graph illustrating temporal changes in temperatures of the first accommodation chamber 9 and the second accommodation chamber 10 and a rotation speed of the compressor 41 in a case where a set temperature of the first accommodation chamber 9 is 60° C., a set temperature of the second accommodation chamber 10 is 30° C., and cooling of the second accommodation chamber 10 using the compressor 41 is performed by repeatedly performing an operation for one minute and stoppage for two minutes in the two-room mode.

Figure 63:
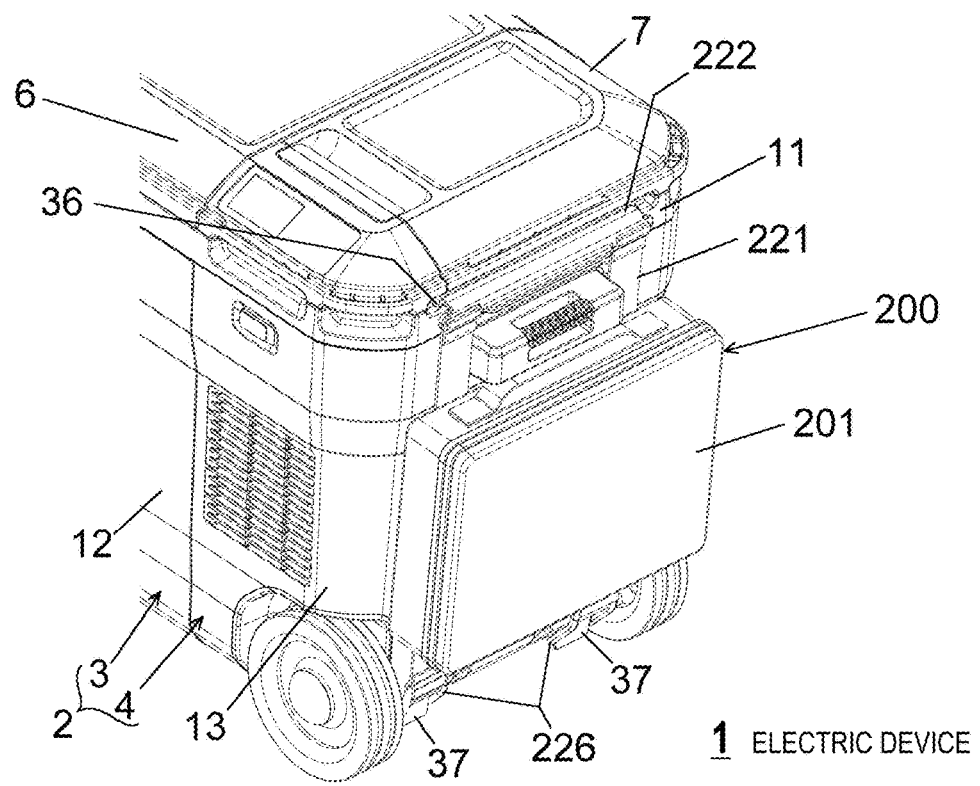

FIG. 63 is a perspective view of main parts of the electric device 1 with a storage unit (additional part) 200 attached to the right side surface.

Figure 64:
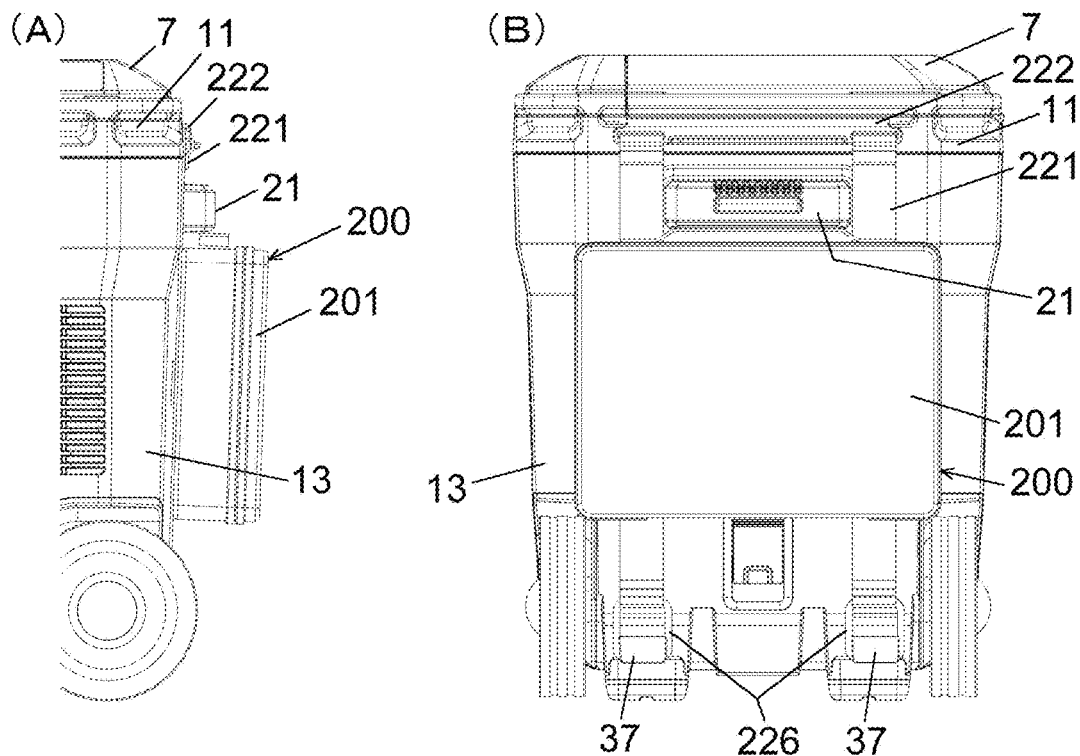

(A) of FIG. 64 is a front view of the same. (B) of FIG. 64 is a right side view of the same.

Figure 65:
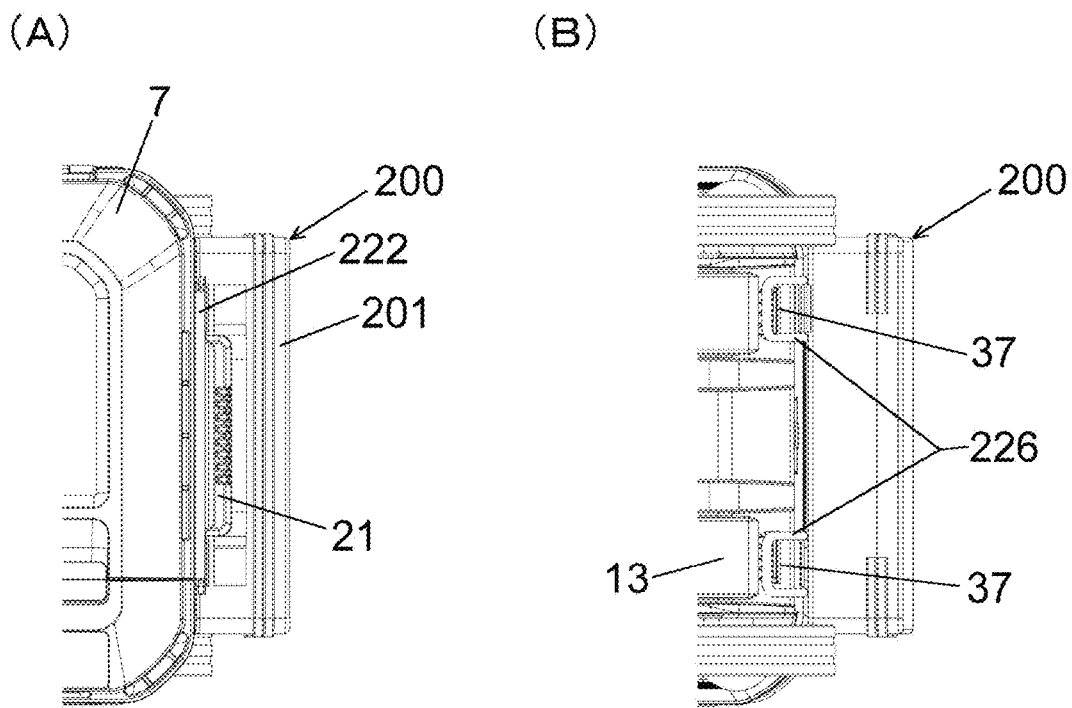

(A) of FIG. 65 is a plan view of the same. (B) of FIG. 65 is a bottom view of the same.

Figure 66:
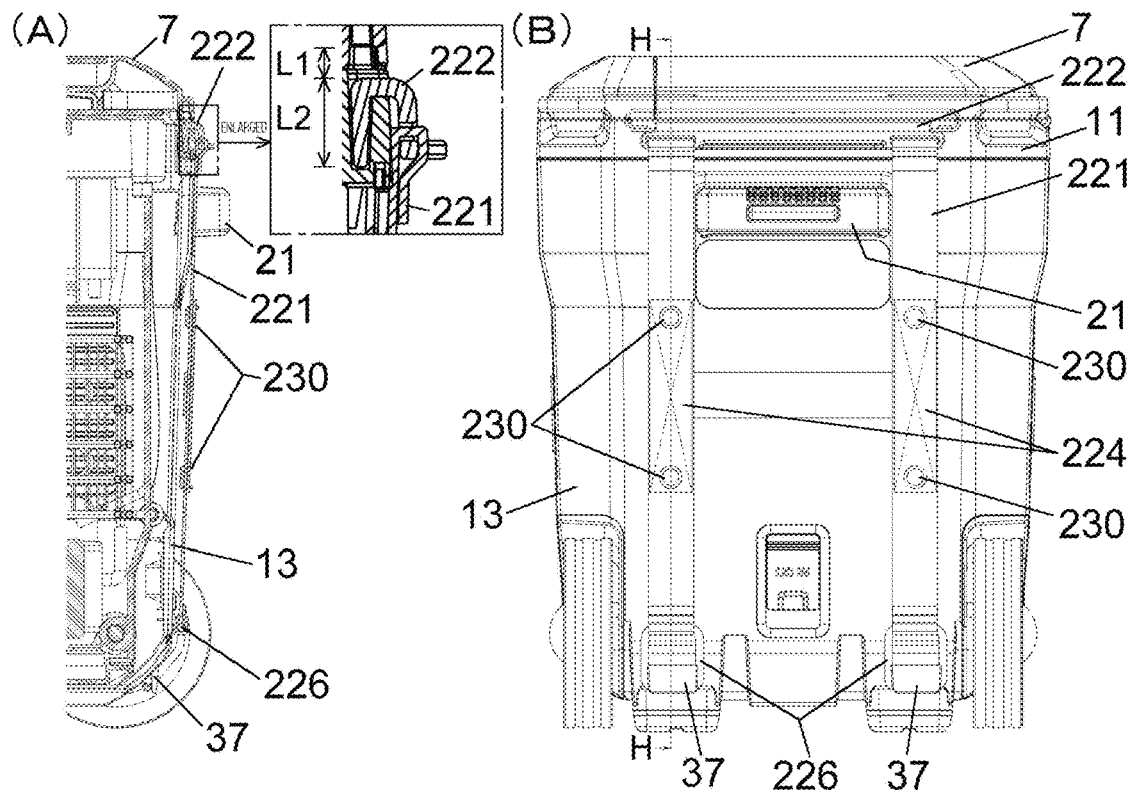

(A) of FIG. 66 is a front sectional view of the main parts (sectional view taken along the line H-H in (B) of FIG. 66). (B) of FIG. 66 is a view in which a bag 201 is removed in (B) of FIG. 64.

Figure 67:
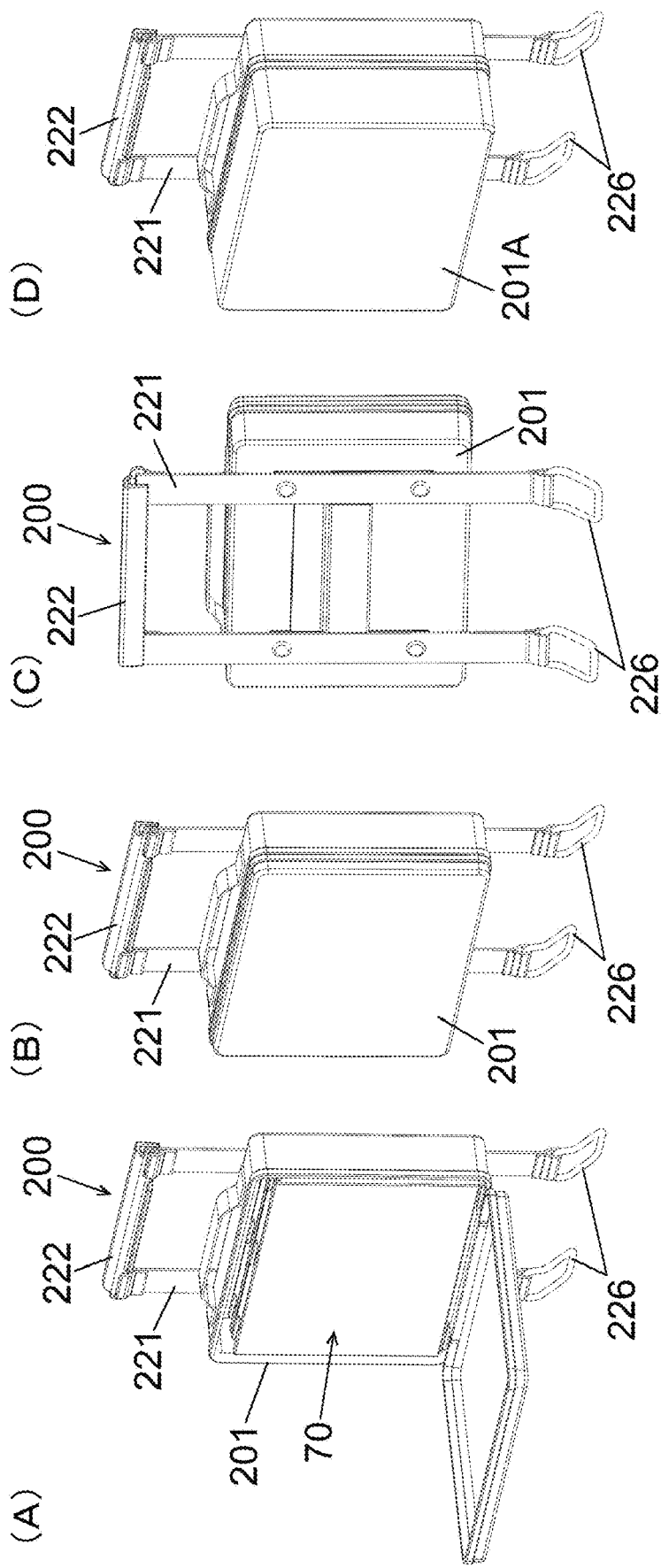

(A) of FIG. 67 is a perspective view of the storage unit 200 in a state in which the bag 201 is open. (B) of FIG. 67 is a perspective view of the storage unit 200 in a state in which the bag 201 is closed. (C) of FIG. 67 is a perspective view of the storage unit 200 viewed from the back side. (D) of FIG. 67 is a perspective view of a storage unit in which the bag 201 is replaced with a bag 201A.

Figure 68:
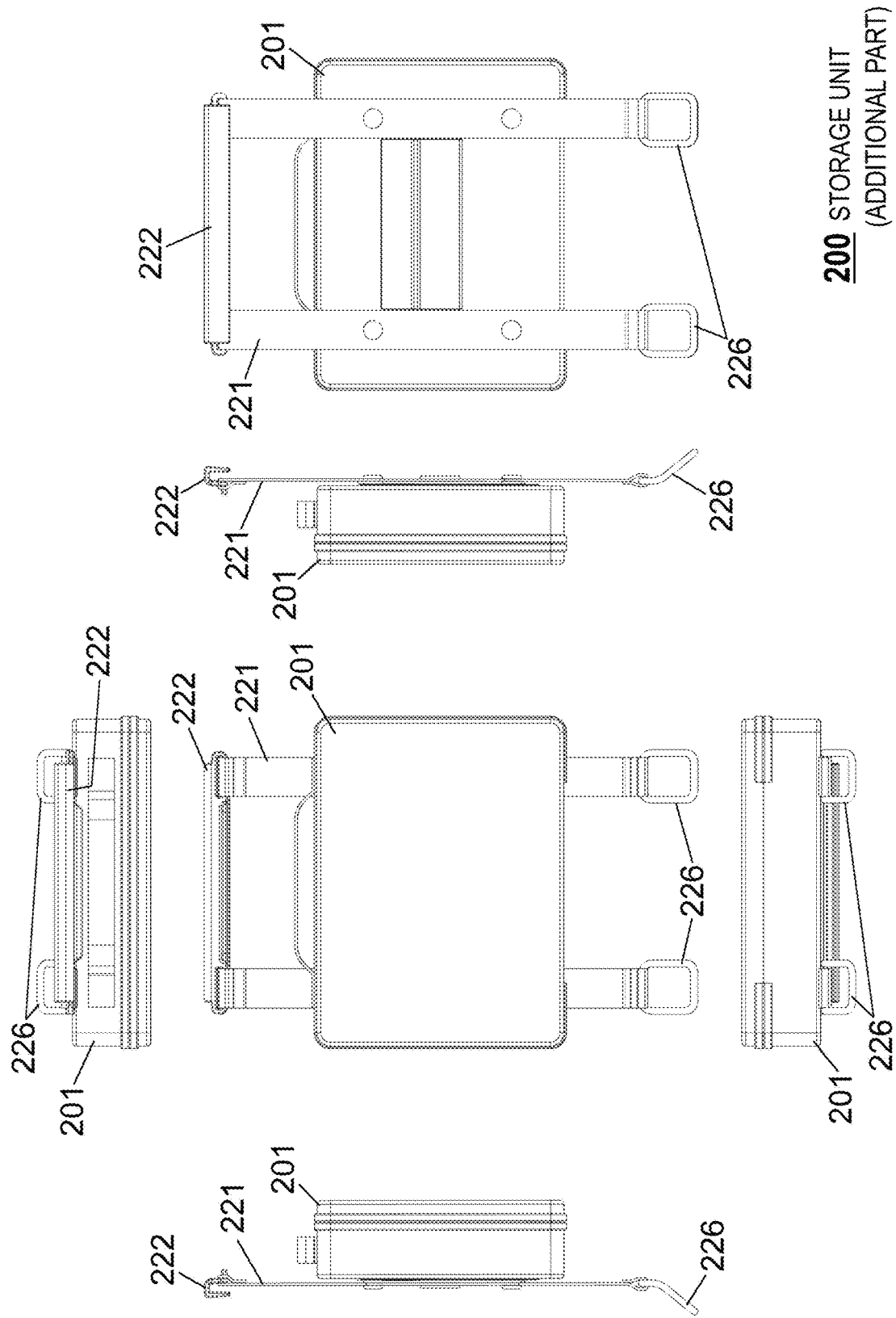

FIG. 68 is six views of the storage unit 200.

Figure 69:
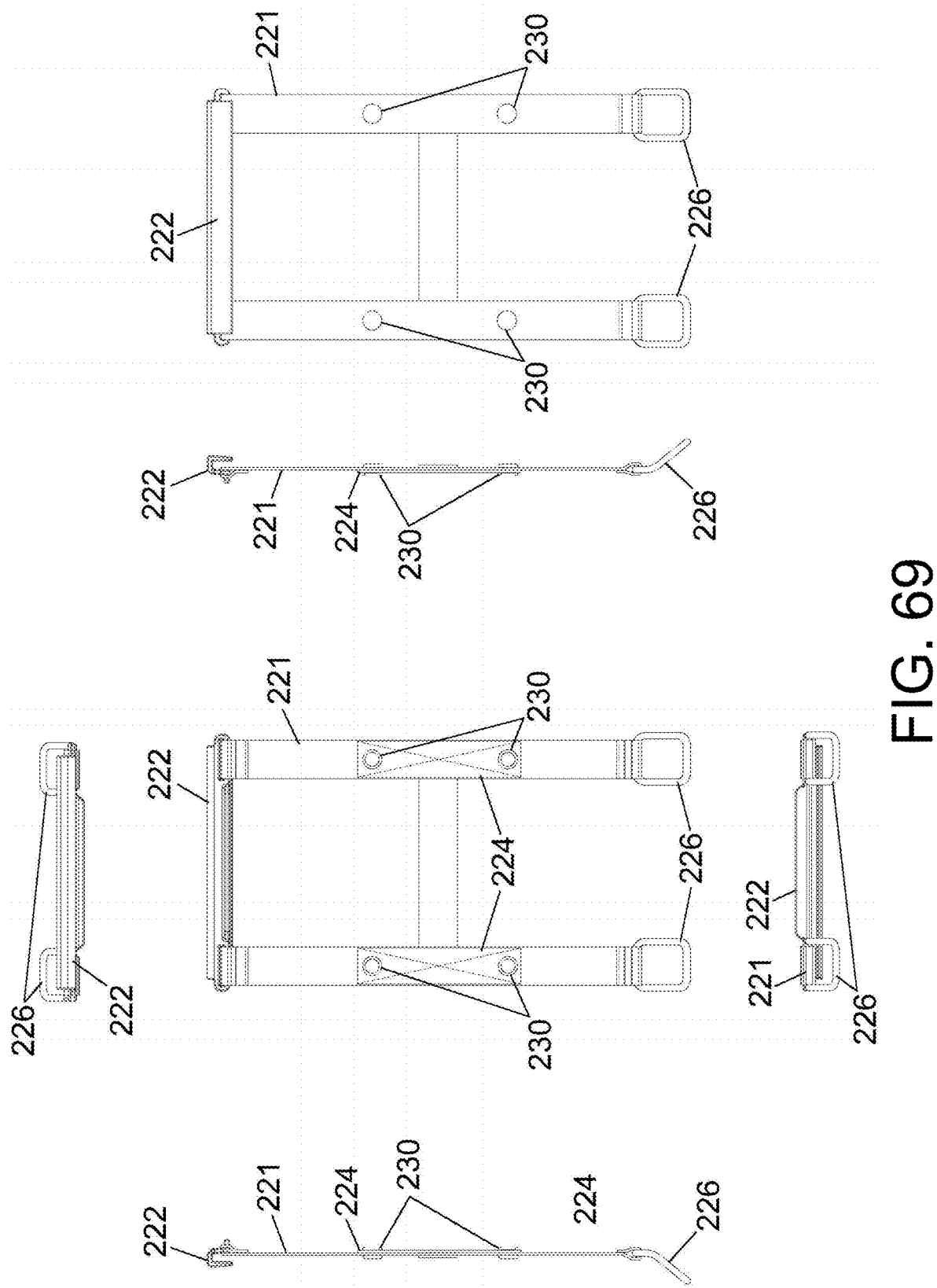

FIG. 69 is six views of a holder part of the storage unit 200.

Figure 70:
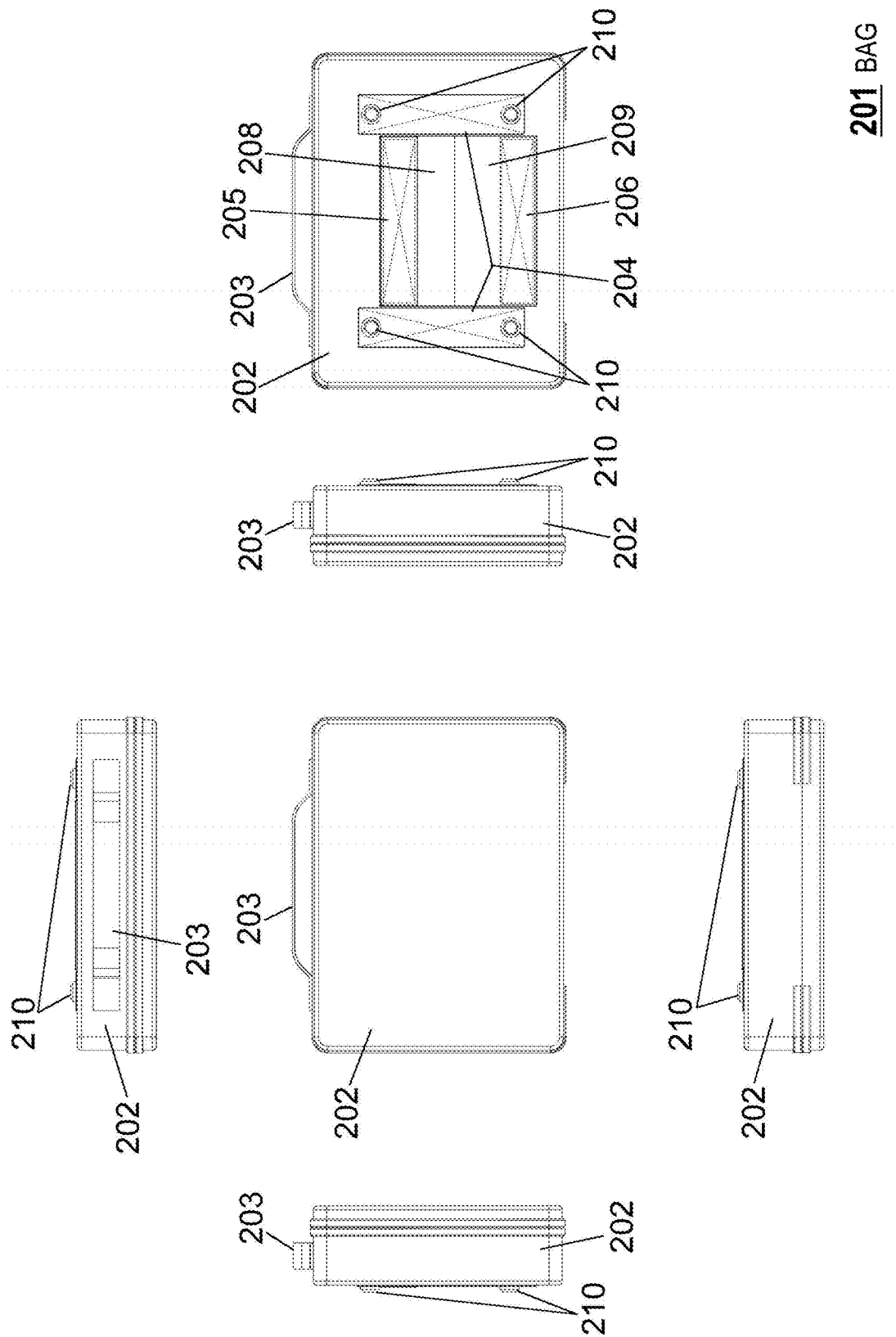

FIG. 70 is six views of the bag 201 of the storage unit 200.

Figure 71:
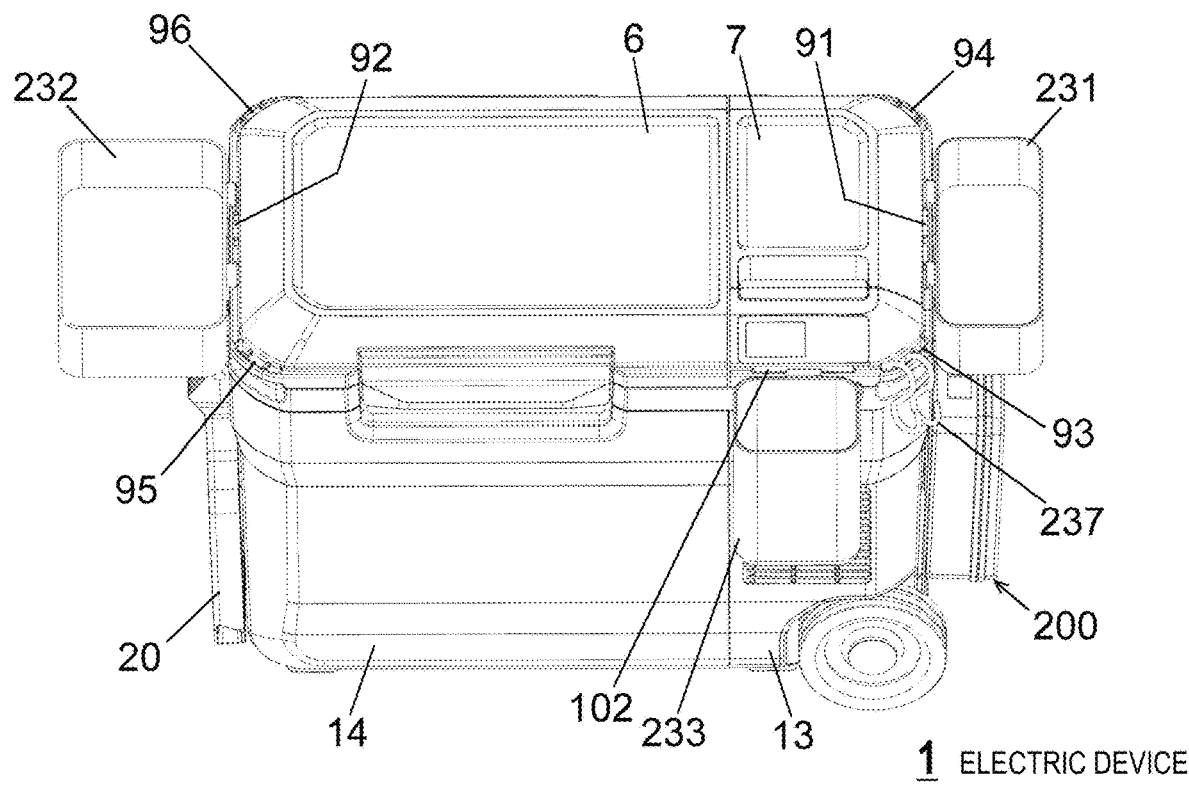

FIG. 71 is a perspective view of the electric device 1 to which the storage unit 200, accessory cases 231 to 233, and an S-shaped hook 237 are attached.

Figure 72:
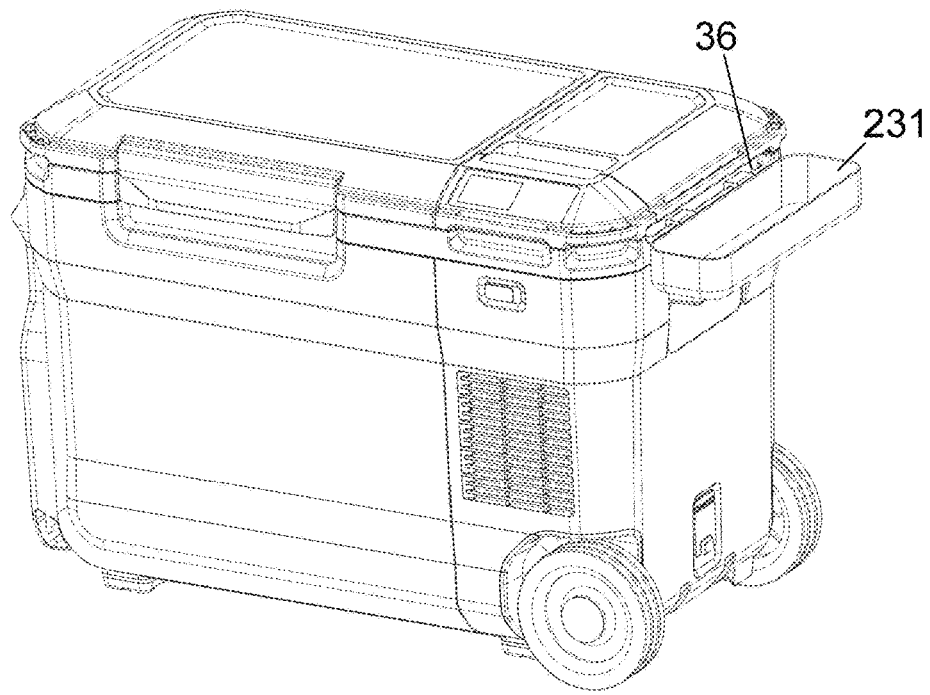

FIG. 72 is a perspective view of the electric device 1 in which the accessory case 231 is attached in place of the storage unit 200 in FIG. 63.

Figure 73:
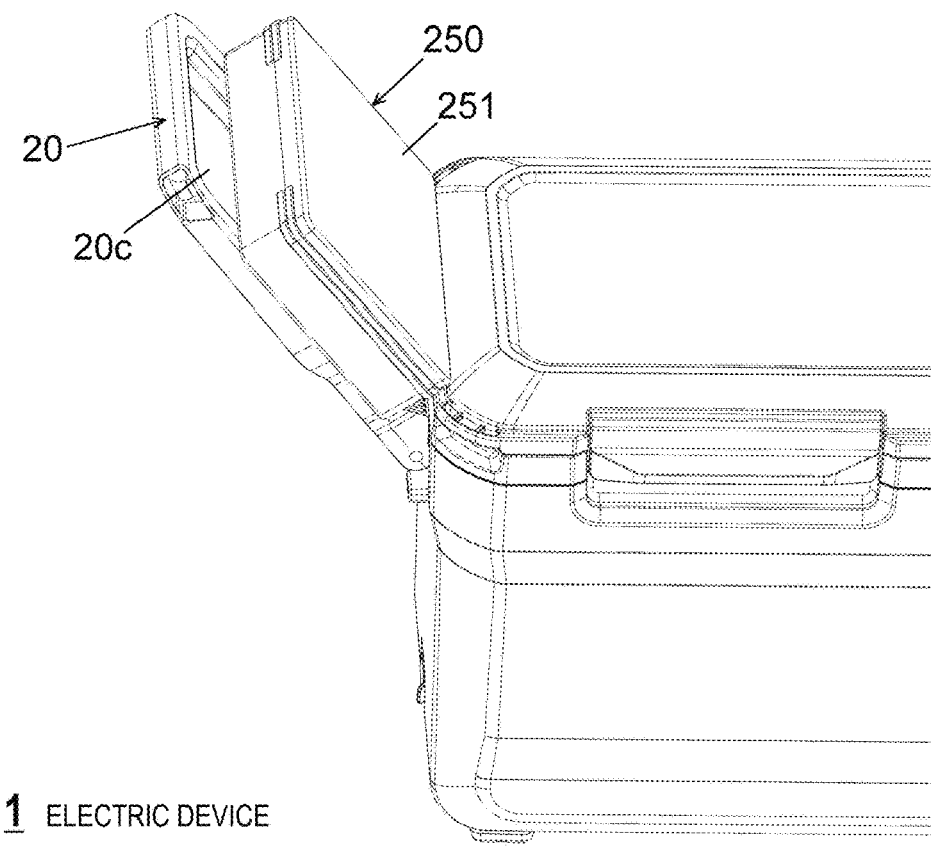

FIG. 73 is an upper perspective view of main parts of the electric device 1 in which a storage unit (additional part) 250 is attached to a movable handle 20.

Figure 74:
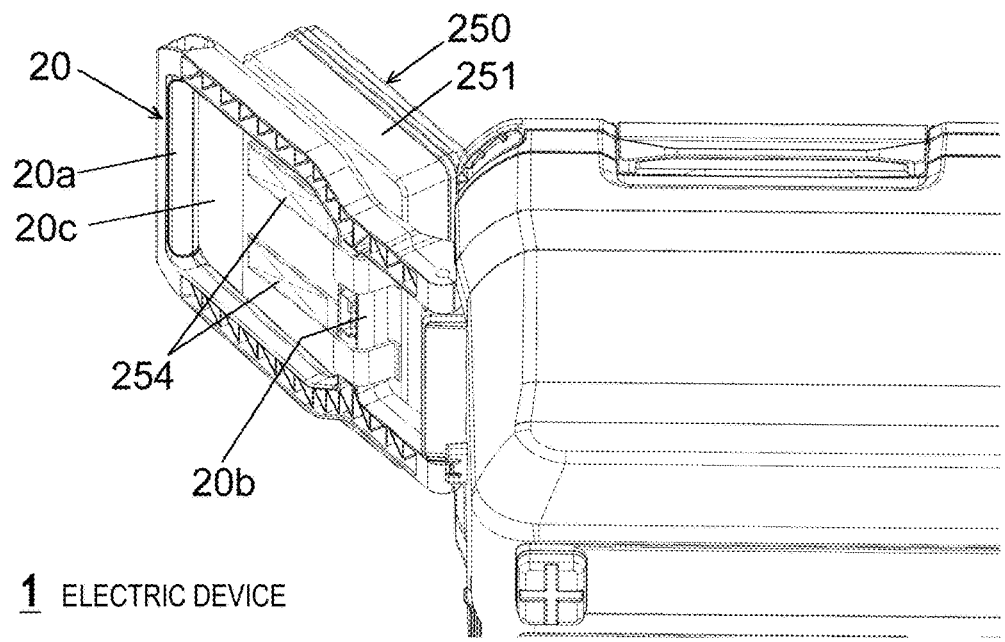

FIG. 74 is a lower perspective view of the same.

Figure 75:
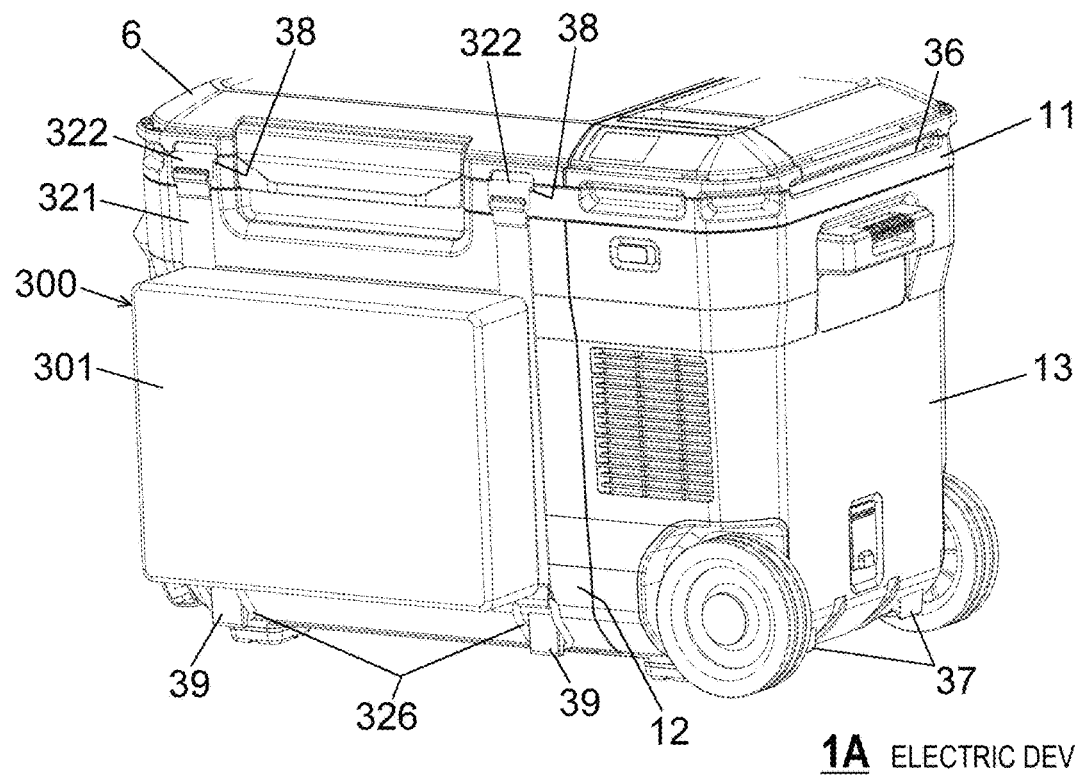

FIG. 75 is a perspective view of an electric device 1A having a storage unit (additional part) 300 attached to a front surface thereof according to another embodiment of the present invention.

Figure 76:
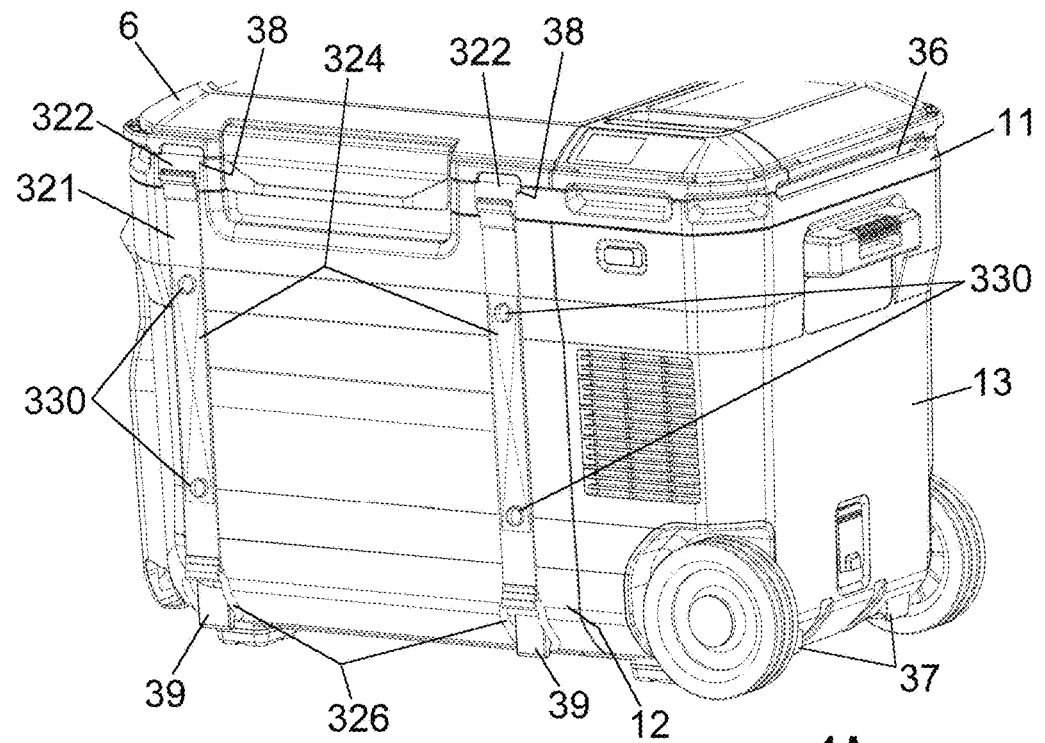

FIG. 76 is a view in which a bag 301 is removed in FIG. 75.

Figure 77:
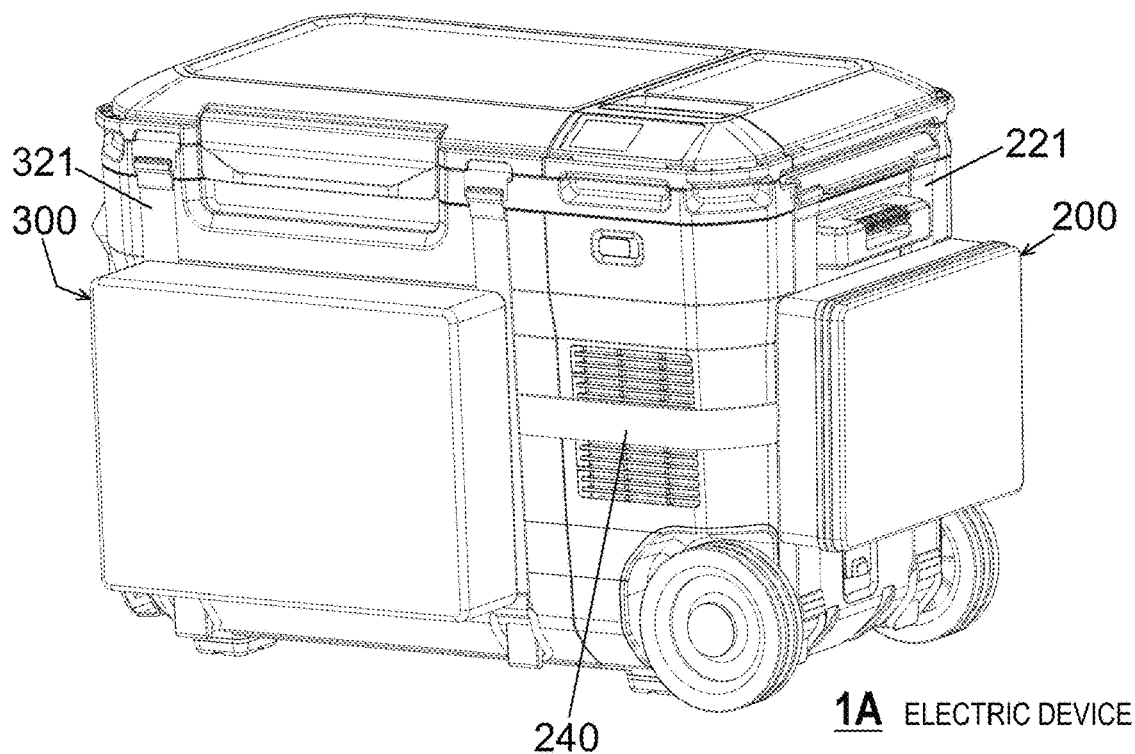

FIG. 77 is a front perspective view of the electric device 1A in which the storage unit 200 is attached to the right surface, the storage unit 300 is attached to the front surface, and the storage unit (additional part) 400 is attached to the rear surface.

Figure 78:
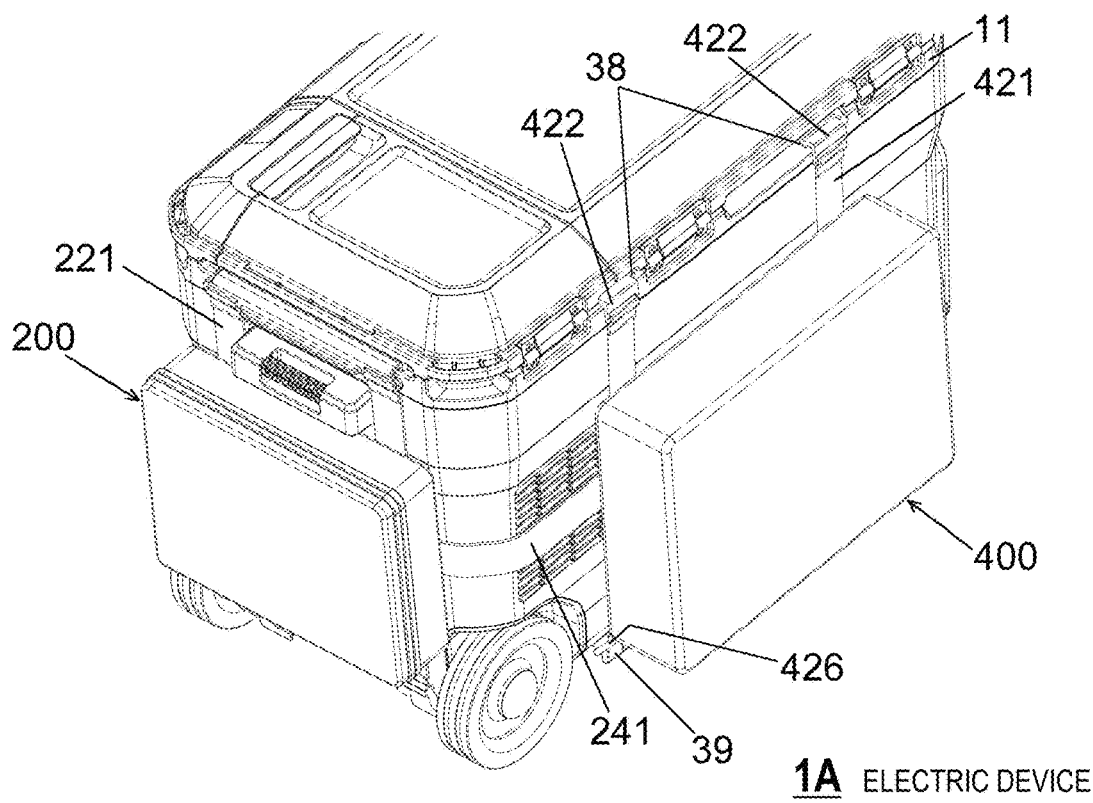

FIG. 78 is a rear perspective view of the same.

Figure 79:
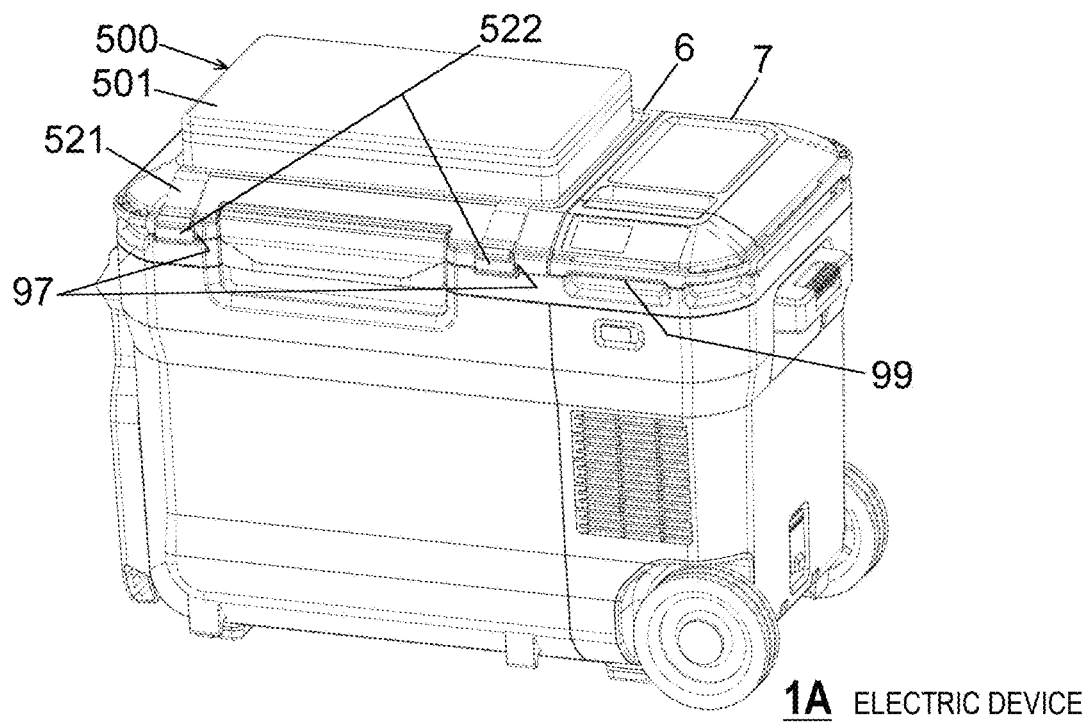

FIG. 79 is a front perspective view of the electric device 1A in which a storage unit (additional part) 500 is attached to an upper surface.

Figure 80:
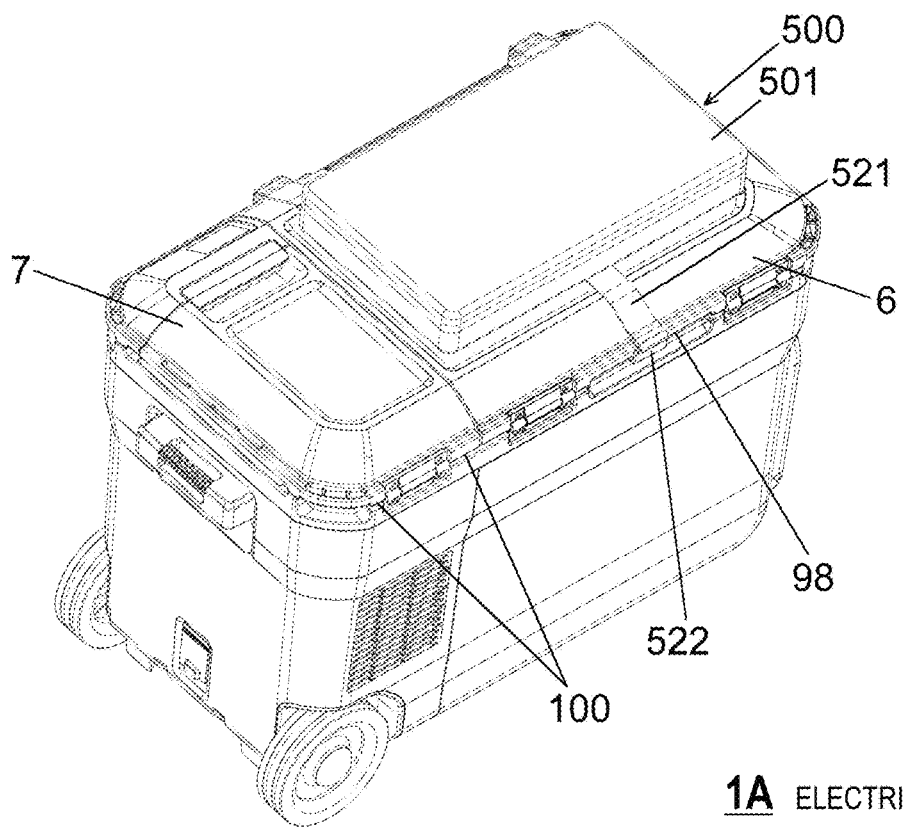

FIG. 80 is a rear perspective view of the same.

Figure 81:
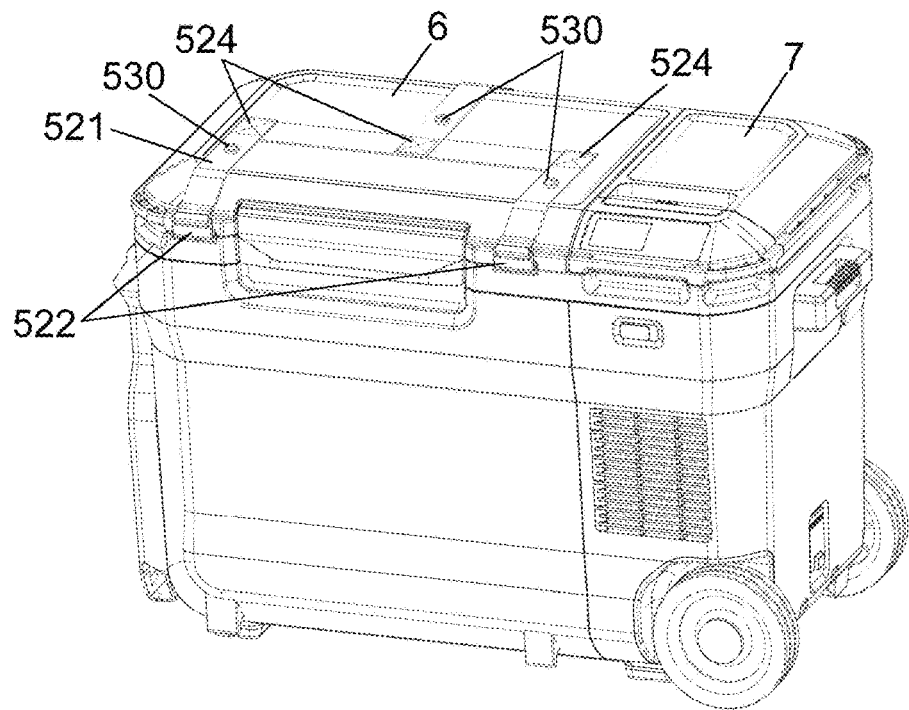

FIG. 81 is a view in which a bag 501 is removed in FIG. 79.

Figure 82:
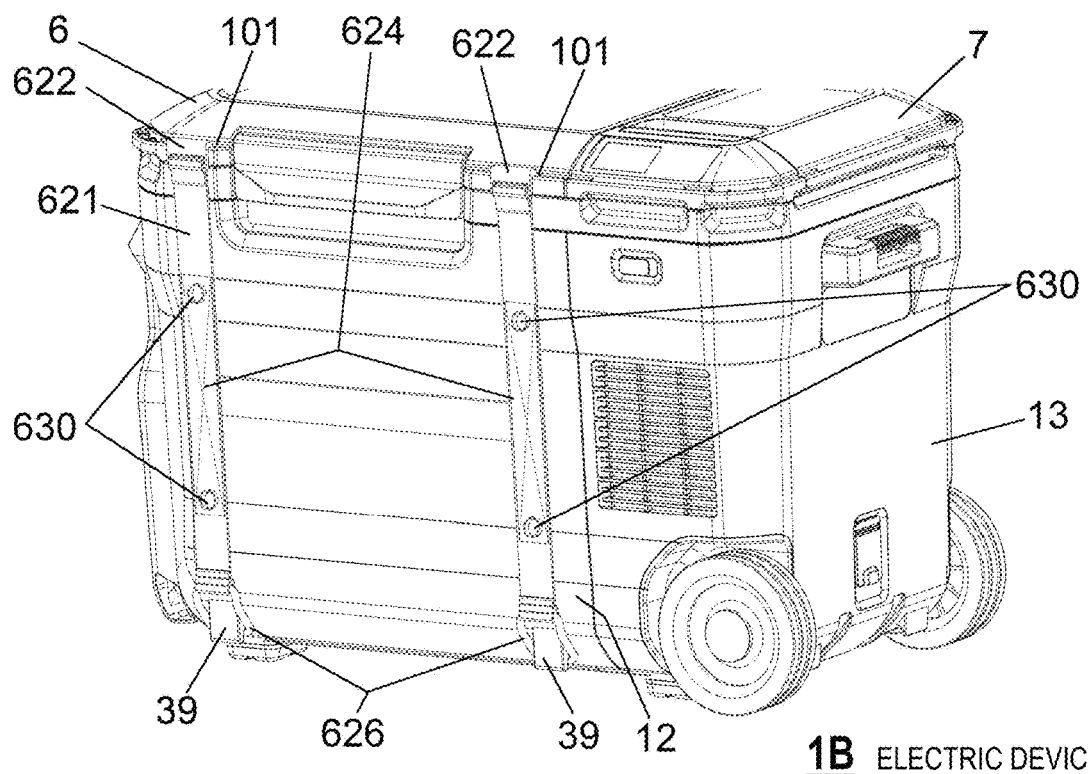

FIG. 82 is a perspective view of an electric device 1B according to still another embodiment of the present invention.

Figure 83:
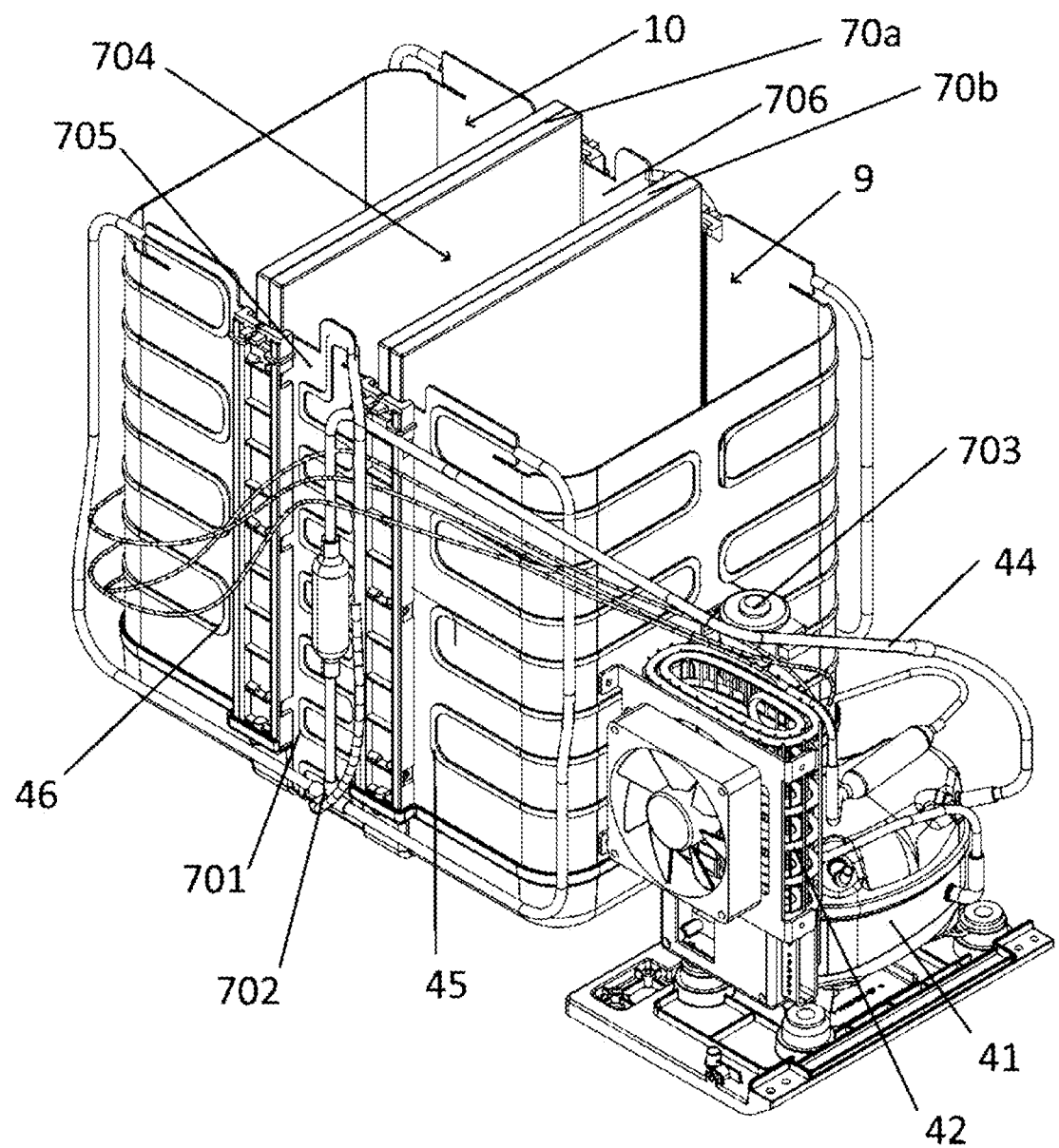

FIG. 83 is a perspective view of the inside of the electric device 1 in a state in which the accommodation chamber 8 is divided into three by using the partition plates 70a and 70b (three-room mode), viewed from the front upper right.

DESCRIPTION OF EMBODIMENTS

Hereinafter, the same or equivalent constituents, members, and the like illustrated in the respective drawings are denoted by the same reference numerals, and redundant description will be omitted as appropriate. The embodiments are illustrative rather than limiting of the invention. All features and combinations thereof described in the embodiments are not necessarily essential to the invention.

Figure 1:
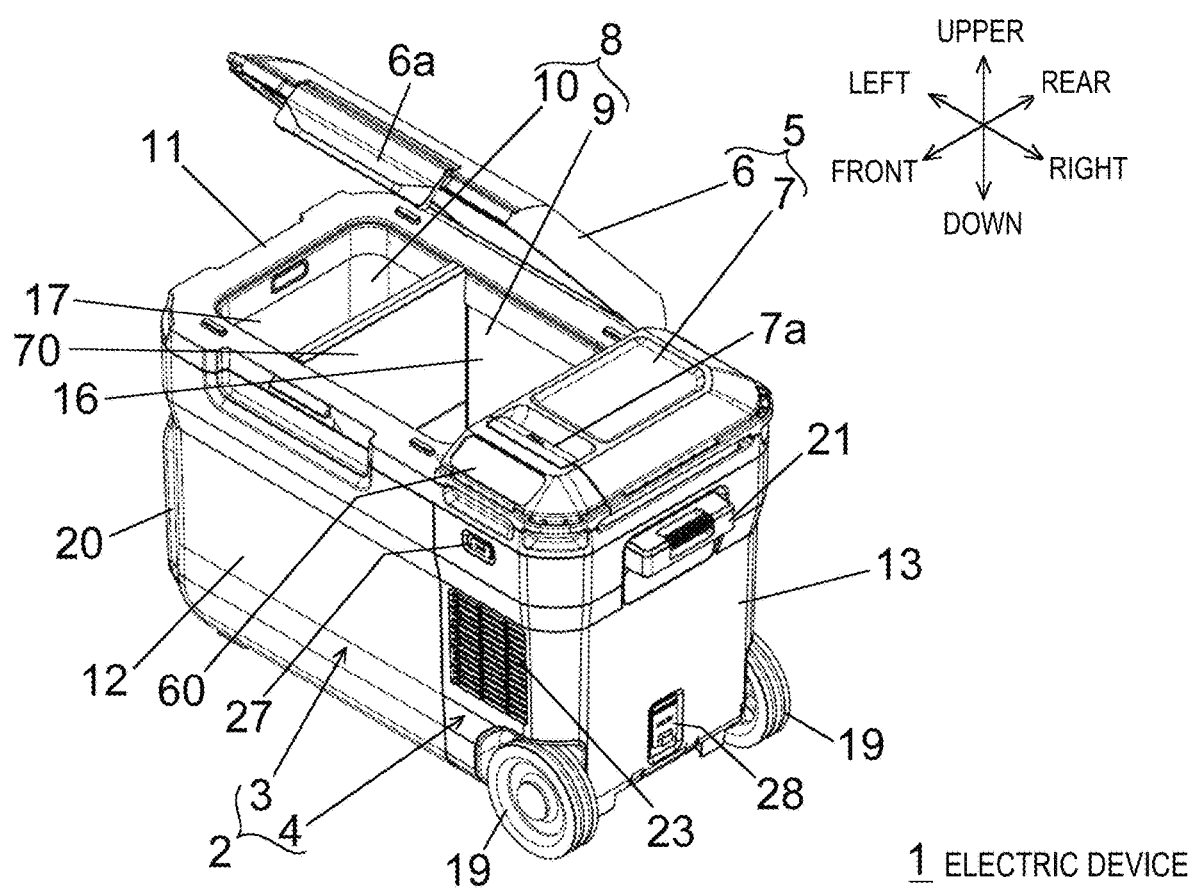
FIG. 1 is a perspective view of an electric device 1 according to an embodiment of the present invention, viewed from the front upper side, and is a perspective view illustrating a state in which a first lid 6 is open.

The present embodiment relates to an electric device 1. The electric device 1 is a portable cold-hot storage with cooling and heating functions. With reference to FIG. 1 and the like, front and rear, up and down, and left and right directions in the electric device 1 that are orthogonal to each other are defined. The front-rear direction is a depth direction (lateral direction) in the electric device 1, the left-right direction is a width direction (longitudinal direction) in the electric device 1, and the up-down direction is a height direction in the electric device 1.

The electric device 1 has a main body 2. The main body 2 has a first body part 3 and a second body part 4 different from the first body part 3. The first body part 3 and the second body part 4 are arranged in the left-right direction. The second body part 4 is located outside and to the right of the first body part 3.

The first body part 3 has a left outer box 12. The left outer box 12 is, for example, a resin molded body having an open top and a substantially rectangular parallelepiped shape, and constitutes the exterior of the first body part 3. The second body part 4 has a right outer box 13. The right outer box 13 is, for example, a resin molded body having open top and left side and a substantially rectangular parallelepiped shape, and constitutes the exterior of the second body part 4. The right outer box 13 is fixed and integrated with a right side surface of the left outer box 12 by screws or the like.

Figure 10:
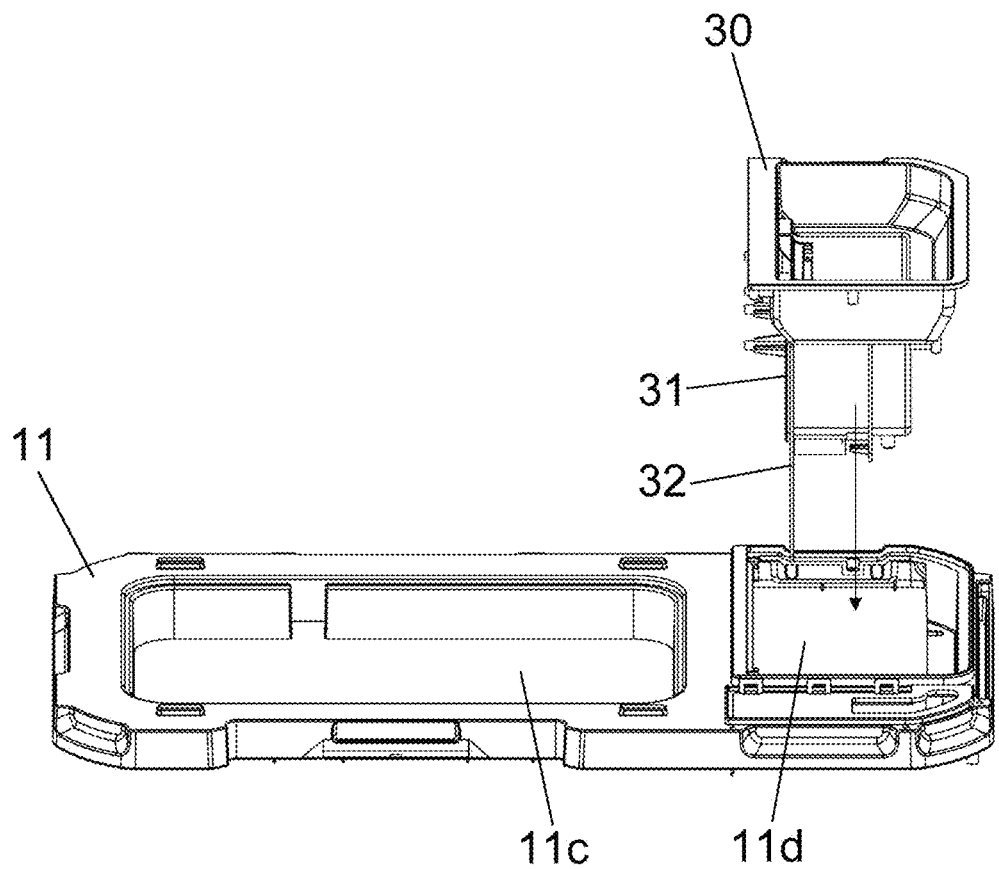
FIG. 10 is a drawing for describing attaching a battery box 30 to a main frame 11 in the electric device 1.

The main body 2 has a main frame 11. The main frame 11 is, for example, a resin molded body. The main frame 11 is a frame extending over upper parts of the first body part 3 and the second body part 4, and has openings 11*c* and 11*d* respectively corresponding to the first body part 3 and the second body part 4 as illustrated in FIG. 10.

The electric device 1 has a lid 5. The lid 5 is provided on the upper part of the main body 2 and can be opened and closed with respect to the main body 2. The lid 5 has a first lid 6 that opens and closes the first body part 3 and a second lid 7 that opens and closes the second body part 4 (opens and closes a battery pack accommodation chamber 22).

Figure 5:
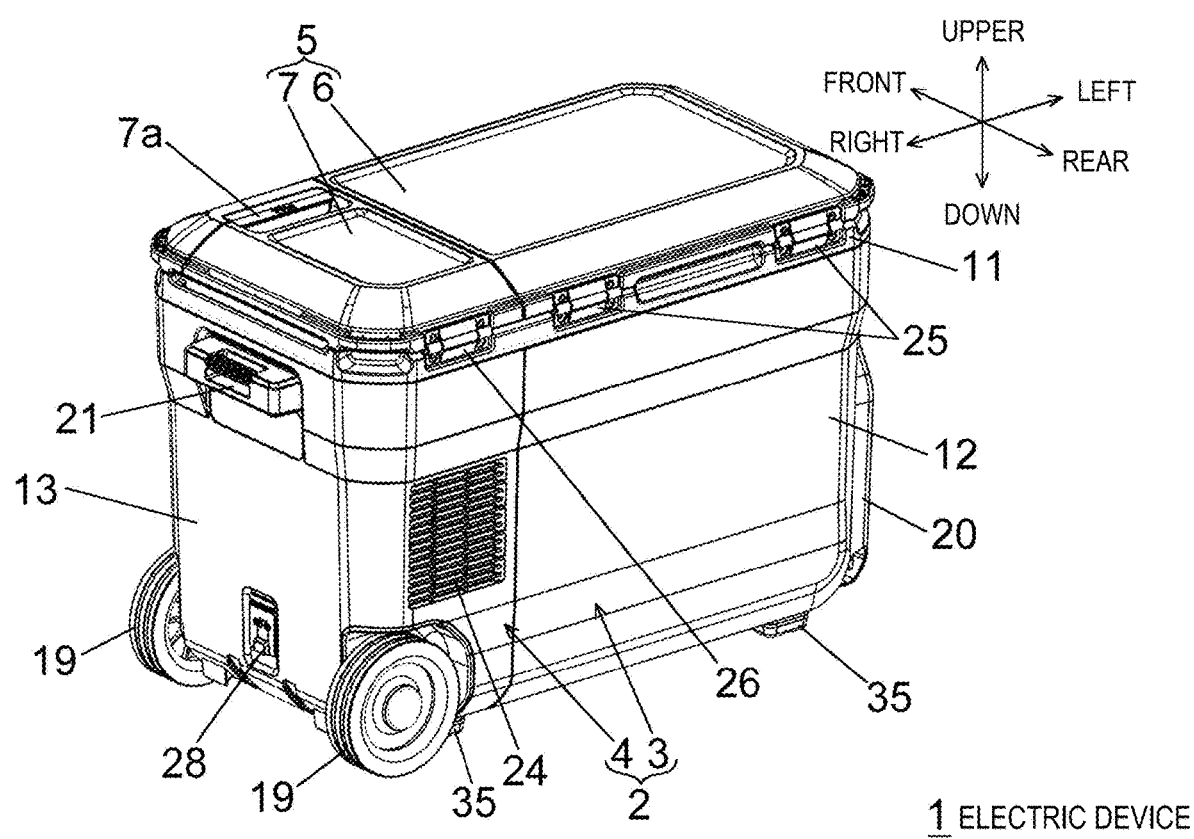
FIG. 5 is a perspective view of the electric device 1 viewed from the rear upper right.
Figure 6:
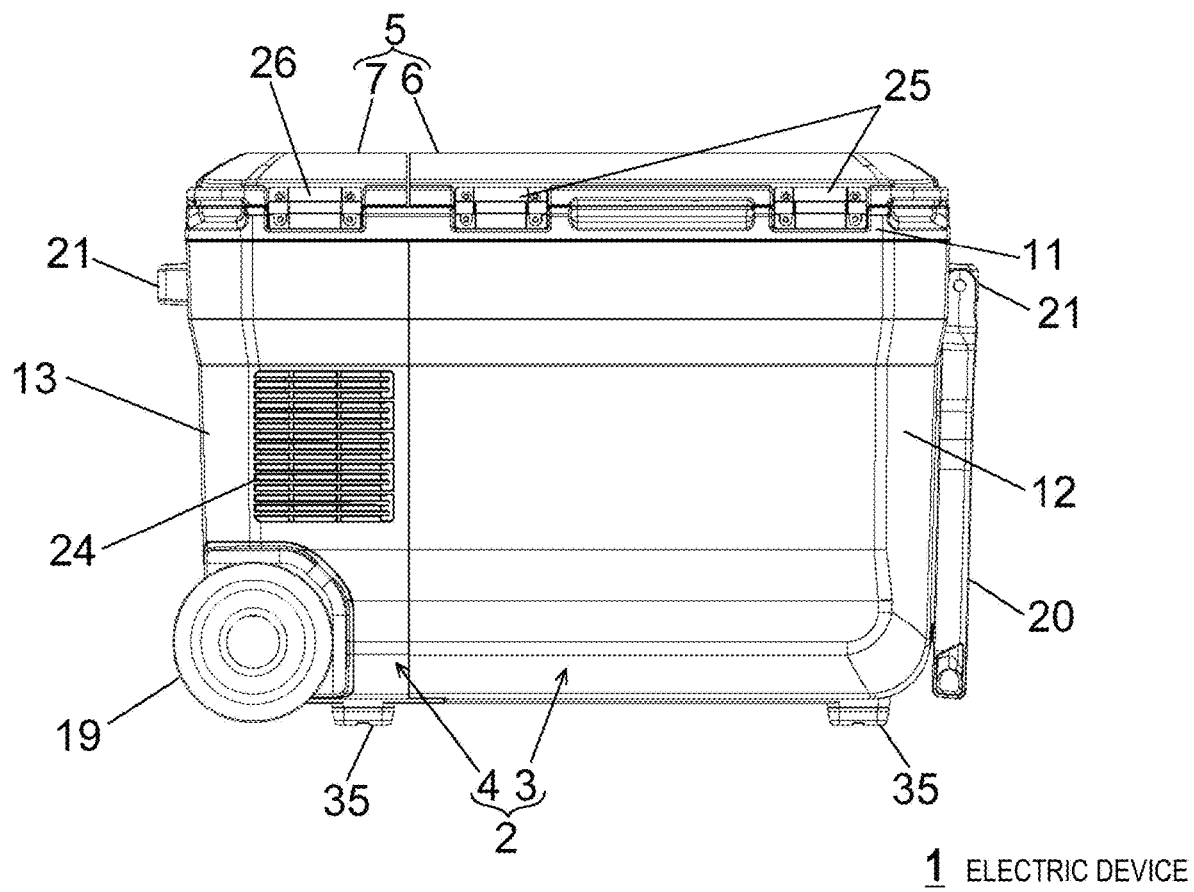
FIG. 6 is a rear view of the electric device 1.
Figure 7:
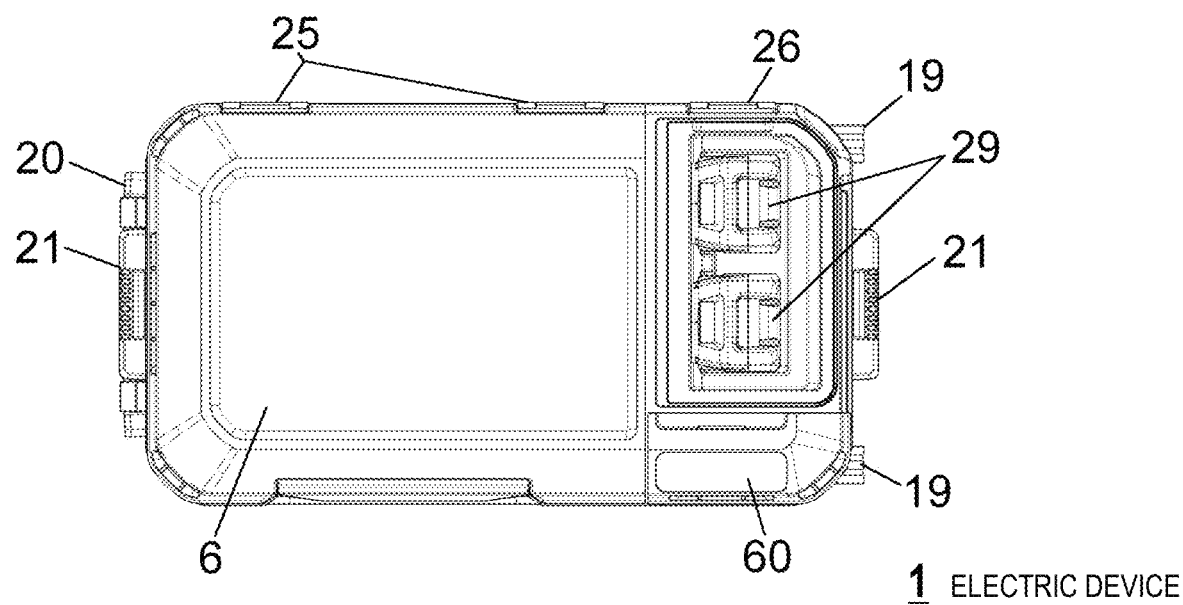
FIG. 7 is a plan view of the electric device 1 and is a plan view in which the second lid 7 is omitted.

The first lid 6 is rotatably connected to a rear end of the main frame 11 by a first hinge mechanism 25, as illustrated in FIG. 5 and the like. The first lid 6 has a grip part 6*a*. A user releases locking of the first lid 6 to the main frame 11 by rotating forward the grip part 6*a* of the first lid 6 in a closed state illustrated in FIG. 3, and opens the first lid 6 while holding the grip part 6*a* as illustrated in FIG. 1.

Figure 3:
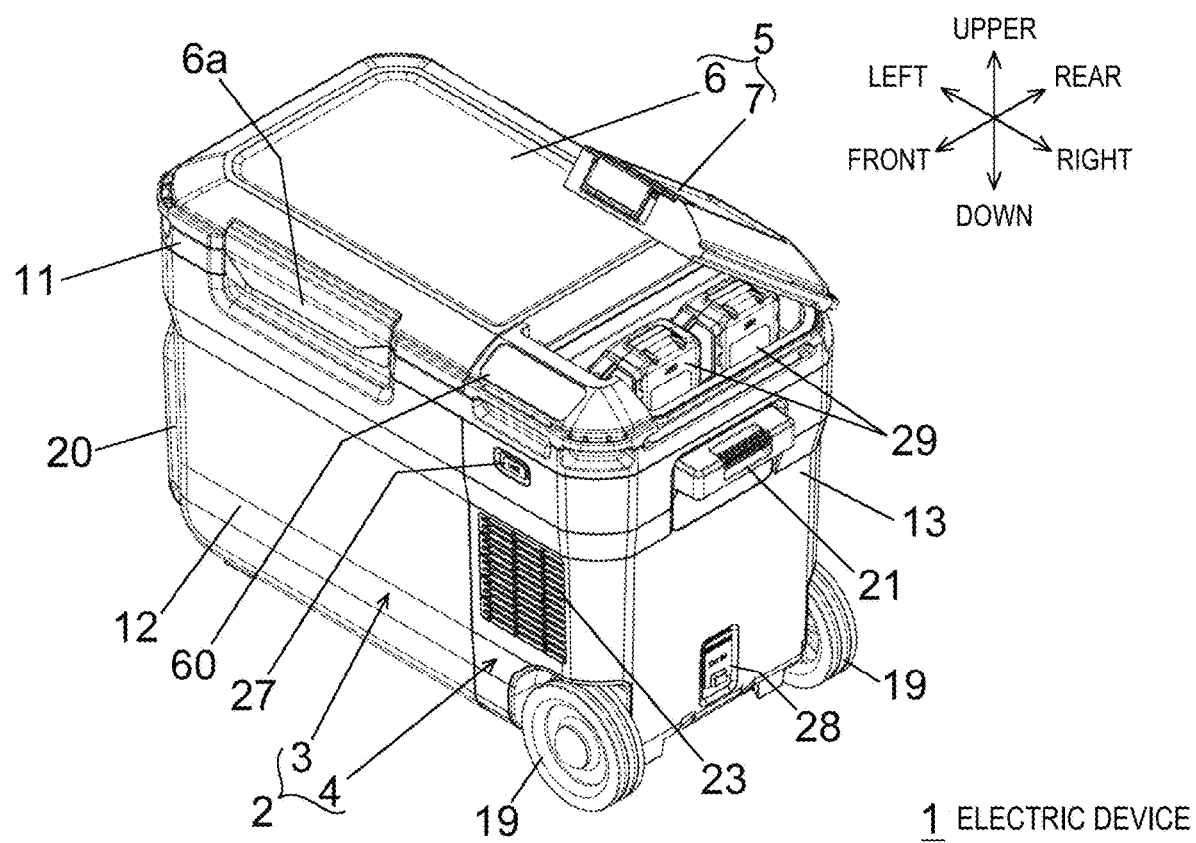
FIG. 3 is a perspective view of the electric device 1 viewed from the front upper right, and is a perspective view illustrating a state in which a second lid 7 is open.

The second lid 7 is rotatably connected to a rear end of the main frame 11 by a second hinge mechanism 26 as illustrated in FIG. 5 and the like. The second lid 7 has a grip part 7*a*. A user releases locking of the second lid 7 by rotating upward the handle 7*a* of the second lid 7 in a closed state illustrated in FIG. 1, and opens the second lid 7 while holding the handle 7*a* as illustrated in FIG. 3.

The electric device 1 includes a pair of left and right grip parts 21 and a plurality of (for example, four) legs 35 that serve as grounding parts on the bottom. A user can move the electric device 1 by holding the left and right grip parts 21 and lifting the electric device 1.

The electric device 1 has casters 19 and a movable handle (carry handle) 20. The casters 19 are provided at the front and rear of the lower right part of the main body 2, respectively. A rotation axis direction of the caster 19 is parallel to the left-right direction. The movable handle 20 is rotatably provided on the left side surface of the main body 2. A rotation axis direction of the movable handle 20 is parallel to the left-right direction. A user can move the electric device 1 by using the casters 19 by rotating the movable handle upward, holding the movable handle 20 and lifting the left part of the main body 2 from the ground.

The electric device 1 includes a USB terminal 27 and a power input terminal 28 on the second body part 4. The electric device 1 can supply charging power to a device connected to the USB terminal 27. The electric device 1 can receive DC power from the outside via the power input terminal 28. The electric device 1 is operated with the DC power or the power of a battery pack 29.

The first body part 3 has an accommodation chamber (accommodation section) 8. The accommodation chamber 8 has a first accommodation chamber 9 which is a large room and a right room, and a second accommodation chamber 10 which is a small room and a left room. The first accommodation chamber (first accommodation section) 9 and the second accommodation chamber (second accommodation section) 10 are adjacent to each other and separated (partitioned) by a detachable partition plate 70.

Figure 15:
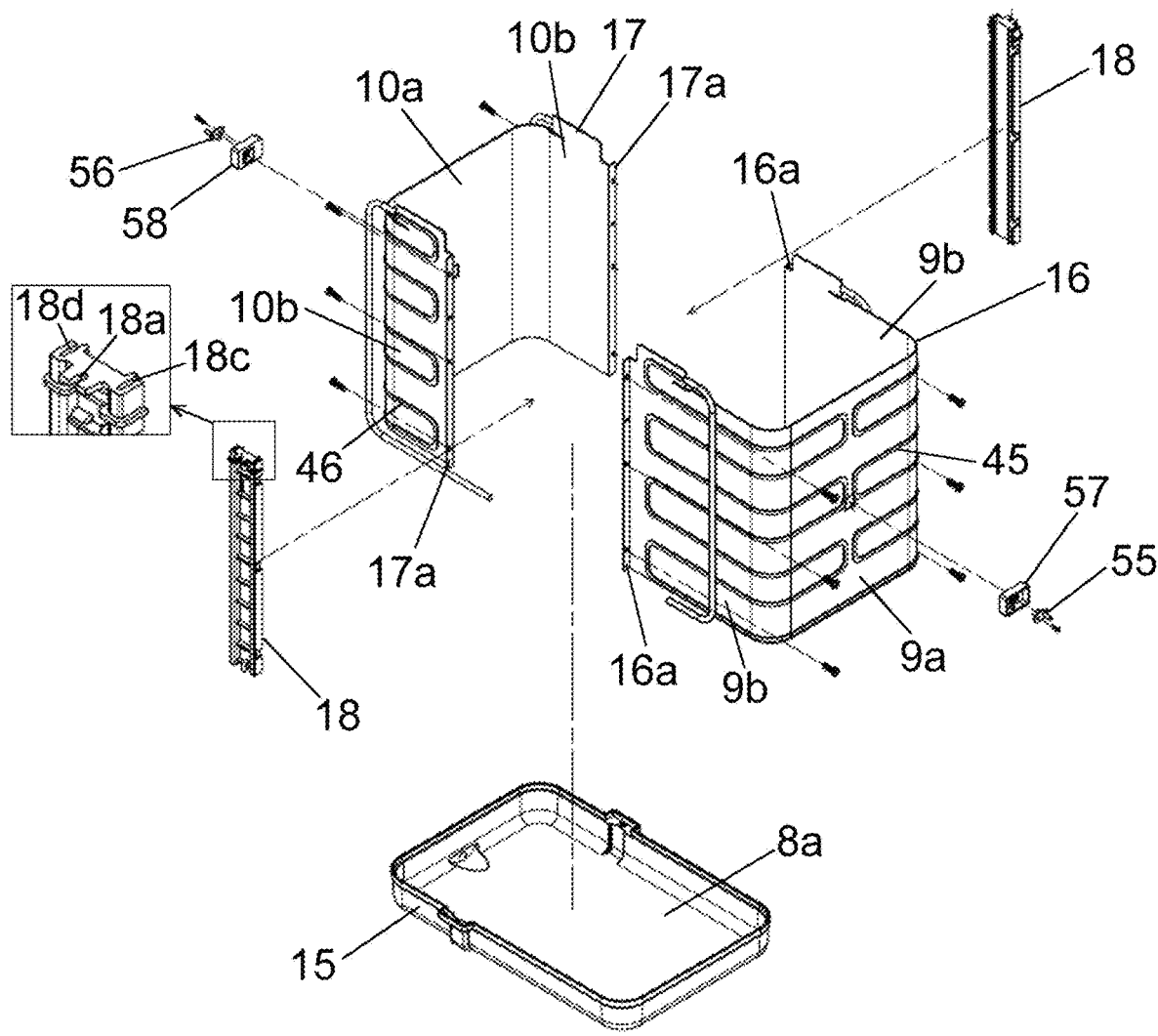
FIG. 15 is a drawing for describing an assembly of a bottom member 15, a right-side member 16, a left-side member 17, and a rail member 18 in the electric device 1.

The first body part 3 has a bottom member 15, a right-side member 16, a left-side member 17, and a rail member 18 illustrated in FIG. 15 and the like, which are constituents of the accommodation chamber 8. The bottom member 15 is, for example, a resin molded body, and constitutes the bottom surface of the accommodation chamber 8. The right-side member 16 and the left-side member 17 are each made of metal (metal plate) such as aluminum and are U-shaped when viewed from above. The right-side member 16 constitutes the side surface of the first accommodation chamber 9. The left-side member 17 constitutes the side surface of the second accommodation chamber 10.

A first side surface 9*a* of the first accommodation chamber 9 is a right side surface of the first accommodation chamber 9 and a side surface that is the farthest from the second accommodation chamber 10. A second side surface 9*b* of the first accommodation chamber 9 is a front surface and a rear surface of the first accommodation chamber 9 and is a side surface connected to the first side surface 9*a*. A first side 10*a* of the second accommodation chamber 10 is a left side surface of the second accommodation chamber and a side surface that is the farthest from the first accommodation chamber 9. The second side surface 10*b* of the second accommodation chamber 10 is a front surface and a rear surface of the second accommodation chamber 10, and is a side surface connected to the first side surface 10*a*.

As illustrated in FIG. 15 and (B) of FIG. 25, the right-side member 16 has outwardly bent part 16*a* at each of a pair of left ends. The left-side member 17 has an outwardly bent part 17*a* at each of a pair of right ends. The outwardly bent parts 16*a* and 17*a* each extend in the up-down direction.

The pair of rail members 18 has groove parts 18*c* and 18*d* into which the outwardly bent parts 16*a* and 17*a* are fitted (engaged), respectively. The rail members 18 are fixed and integrated with the right-side member 16 and the left-side member 17 (to the outwardly bent parts 16*a*, 17*a*) by screws or the like in a state in which the outwardly bent parts 16*a* and 17*a* are fitted in the groove parts 18*c* and 18*d*. That is, the rail members 18 also have a function of connecting the right-side member 16 and the left-side member 17. The rail member 18 has a notch 18*a* for screwing to the main frame 11. The notch 18*a* communicates with a boss 11*b* (FIG. 11) of the main frame 11. The rail member 18 is fixed to the main frame 11 by a screw (not illustrated) screwed into the boss 11*b* through the notch 18*a*.

The rail member 18 has a recessed part (recessed groove) 18*b* extending in the up-down direction. The recessed part 18b constitutes a recessed part on the inner surface of the accommodation chamber 8 and serves as a guide in a case where the partition plate 70 is attached and detached. The front rail member 18 does not protrude rearward from the inside of the front surfaces of the right-side member 16 and the left-side member 17, that is, the inside of the front surface of the accommodation chamber 8. The rear rail member 18 does not protrude forward from the inside of the rear surfaces of the right-side member 16 and the left-side member 17, that is, the inside of the rear surface of the accommodation chamber 8.

The right-side member 16, the left-side member 17, and the rail member 18 that are combined with each other are fitted into the bottom member 15 from above to form an inner box of the first body part 3. A heat insulating material (not illustrated) is filled between the inner box and the left outer box 12. This heat insulating material hardens after filling the heat insulating material, and thus also serves to fix the inner box to the left outer box 12 to further fix the main frame 11.

As illustrated in FIG. 15, the electric device 1 includes a first thermistor 55 as a first temperature sensor and a first holder 57 holding the first thermistor, and a second thermistor 56 as a second temperature sensor and a second holder 58 holding the second thermistor. The first holder 57 is fixed to a substantially central part of the right side surface of the right-side member 16 by screws or the like. The first thermistor 55 detects the temperature inside the right-side member 16, that is, inside the first accommodation chamber 9. The second holder 57 is fixed to a substantially central part of the left side surface of the left-side member 17 by screws or the like. The second thermistor 56 detects the temperature inside the left-side member 17, that is, inside the second accommodation chamber 10. The electric device 1 may include a third temperature sensor that detects the temperature outside the first accommodation chamber 9 and the second accommodation chamber 10, that is, the outside air temperature.

Figure 4:
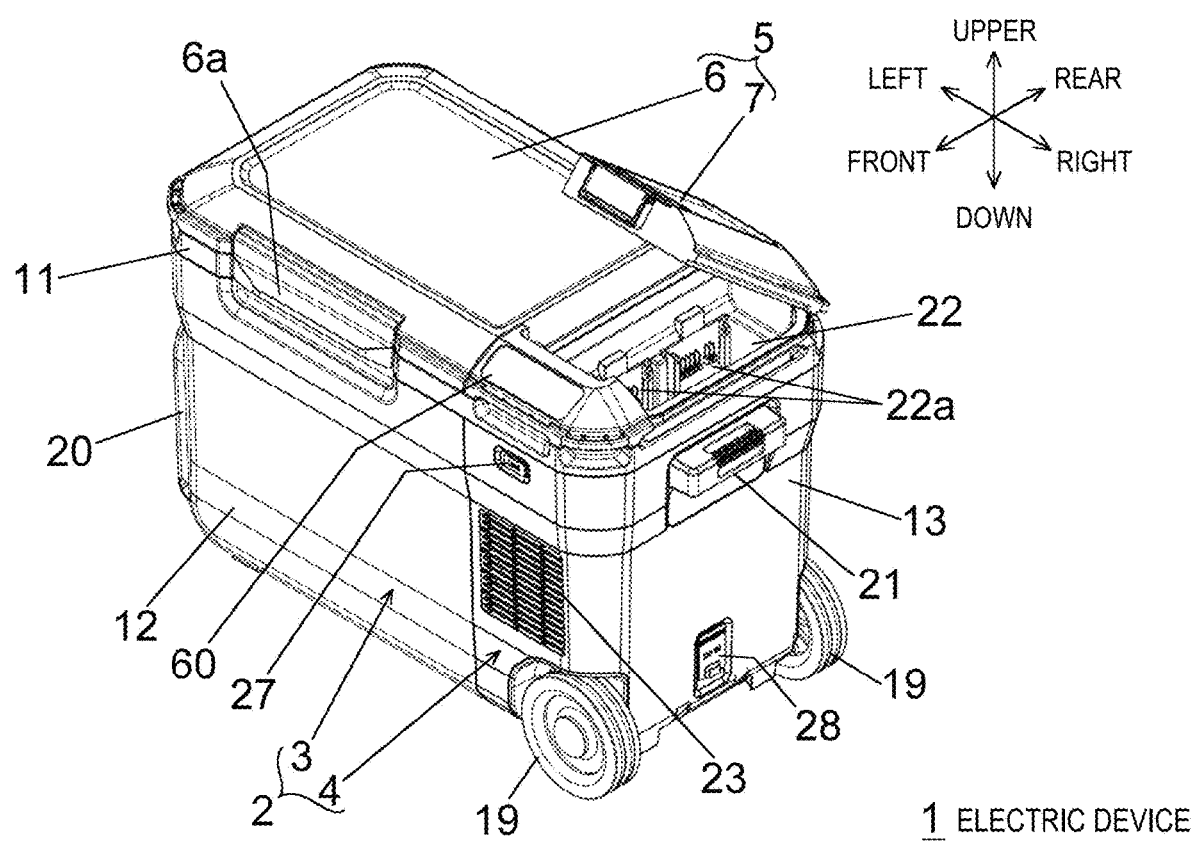
FIG. 4 is a perspective view of the electric device 1 viewed from the front upper right, and is a perspective view illustrating a state in which the battery pack 29 detached from the state in FIG. 3.

The second body part 4 has a battery pack accommodation chamber 22 as illustrated in FIG. 4. The battery pack accommodation chamber 22 has two battery pack attachment parts 22a (battery pack connection parts). As illustrated in FIG. 3, the battery pack 29 can be detachably attached (connected) to each battery pack attachment part 22a. The battery pack 29 is, for example, a battery pack for power tools with a rated output voltage of 18 V. The battery pack accommodation chamber 22 is a space formed by a battery box 30 and a battery terminal 31 illustrated in FIG. 10 and the like.

Figure 11:
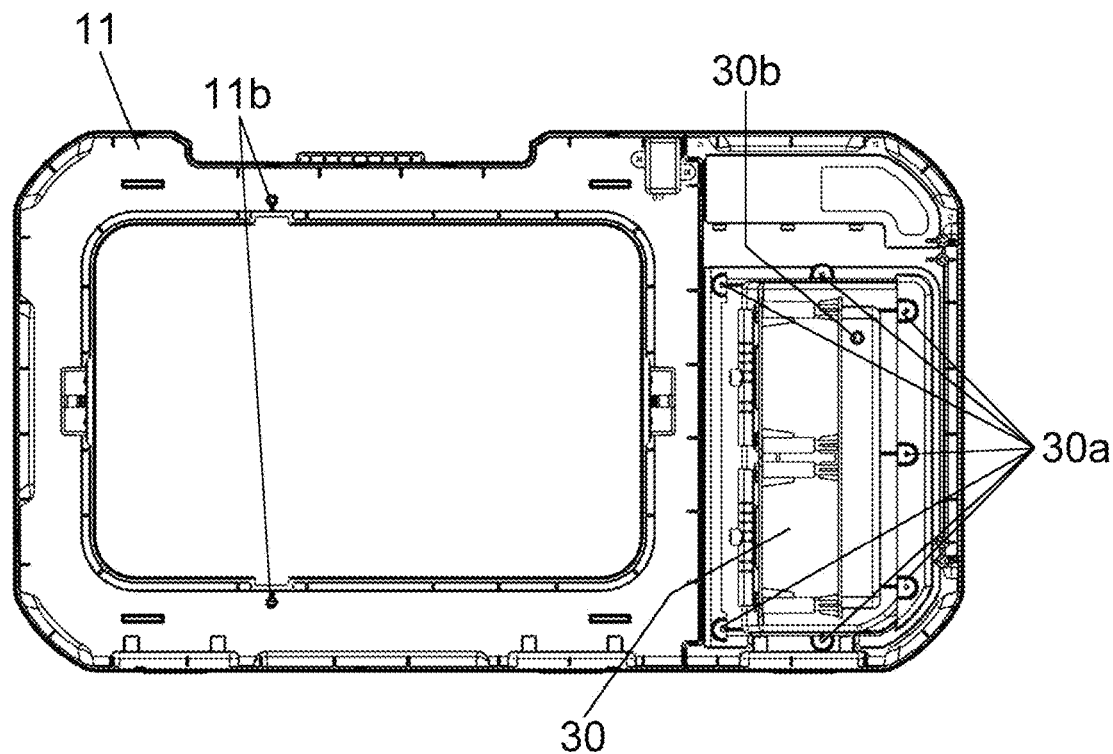
FIG. 11 is a bottom view of the main frame 11 to which the battery box 30 is attached.

The battery box 30 is, for example, a resin molded body. The battery terminal 31 is, for example, a resin molded body that holds a connection terminal with the battery pack 29. As illustrated in FIG. 10, the battery box 30 is inserted into the opening 11d of the main frame 11 from above and fixed to the main frame 11 with screws. As illustrated in FIG. 11, the battery box 30 has bosses 30a for screwing to the main frame 11. A bottom surface of the battery box 30 is provided with a drain hole 30b.

Figure 14:
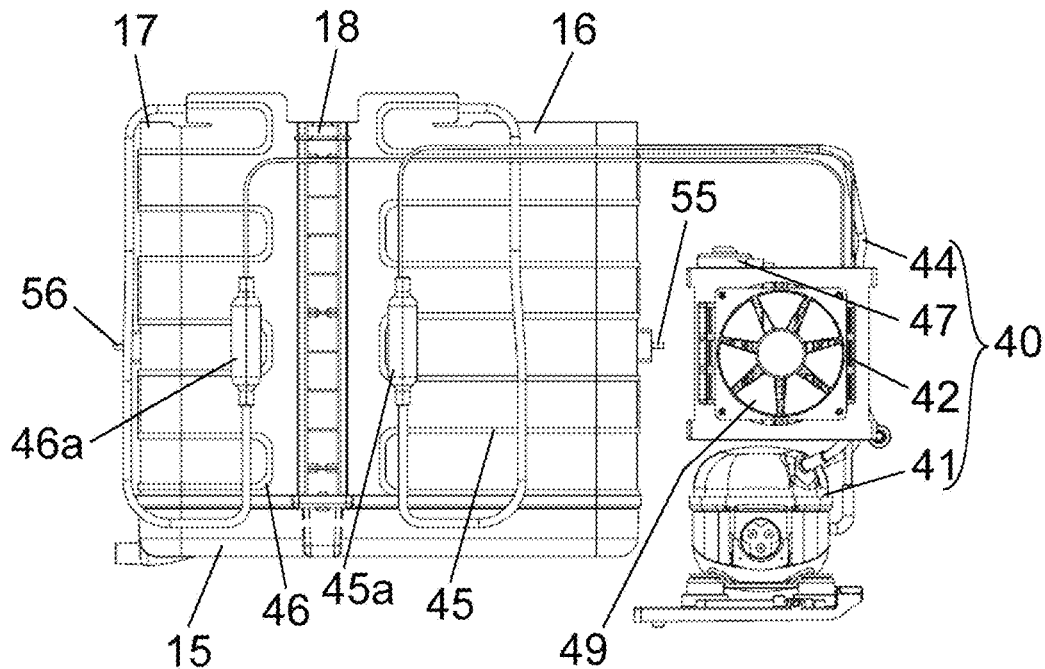
FIG. 14 is a front view of the inside of the electric device 1 and is a front view in which a heating mechanism 50 is omitted.

As illustrated in FIG. 14, the electric device 1 has a cooling mechanism 40. The cooling mechanism 40 can cool the accommodation chamber 8 with DC power input from the outside via the power input terminal 28 or power from the battery pack 29. The cooling mechanism 40 has a compressor 41 as a cooler, a condenser 42, a refrigerant pipe 44 and a regulating valve 47. The cooling mechanism 40 is mostly provided in the second body part 4, that is, except for a portion of the refrigerant pipe 44 that extends into the first body part 3. The condenser 42 is provided close to the inner wall surface of the second body part 4 opposite to the first body part 3, that is, the inner surface of the right side surface of the right outer box 13, and has a space between the condenser 42 and right side surface of the left outer box 12.

The compressor 41 is an output part of the electric device 1 and has a motor, compresses a refrigerant, and discharges the refrigerant as a high-temperature and high-pressure gas. The condenser 42 releases the heat of the refrigerant discharged from the compressor 41 and discharges the refrigerant as a liquid. The refrigerant pipe 44 constitutes a path along which the refrigerant discharged from the condenser 42 passes around the accommodation chamber 8 and returns to the compressor 41. The refrigerant draws heat from the accommodation chamber 8 while passing around the accommodation chamber 8 and evaporates into a gas. The regulating valve 47 is provided in a portion of the refrigerant pipe 44 where the refrigerant returns from the surroundings of the accommodation chamber 8 to the compressor 41, that is, in a portion where the refrigerant flows in a gaseous state.

Figure 13:
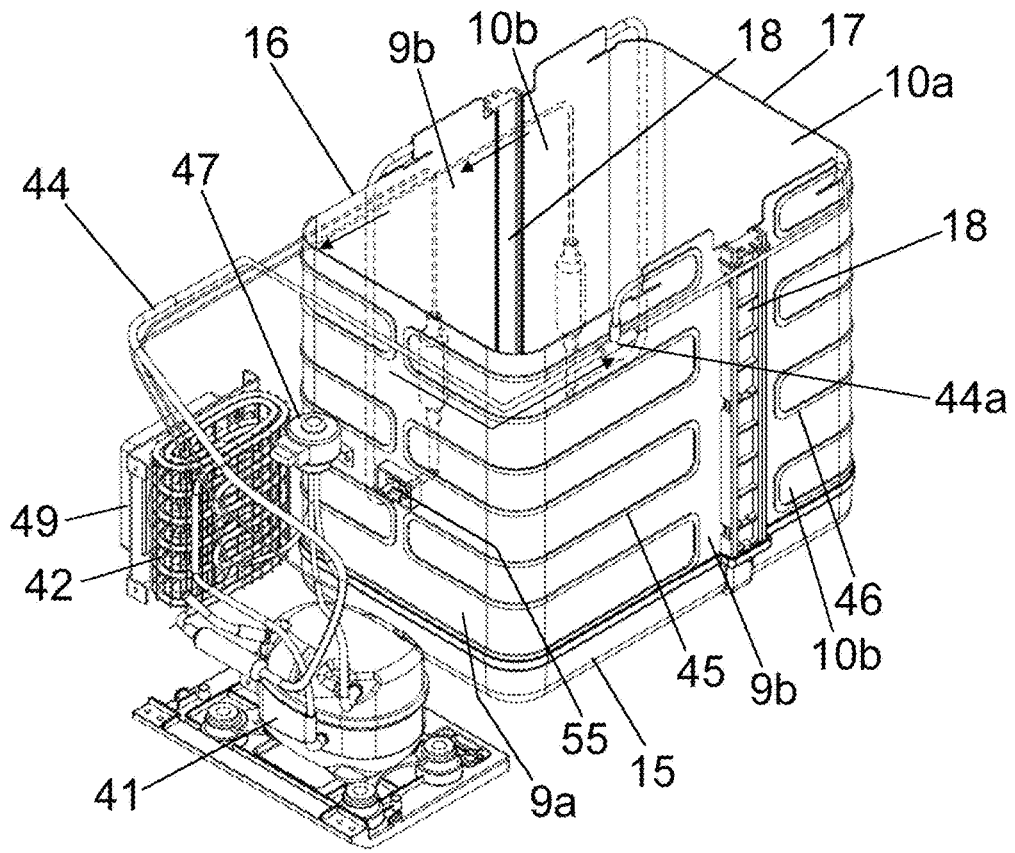
FIG. 13 is a perspective view of the inside of the electric device 1 viewed from the upper right rear.

The refrigerant pipe 44 has a first refrigerant pipe 45 as a first cooling part and a second refrigerant pipe 46 as a second cooling part. The single refrigerant pipe 44 extends into the first body part 3, and, as illustrated in FIG. 13, divided into two pipes, that is, the first refrigerant pipe 45 and the second refrigerant pipe 46 at a branch part 44a near the rear surface of the right-side member 16. That is, the single refrigerant pipe 44 extends to the branch part 44a near the boundary (rail 18) between the first accommodation chamber 9 and the second accommodation chamber 10. As a result, the surface area of the refrigerant pipe in contact with the outside air is smaller than that in a case where the refrigerant pipe is branched near the condenser, and the unnecessary temperature rise of the refrigerant can be suppressed, so that the accommodation chamber can be cooled more efficiently. The refrigerant pipe forming a path from the regulating valve 47 to a suction part of the compressor 41 is an example of a third cooling part, and the refrigerant pipe forming the discharge part of the compressor 41 to the branch part 44a is an example of a fourth cooling part.

The first refrigerant pipe 45 is provided on at least the side surface of the first accommodation chamber 9 and cools the first accommodation chamber 9. The first refrigerant pipes 45 are provided at least on the first side surface 9a, preferably on the first side surface 9a and the second side surface 9b. The second refrigerant pipe 46 is provided on at least the side surface of the second accommodation chamber 10 and cools the second accommodation chamber 10. A second refrigerant pipe 46 is provided at least on the first side surface 10a, preferably on the first side surface 10a and the second side surface 10b. The first refrigerant pipe 45 and the second refrigerant pipe 46 are independent of each other. That is, the first refrigerant pipe 45 is provided to mainly cool the first accommodation chamber 9, and the second refrigerant pipe 46 is provided to mainly cool the second accommodation chamber 10.

The first refrigerant pipe 45 forms a path in which reciprocation of extending along the right-side member 16 from the left end of the back surface of the right-side member 16 to the center of the right side surface of the right-side member 16 in the front-rear direction, and then folding back to the left end of the back surface of the right-side member 16 is repeated three times, then reciprocation of extending from the left end of the back surface of the right-side member 16 to the left end of the front surface of the right-side member 16, further extending from the left end of the front surface of the right-side member 16 to the center of the right side surface of the right-side member 16 in the front-rear direction, and then folding back to the left end of the front surface of the right-side member 16 is repeated three times, and then the first refrigerant pipe 45 reaches the regulating valve 47. A gas reservoir 45a is provided immediately before the regulating valve 47 to temporarily store the expanded refrigerant before returning to the compressor.

The second refrigerant pipe 46 forms a path in which reciprocation of extending along the left-side member 17 from the right end of the back surface of the left-side member 17 to the center of the left side surface of the left-side member 17 in the front-rear direction, and then folding back to the right end of the back surface of the left-side member 17 is repeated three times, then reciprocation of extending from the right end of the back surface of the left-side member 17 to the right end of the front surface of the left-side member 17, further extending from the right end of the front surface of the left-side member 17 to the center of the left side surface of the left-side member 17 in the front-rear direction, and folding back to the right end of the front surface of the left-side member 17, and then the second refrigerant pipe 46 reaches the regulating valve 47. A gas reservoir 46a is provided immediately before the regulating valve 47 to temporarily store the expanded refrigerant before returning to the compressor. Here, the gas reservoir 45a and the gas reservoir 46a are examples of reservoir parts.

As illustrated in FIG. 15, at least a part of the first refrigerant pipe 45 is integrally provided with the right-side member 16, and at least a part of the second refrigerant pipe 46 is integrally provided with the left-side member 17. In other words, the right-side member 16 and the left-side member 17 are integrated refrigerant pipes.

The regulating valve 47 is connected to the first refrigerant pipe 45 and the second refrigerant pipe 46 and can individually regulate (open/close) the flow of the refrigerant in the first refrigerant pipe 45 and the second refrigerant pipe 46. The regulating valve 47 includes a first regulating valve 47a provided in the first refrigerant pipe 45 to regulate the flow of the refrigerant in the first refrigerant pipe 45, and a second regulating valve 47b provided in the second refrigerant pipe 46 to regulate the flow of the refrigerant in the second refrigerant pipe 46. For example, by opening only the first regulating valve 47a, the refrigerant flows through the first refrigerant pipe 45 as a path, so that the first accommodation chamber 9 can be cooled. This is because a difference (P1<P2) occurs between the internal pressure (P1) of the refrigerant pipe 45 and the internal pressure (P2) of the refrigerant pipe 46 at the branch part 44a. In a case where it is desired to cool both the first accommodation chamber 9 and the second accommodation chamber 10, both the first regulating valve 47a and the second regulating valve 47b are opened to allow the refrigerant to flow through the first refrigerant pipe 45 and the second refrigerant pipe 46 as a path, and thus both the first accommodation chamber 9 and the second accommodation chamber 10 can be cooled. Here, the regulating valve 47 has the functions of the first regulating valve 47a and the second regulating valve 47b in a single form, but the first regulating valve 47a and the second regulating valve 47b may be separate from each other. The first regulating valve 47a and the second regulating valve 47b are, for example, solenoid valves.

Providing the first regulating valve 47a and the second regulating valve 47b in the portions of the first refrigerant pipe 45 and the second refrigerant pipe 46, respectively, through which the refrigerant flows in a gaseous state, contributes to suppressing imbalance in an amount of refrigerant flowing through the first refrigerant pipe 45 and the second refrigerant pipe 46 in a case where the electric device 1 is in an inclined state. This is because the refrigerant is light in a gaseous state, and thus even if there is a height difference between the positions of the first regulating valve 47a and the second regulating valve 47b, the uneven flow of the refrigerant is less likely to occur. (A) and (B) of FIG. 16 visually illustrate that the flow of the refrigerant is less likely to become uneven regardless of whether the electric device 1 is in a horizontal state or an inclined state. (A) and (B) of FIG. 16 illustrate the first regulating valve 47a and the second regulating valve 47b as separate bodies.

On the other hand, unlike the present embodiment, as illustrated in (A) and (B) of FIG. 18, there may be a configuration in which a first regulating valve 147a and a second regulating valve 147b are respectively provided in portions of the first refrigerant pipe 45 and the second refrigerant pipe 46 through which the refrigerant flows in a liquid state. In the configuration of the electric device according to this modification example, the flow is favorable in a horizontal state illustrated in (A) of FIG. 18, but in a case of an inclined state, the flow of the refrigerant is uneven as illustrated in (B) of FIG. 18. This is because the refrigerant is heavy in a liquid state, and thus a height difference between the positions of the first regulating valve 147a and the second regulating valve 147b influences the flow of the refrigerant. Thus, in a case where the electric device 1 is used in an inclined state, the configuration of the electric device 1 of the present embodiment is preferable.

In the electric device 1, as illustrated in FIG. 17, the gaseous refrigerant discharged from the compressor 41 passes through the condenser 42 and the capillary tube 43, flows into the refrigerant pipe 44 in a liquid state, branches into the first refrigerant pipe 45 and the second refrigerant pipe 46, absorbs heat from the first accommodation chamber 9 and the second accommodation chamber 10 to be vaporized in a gaseous state, and passes through the first regulating valve 47a and the second regulating valve 47b to return to the compressor 41. On the other hand, in the electric device of the modification example illustrated in (A) and (B) of FIG. 18, as illustrated in FIG. 19, the gaseous refrigerant discharged from the compressor 41 passes through the first regulating valve 147a and the second regulating valve 147b in a liquid state via the condenser 42 and the capillary tube 43, flows into the refrigerant pipe 44, branches into the first refrigerant pipe and the second refrigerant pipe 46, absorbs heat from the first accommodation chamber 9 and the second accommodation chamber 10 to be vaporized, and returns to the compressor 41 in a gaseous state.

Figure 8:
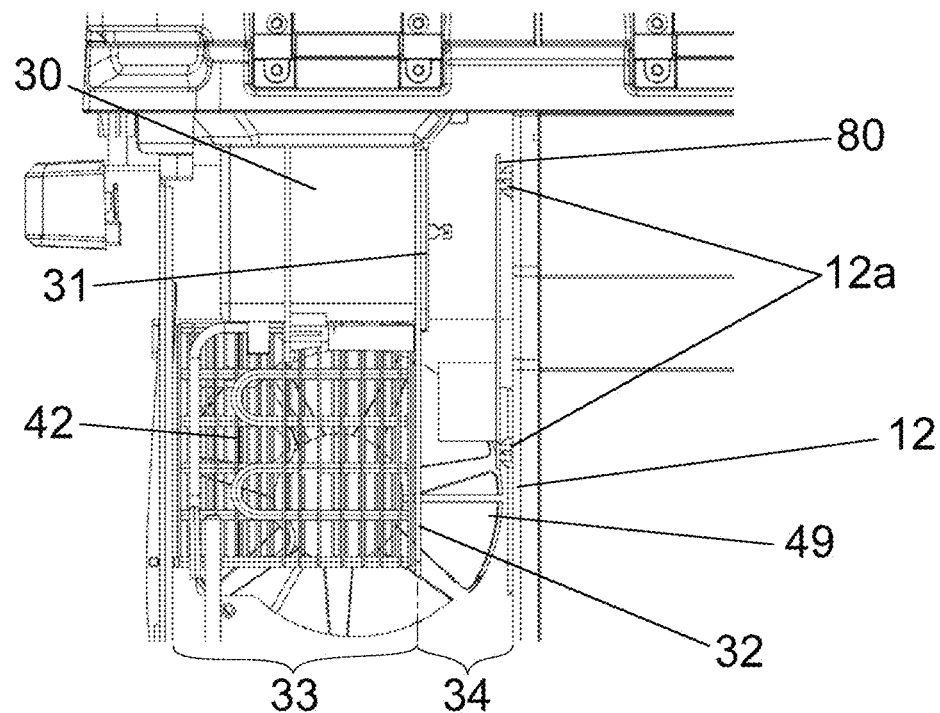
FIG. 8 is an enlarged rear view of the electric device 1 in which a right outer box 13 is omitted.
Figure 12:
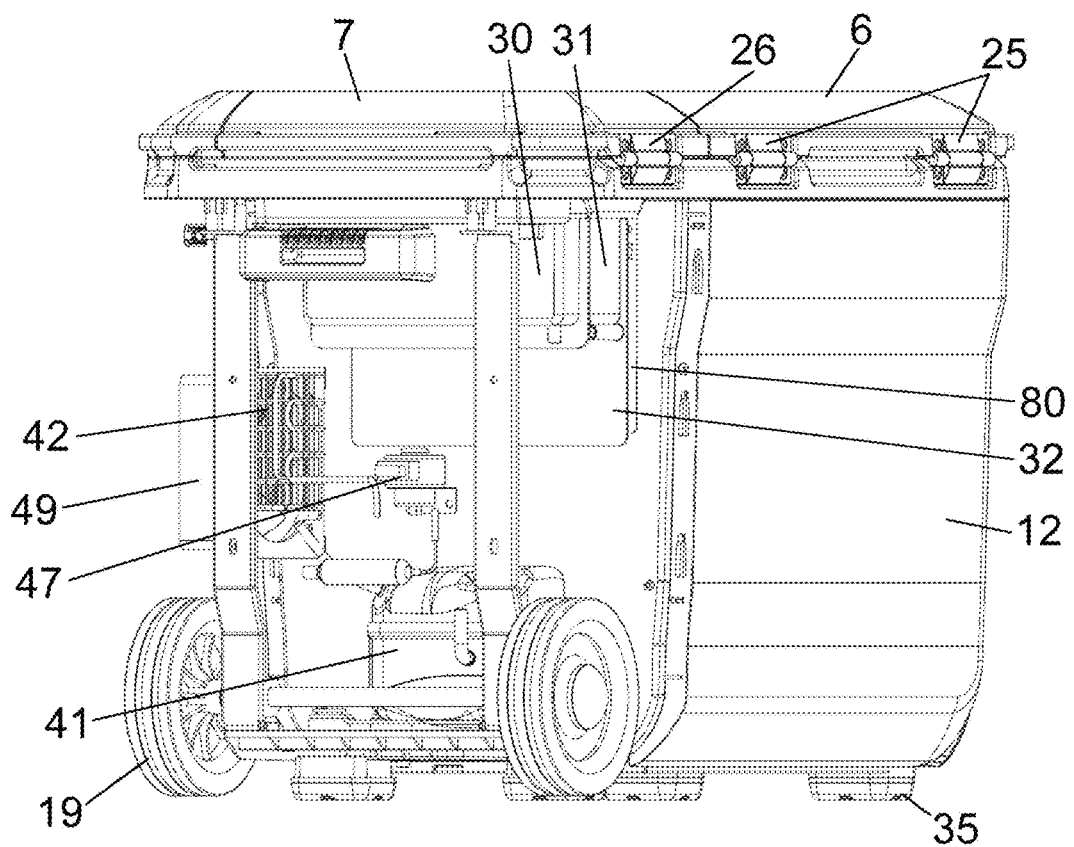
FIG. 12 is a perspective view of the electric device 1 viewed from the rear right, and is a perspective view in which the right outer box 13 is omitted.

The electric device 1 has a fan 49 as illustrated in FIGS. 8 and 12 and the like. The fan 49 is provided inside the right outer box 13. That is, the fan 49 is accommodated in the second body part 4. The fan 49 generates fan air for cooling the cooling mechanism (especially the condenser 42) and a control circuit board 80 that will be described later. An intake port 23 for taking in fan air is provided on the front surface of the right outer box 13. An exhaust port 24 for discharging the fan air is provided on the back surface of the right outer box 13. The fan air flows from the intake port 23 toward the exhaust port 24 in the front-rear direction. The front-to-rear relationship of intake and exhaust may be reversed.

The electric device 1 includes the control circuit board 80 as illustrated in FIGS. 8 and 12 and the like. The control circuit board 80 is fixed to the bosses 12a provided on the outer surface of the right side surface of the left outer box 12

(the boundary wall surface between the first body part 3 and the second body part 4) by screws, and is located in the right outer box 13 in a state substantially perpendicular to the left-right direction. That is, the control circuit board 80 is accommodated in the second body part 4. The control circuit board 80 is equipped with an internal circuit surrounded by a dashed line in FIG. 34, and has a function of controlling the cooling mechanism 40 and a function of controlling charging of the battery pack 29. The charging here is to charge the battery pack 29 attached to the battery pack attachment part 22*a* with DC power from the outside via the power input terminal 28.

Figure 9:
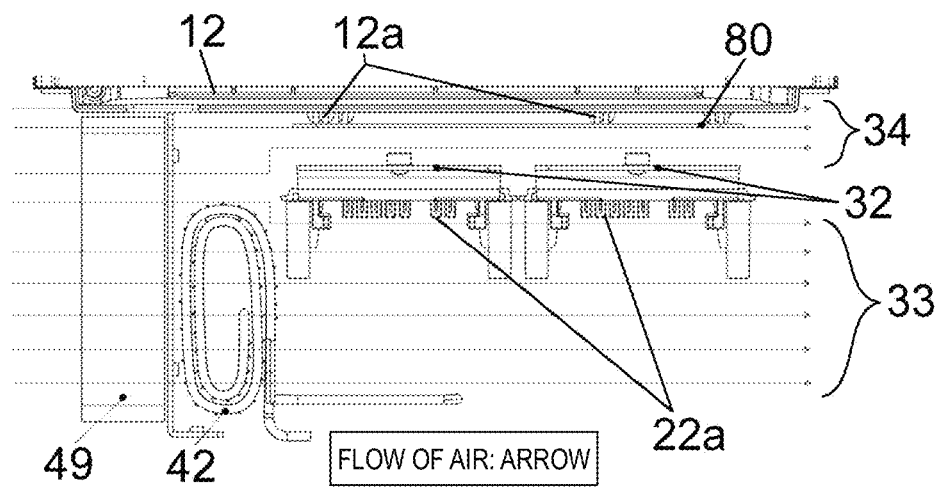
FIG. 9 is a schematic enlarged view of the inside of the right outer box 13 viewed from above.

The electric device 1 includes a branch part 32 as illustrated in FIGS. 8, 9, and 12, and the like. The branch part 32 divides the fan air into a first air passage 33 for cooling the cooling mechanism 40 (especially the condenser 42) and a second air passage 34, separate from the first air passage 33, for cooling the control circuit board 80. The branch part 32 is a plate-like part extending downward from the bottom surface of battery pack accommodation chamber 22 and substantially perpendicular to the left-right direction. The branch part 32 is preferably integral with the battery box 30.

The electric device 1 includes a heating mechanism 50 capable of heating the first accommodation chamber 9 and the second accommodation chamber 10, as illustrated in FIGS. 20 to 22. The heating mechanism 50 has a first heating part 51 and a second heating part 52. The first heating part 51 is provided on the outer surface of the right-side member 16 (the outer surface of the first accommodation chamber 9) and can heat the first accommodation chamber 9. The second heating part 52 is provided on the outer surface of the left-side member 17 (the outer surface of the second accommodation chamber 10) and can heat the second accommodation chamber 10. The first heating part 51 and the second heating part 52 are wire heaters, for example, and are provided to cover the first refrigerant pipe 45 and the second refrigerant pipe 46, respectively. If a single heating part or a single refrigerant pipe is disposed to cover the entire accommodation chamber and a rail member is provided, the heating part or the refrigerant pipe is required to be disposed to avoid the rail member 18. As a result, a distance between the heating part or the refrigerant pipe and the accommodation chamber 8 increases, and thus the heating performance or the cooling performance may deteriorate. However, in the present embodiment, the first heating part 51 and the second heating part 52 and the first refrigerant pipe 45 and the second refrigerant pipe 46 are each divided, and the rail member 18 is disposed in the divided part. Therefore, it is not necessary to increase a distance between the first heating part 51 and the second heating part 52 and the first refrigerant pipe 45 and the second refrigerant pipe 46 from the accommodation chamber 8, and thus it is possible to provide an electric device in which the partition plate 70 can be attached and detached while maintaining the heating performance or the cooling performance.

The electric device 1 has a partition plate 70. As illustrated in FIG. 1, the partition plate 70 divides the accommodation chamber 8 into the first accommodation chamber 9 and the second accommodation chamber 10 in a state of being attached to the main body 2. A user can attach and detach the partition plate 70 to and from the accommodation chamber 8 along the recessed part 18*b* ((B) of FIG. 25) of the rail member 18.

The partition plate 70 can be divided into an upper partition plate 71 and a lower partition plate 72 as illustrated in (A) to (C) of FIG. 27 and (A) to (C) of FIG. 28. As illustrated in (B) of FIG. 27 and (B) of FIG. 28, the upper partition plate 71 and the lower partition plate 72 each have a heat insulating material 74 in their internal spaces (each internal space is filled with the heat insulating material 74). A mating part 73 between the upper partition plate 71 and the lower partition plate 72 has a spigot structure. That is, the upper partition plate 71 and the lower partition plate 72 partially overlap each other in the up-down direction, and the overlapping parts approach or contact each other in the surface normal direction. The heat insulating material 74 extends inside the spigot structure. The partition plate 70 detached from the accommodation chamber 8 can be stored in a storage part (not illustrated) detachably provided in the main body 2. The storage part can accommodate not only the partition plate 70 but also a battery, a smart phone, and the like, and has a size that can accommodate at least the partition plate 70 in a divided state.

The upper partition plate 71 and the lower partition plate 72 function as a heat insulating material (heat insulating wall) between the first accommodation chamber 9 and the second accommodation chamber 10 in a state in which the upper partition plate 71 and the lower partition plate 72 are combined with each other and attached to the main body 2 (accommodation chamber 8). As illustrated simply in FIG. 26, the lower partition plate 72 functions as a scattering prevention wall for an accommodation object 79 accommodated in the accommodation chamber 8 in a state in which the lower partition plate 72 is attached to the accommodation chamber 8 alone without being combined with the upper partition plate 71.

(A) to (C) of FIG. 29 and (A) to (C) of FIG. 30 illustrate a configuration of a partition plate 170 that can be attached to the accommodation chamber 8 in place of the partition plate 70. The partition plate 170 has an upper partition plate 171 and a lower partition plate 172. The upper partition plate 171 and the lower partition plate 172 are connected to each other via a hinge mechanism 175 and configured to be foldable. Each internal space of the upper partition plate 171 and the lower partition plate 172 is filled with a heat insulating material 174. A mating part 173 between the upper partition plate 171 and the lower partition plate 172 has a spigot structure. The heat insulating material 174 extends inside the spigot structure.

The electric device 1 includes a setting part 60. The setting part 60 is provided at the upper right front end of the main body 2 and faces forward and upward. A user can individually set temperatures of the first accommodation chamber 9 and the second accommodation chamber 10 by using the setting part 60. For example, one of the first accommodation chamber 9 and the second accommodation chamber 10 may be set to be frozen and the other may be set to be refrigerated or set to a normal temperature, one may be set to be frozen or refrigerated and the other may be set to be heated or set to a normal temperature, or one may be set to be strongly heated, and the other may be set to be weakly heated or set to a room temperature. The partition plate 70 (or the partition plate 170) suppresses heat transfer between the first accommodation chamber 9 and the second accommodation chamber 10 in a case where the set temperatures of the first accommodation chamber 9 and the second accommodation chamber 10 are different. In other words, by attaching the partition plate 70 (or the partition plate 170), it is possible to control the temperatures of the first accommodation chamber 9 and the second accommodation chamber 10 to be different from each other.

As illustrated in (A) of FIG. 32, the setting part 60 includes a display part 61, a right room temperature setting button 62, a left room temperature setting button 63, a mode switching button 64 (room switching button), a power button 65, a USB device energization switching button 66, and an execution button 67. The display part 61 includes a remaining battery level display part 61*a*, an external power supply connection display part 61*b*, a USB device energization display part 61*c*, an error display part 61*d*, a right room temperature display part 61*e*, and a left room temperature display part 61*f* Display on the display part 61 is controlled by a microcomputer 81 illustrated in FIG. 34. An operation on each button is transmitted to the microcomputer 81.

As illustrated in (C) of FIG. 33, the battery state display part 61*a* displays a state of the battery pack 29 in the battery pack attachment part 22*a*. While the battery pack 29 is being charged, the battery state display part 61*a* repeats display of a remaining capacity in increments of 1, 2, 3, and 4. In a case where the charging of the battery pack 29 is completed, four remaining capacity indicators are lighted in the battery state display part 61*a*. In a case where the electric device 1 is operated with the power of the battery pack 29, in the battery state display part 61*a*, the remaining capacity display of the battery pack 29 in use blinks, and the remaining capacity display of the battery pack 29 not in use is lighted. In a case where the remaining capacity of the battery pack 29 is low (below a dischargeable threshold value), only the remaining capacity display frame is lighted in the battery state display part 61*a*.

As illustrated in (D) of FIG. 33, the external power supply connection display part 61*b* is lighted in a case where DC power is input from the outside via the power input terminal 28, and lighted off in other cases. As illustrated in (E) of FIG. 33, the USB device energization display part 61*c* is lighted in a case where charging power is being supplied to a device connected to the USB terminal 27, and lighted off in other cases. As illustrated in (F) of FIG. 33, the error display part 61*d* blinks and displays an error code in a case where an error occurs, and is lighted off in other cases. The error is, for example, an abnormal temperature of the compressor 41, an abnormal overcurrent, an abnormal input power supply (low voltage), or an abnormality in which a set temperature deviates from a temperature settable range.

The right room temperature display part 61*e* displays a set temperature or the current temperature of the first accommodation chamber 9. The left room temperature display part 61*f* displays a set temperature or the current temperature of the second accommodation chamber 10. For example, by displaying the set temperature in a blinking manner and displaying the current temperature in a lighting manner, the set temperature and the current temperature can be displayed separately on the same display part.

The right room temperature setting button 62 is an operation part for a user to switch a set temperature of the first accommodation chamber 9. The left room temperature setting button 63 is an operation part for a user to switch a set temperature of the second accommodation chamber 10. As illustrated in (B) of FIG. 33, pressing the upper parts of the right room temperature setting button 62 and the left room temperature setting button 63 raises the set temperature by 5° C., and pressing the lower parts lowers the set temperature by 5° C. For example, an initial set temperature is 10° C., the maximum set temperature is 60° C., and the minimum set temperature is −18° C.

The mode switching button 64 is an operation part for a user to switch operation modes of the electric device 1. The operation modes include a two-room mode in which temperatures of the first accommodation chamber 9 and the second accommodation chamber 10 are individually controlled, a large room single mode (right room single mode) in which a temperature of only the first accommodation chamber 9 side is controlled, a small room single mode (left room single mode) in which a temperature of only the second accommodation chamber 10 side is controlled, and a one-room mode in which temperatures of the first accommodation chamber 9 and the second accommodation chamber 10 are collectively controlled. For example, the initial operation mode is the two-room mode, and each time the mode switching button 64 is pressed, the mode changes among the large room single mode, the small room single mode, and the one-room mode.

As illustrated in (B) of FIG. 32, in the two-room mode, the right room temperature display part 61*e* and the left room temperature display part 61*f* respectively display set temperatures or current temperatures of the first accommodation chamber 9 and the second accommodation chamber 10, respectively. As illustrated in (C) of FIG. 32, in the large room single mode, the right room temperature display part 61*e* displays the set temperature or the current temperature of the first accommodation chamber 9, while the left room temperature display part 61*f* is lighted off. As illustrated in (D) of FIG. 32, in the small room single mode, the right room temperature display part 61*e* is lighted off, while the left room temperature display part 61*f* displays a set temperature or the current temperature of the second accommodation chamber 10. As illustrated in (E) of FIG. 32, in the one-room mode, the right room temperature display part 61*e* displays the set temperatures or the current temperatures of the first accommodation chamber 9 and the second accommodation chamber 10, and the left room temperature display part 61*f* is lighted off. The large room single mode and the one-room mode are distinguished by whether or not a partition line between the right room temperature display part 61*e* and the left room temperature display part 61*f* is lighted, as illustrated in (C) and (E) of FIG. 32 (lighting: large room single mode, lighting-off: one-room mode).

The power button 65 is an operation part for a user to switch between starting and stopping of the electric device 1. The USB device energization switching button 66 is an operation part for a user to switch whether or not to supply charging power to a device connected to the USB terminal 27. The execution button 67 is a button for a user to determine the current set temperature and start an operation at the set temperature. The execution button 67 may be omitted, and an operation at a set temperature may be started in conjunction with a user's operation on the operation part.

In the electric device 1, a set temperature difference between the first accommodation chamber 9 and the second accommodation chamber 10 is controlled to be within a predetermined value. This takes into consideration the limit of the maximum temperature difference between the first accommodation chamber 9 and the second accommodation chamber 10 that can be realized by the heat insulating effect of the partition plate 70 (or the partition plate 170). (F) and (G) of FIG. 32 illustrate that a set temperature of the second accommodation chamber 10 is automatically changed to 50° C. when control is performed such that a set temperature difference between the first accommodation chamber 9 and the second accommodation chamber 10 is within 60° C., in a case where a set temperature of the first accommodation chamber 9 is changed to −10° C. from a state in which a set temperature of the first accommodation chamber 9 is 0° C. and a set temperature of the second accommodation chamber 10 is 60° C.

In a case where a set temperature difference between the first accommodation chamber 9 and the second accommodation chamber 10 is within 60° C., if the set temperature of the first accommodation chamber 9 is switched from 0° C. to −10° C., the microcomputer 81 switches a temperature settable range of the second accommodation chamber 10 from −18° C. to 60° C. to −18° C. to 50° C. In this case, the changed temperature settable range may be displayed on the left room temperature display part 61f that is a display part of the second accommodation chamber 10. Consequently, a user can set a temperature after recognizing the temperature settable range. Even if the left room temperature setting button 63 is operated such that the set temperature of the second accommodation chamber 10 exceeds 50° C. (exceeds the temperature settable range), the left room temperature display part 61f does not display the set temperature that exceeds the temperature settable range. In other words, even if an operation of increasing the set temperature from 50° C. is operated, the display of the set temperature remains at 50° C. A set temperature difference is not limited to 60° C. For example, it is possible to perform switching control on the basis of a temperature of the outside air or a remaining battery level.

Alternatively, control may be performed such that display of a set temperature deviating from the temperature settable range is permitted, but an operation cannot be started even if the execution button 67 is pressed. In this case, it is preferable to notify a user that the set temperature deviates from the temperature settable range by increasing a blinking speed of the set temperature display or displaying an error. The notification may be performed at a timing at which the execution button 67 is pressed, or at a timing in a case where display of the set temperature deviating from the temperature settable range is started. In a case where the set temperature of one of the first accommodation chamber 9 and the second accommodation chamber 10 is changed and thus the temperature settable range of the other becomes narrower than normal (18° C. to 60° C.), the narrowed temperature settable range may be displayed on the temperature display part on the other in addition to the set temperature (not illustrated).

As illustrated in (A) of FIG. 33, in a case where the power button 65 is pressed to start the electric device 1, the operation mode is switched to the two-room mode that is an initial operation mode, and the right room temperature display part 61e and the left room temperature display part 61f display an initial set temperature of 10° C. in a blinking manner. After three seconds (after a predetermined time), the right room temperature display part 61e and the left room temperature display part 61f display the current temperature in a lighting manner. In a case where either the right room temperature setting button 62 or the left room temperature setting button 63 is pressed, the right room temperature display part 61e and the left room temperature display part 61f display an initial set temperature of 10° C. in a blinking manner. The set temperature is displayed for 3 seconds (predetermined time) after the right room temperature setting button 62 or left room temperature setting button 63 is last pressed. In a case where the right room temperature setting button 62 or left room temperature setting button 63 is pressed during that time, the set temperature is changed.

In a case where the lower part of the right room temperature setting button 62 is pressed three times while the right room temperature display part 61e and the left room temperature display part 61f are displaying an initial set temperature of 10° C. in a blinking manner, the set temperature display on the right room temperature display part 61e is changed to −5° C. After that, in a case where the upper part of the left room temperature setting button 63 is pressed ten times, the set temperature display of the left room temperature display part 61f is changed to 60° C., and the set temperature display of the right room temperature display part 61e is changed to 0° C. due to control for making the set temperature difference within 60° C. After three seconds, the right room temperature display part 61e and the left room temperature display part 61f display the current temperatures in a lighting manner.

In a case where the mode switching button 64 is pressed, the operation mode is switched to the large room single mode, the set temperature display of the right room temperature display part 61e is changed to 10° C., and the left room temperature display part 61f is lighted off. After three seconds, the right room temperature display part 61e and the left room temperature display part 61f display the current temperatures in a lighting manner. In a case where the mode switching button 64 is pressed again, the operation mode is switched to the small room single mode, the right room temperature display part 61e is lighted off, and the set temperature display of the left room temperature display part 61f is changed to 10° C. After three seconds, the right room temperature display part 61e and the left room temperature display part 61f display the current temperatures in a lighting manner. In a case where the mode switching button 64 is pressed again, the operation mode is switched to the one-room mode, the set temperature display of the right room temperature display part 61e is changed to 10° C., the left room temperature display part 61f is lighted off, and the partition line between the right room temperature display part 61e and the left room temperature display part 61f is lighted off.

FIG. 34 is a circuit block diagram of the electric device 1. In this drawing, two battery packs 29 are distinguished as battery packs 29a and 29b. ADC power supply 90 is, for example, an AC adapter, is connected to an external AC power supply (not illustrated), converts AC power into DC power (for example, DC 12 V), and supplies the DC power to the power input terminal 28 of the electric device 1. Alternatively, the DC power supply 90 is, for example, an in-vehicle power supply (in-vehicle battery), and supplies DC power to the power input terminal 28. The power input terminal 28 also functions as an in-vehicle power supply connection part to which an in-vehicle power supply can be connected. A voltage of the in-vehicle power supply is, for example, about DC 12.5 V to 14 V, and varies depending on a state of the in-vehicle power supply, a length of a power cord, and the like. Similarly, the magnitude of the voltage drop when a current is output from the in-vehicle power supply also varies depending on a state of the in-vehicle power supply, a length of a power cord, and the like. As the deterioration in the in-vehicle power supply progresses, the internal resistance increases and the voltage drop during current output also increases. A compressor drive circuit 48 is provided on the compressor 41 side.

The electric device 1 includes, on the control circuit board 80, a microcomputer 81 that is an operation control part, a microcomputer 82 that is a charging control part, a control power supply 83, a rotation speed setting circuit 84, a shunt resistor 85, battery voltage detection circuits 86a and 86b, a DC power supply voltage detection circuit 86c that is a state detection part, a charging circuit 88, and a shunt resistor 89. The microcomputers 81 and 82 function as control parts that control the supply of power to the compressor 41. The microcomputers 81 and 82 may not be separate from each other, and may be a single microcomputer (microcontroller). The control power supply 83 converts an input voltage from the DC power supply 90 or the battery pack 29a or 29b into a power supply voltage (for example, 5V) for the microcomputers 81 and 82, and the like, and supplies the power supply voltage to the microcomputers 81 and 82, and the like. The battery voltage detection circuits 86a and 86b transmit detection signals respectively corresponding to the voltages of the battery packs 29a and 29b to the microcomputer 82. The DC power supply voltage detection circuit 86c transmits a detection signal corresponding to the voltage of the DC power supply 90 to the microcomputer 81.

The microcomputer 81 controls the entire operation related to cooling and heating of the electric device 1. The microcomputer 81 controls on/off of a switching element Q3 provided in a current path of the compressor drive circuit 48, and controls driving and stopping of the compressor 41. The microcomputer 81 transmits a rotation speed determination signal to the compressor drive circuit 48 via the rotation speed setting circuit 84 to control a rotation speed of the compressor 41. As illustrated in FIG. 35, the rotation speed setting circuit 84 has resistors R1 to R3 having different resistance values connected in parallel between rotation speed determination terminals of the compressor drive circuit 48, and switching elements Q6 to Q8 respectively connected in series to the resistors R1 to R3. The switching elements Q6 to Q8 are alternatively turned on by a rotation speed selection signal from the microcomputer 81, for example. Depending on which of the switching elements Q6 to Q8 is turned on, a voltage between the rotation speed determining terminals of the compressor drive circuit 48 changes, and a set rotation speed of the compressor 41 is determined.

The microcomputer 81 receives an operation on the setting part 60 as an electrical signal, and controls display on the setting part 60 (display on the display part 61). The microcomputer 81 controls opening and closing of the first regulating valve 47a and the second regulating valve 47b to control a flow of the refrigerant in the first refrigerant pipe and the second refrigerant pipe 46. The microcomputer 81 controls turning-on and turning-off of switching elements Q4 and Q5 respectively provided in current paths of the first heating part 51 and the second heating part 52 to control driving of the first heating part 51 and the second heating part 52. The microcomputer 81 detects temperatures (current temperatures) of the first accommodation chamber 9 and the second accommodation chamber 10 on the basis of the output signals from the first thermistor 55 and the second thermistor 56. The microcomputer 81 detects a drive current for the compressor 41 and drive currents of the first heating part 51 and the second heating part 52 on the basis of a voltage of the shunt resistor 85. The shunt resistor 85 is a block of resistors respectively connected in series to the switching elements Q3 to Q5. The microcomputer 81 detects a voltage of the DC power supply 90 on the basis of a detection signal from the DC power supply voltage detection circuit 86c.

The microcomputer 82 controls charging of the battery packs 29a and 29b in the electric device 1. The microcomputer 82 controls a charging voltage through control of the charging circuit 88. Under the control of the microcomputer 82, the charging circuit 88 converts the input voltage from the DC power supply 90 into a charging voltage of the battery pack 29a or 29b, and supplies the charging voltage to the battery pack 29a or 29b (charging the battery pack 29a or 29b). The microcomputer 82 controls turning-on and turning-off of switching elements Q1 and Q2 provided between the output terminal of the charging circuit 88 and the charging terminals (C+terminals) of the battery packs 29a and 29b to determine which of the battery packs 29a and 29b is to be charged. Diodes D5 and D6 for backflow prevention are connected between the switching elements Q1 and Q2 and the microcomputer 82. The microcomputer 82 detects voltages of the battery packs 29a and 29b on the basis of detection signals from the battery voltage detection circuits 86a and 86b. The microcomputer 82 detects a charging current on the basis of a voltage of the shunt resistor 89 provided in the output current path of the charging circuit 88.

In addition to charging control, the microcomputer 82 controls turning-on and turning-off of relays S1 and S2 that are switches connected to the positive terminals (+terminals) of the battery packs 29a and 29b to determine which of the battery packs 29a and 29b is to be discharged. In a case where power is supplied from the DC power supply 90, the microcomputer 82 turns off the relays S1 and S2 such that the battery packs 29a and 29b are not discharged. Fuses F1 to F3 and diodes D1 to D3 for backflow prevention are respectively connected to the positive terminals of the battery packs 29a and 29b and the DC power supply 90. The microcomputers 81 and 82 can communicate with each other and share various types of information. For example, the microcomputer 82 may acquire voltage information regarding the DC power supply 90 by communicating with the microcomputer 81.

(A) of FIG. 36 is a time chart illustrating power supply selection, a voltage of the DC power supply 90, and a drive current for the compressor in a case where the DC power supply 90 is a normal in-vehicle power supply. The normal in-vehicle power supply is an in-vehicle power supply in which deterioration has not progressed, and is an in-vehicle power supply in a state of having a sufficient capacity necessary for starting the compressor 41. Immediately after the start of operation at time point t11, a large starting current temporarily flows and the voltage of DC power supply 90 drops. However, the voltage of the DC power supply 90 is not lower than 11 V that is a threshold value for switching a power supply source to the compressor 41 (hereinafter, a "power supply source") from the DC power supply 90 to the battery pack 29a or 29b (hereinafter, a "threshold value for switching to the battery"), and it is possible to start the compressor 41, that is, to operate the electric device 1. After a large starting current temporarily flows, the drive current for the compressor 41 decreases to a value corresponding to a load. Along with this, the voltage of the DC power supply 90 also increases.

(B) of FIG. 36 is a time chart illustrating power supply selection, a voltage of the DC power supply 90, and a drive current for the compressor 41 in a case where the DC power supply 90 is an in-vehicle power supply in which deterioration has progressed in an operation of the electric device 1 in a comparative example. The in-vehicle power supply in which deterioration has progressed has a lower voltage than that of a normal in-vehicle power supply, and the voltage drop is large in a case where a current flows. The microcomputer 82 first selects the DC power supply 90 as a power supply source (turns off the relays S1 and S2). Immediately after the start of operation at time point t11, a large starting current temporarily flows and the voltage of DC power supply 90 drops. In this case, the voltage of the DC power supply 90 becomes lower than 11 V that is a threshold value for switching to the battery. As a result, the microcomputer 81 determines that the electric device 1 cannot be operated with the power of the DC power supply 90 and starts a process of stopping the compressor 41. The microcomputer 82 switches a power supply source to the battery pack 29a or 29*b*. The relays S1 and S2 correspond to a switching circuit in the present invention.

At time point t13, the process of stopping the compressor 41 is completed, and the drive current for the compressor 41 becomes 0. In this case, the voltage of the DC power supply 90 recovers to a value higher than 12 V that is a threshold value for switching a power supply source from the battery pack 29*a* or 29*b* to the DC power supply 90 (hereinafter, referred to as a "threshold value for switching to the in-vehicle power supply"). Therefore, the microcomputer 82 switches a power supply source from the battery pack 29*a* or 29*b* to the DC power supply 90, and attempts to start the compressor 41 again by using the power of the DC power supply 90 at time point t15. However, since the state of the DC power supply 90 has not changed, the compressor 41 cannot be started (the electric device 1 cannot be operated), in the same manner as in the case of the start of operation at time point t11. An interval between time points t13 and t15 is a waiting time required for protecting the compressor 41, for example, two minutes. Since the compressor 41 discharges the refrigerant, if the compressor 41 is restarted immediately after being stopped, the mechanism of the compressor 41 may be adversely affected depending on a state of the refrigerant. Therefore, a waiting time is provided from when the compressor 41 is stopped to when the compressor 41 is restarted.

As described above, in a case where a power supply source is switched to the DC power supply 90 only under the condition that the voltage of the DC power supply 90 is higher than 12 V, a circulation of a failure to start the compressor 41 with the power of the DC power supply 90, switching a power supply source to the battery pack 29*a* or 29*b*, switching a power supply source to the DC power supply 90 due to the voltage recovery of the DC power supply 90, and a failure to start the compressor 41 with the power of the DC power supply 90 may occur such that driving of the compressor 41, that is, an operation of the electric device 1 cannot be substantially performed, and thus a cooling failure may be caused. FIG. 37 illustrates an operation of the electric device 1 for solving such problems.

FIG. 37 is a time chart illustrating power supply selection, a voltage of the DC power supply 90, a voltage of the battery pack 29*a* or 29*b*, a voltage input to the compressor drive circuit 48, and a drive current for the compressor 41 in a case where the DC power supply 90 is an in-vehicle power supply in which deterioration has progressed in an operation of the electric device 1 of the embodiment.

In a period A immediately after the power button 65 is pressed, the microcomputer 82 selects the DC power supply 90 as a power supply source (the relays S1 and S2 are turned off). In a period B, the microcomputer 81 starts the compressor 41 with the power of the DC power supply 90, but a starting current for the compressor 41 causes the voltage of the DC power supply 90 to drop below an operation stop threshold value (for example, 11 V), and thus the compressor 41 is stopped. The microcomputer 82 determines that the compressor 41 cannot be started by using the DC power supply 90 (determines that the DC power supply 90 cannot be used), and switches a power supply source to the battery pack 29*a* or 29*b* at time point C (turns on the relay S1 or S2). The fact that the voltage of the DC power supply 90 decreases below the operation stop threshold value due to the starting current for the compressor 41 corresponds to an operation stop condition in the present invention.

During a period D after a waiting time necessary for protecting the compressor 41 has passed from stoppage of the compressor 41 during the period B, the microcomputer 81 starts the compressor 41 with the power of the battery pack 29*a* or 29*b*. Since the voltage of the battery pack 29*a* or 29*b* is high, the compressor 41 is successfully started, and the compressor 41 is driven with the power of the battery pack 29*a* or 29*b* for a predetermined time regardless of the voltage of the DC power supply 90. During this time, a voltage of the in-vehicle power supply increases due to, for example, traveling of a vehicle equipped with the in-vehicle power supply. At time point E after the predetermined time has elapsed, the microcomputer 81 temporarily stops driving the compressor 41. Since there is a possibility that a state of the in-vehicle power supply has changed and the electric device is operable, the microcomputer 82 switches a power supply source to the DC power supply 90 again at time point F. Elapse of a predetermined time corresponds to an operation resuming condition in the present invention. If the voltage of the DC power supply 90 has not increased to the operation resuming threshold value (for example, 12 V) or higher after a predetermined time has elapsed, the compressor 41 may be continued to be driven with the power of the battery pack 29*a* or 29*b* (the compressor 41 is not stopped). In this case, the operation resuming condition is that a predetermined time has elapsed and the voltage of the DC power supply 90 exceeds the operation resuming threshold value.

At time point G after the waiting time necessary for protecting the compressor 41 has elapsed from time point E, the microcomputer 81 starts the compressor 41 with the power of the DC power supply 90. The voltage of the DC power supply 90 has increased compared to the previous start using the power of the DC power supply 90, and the voltage of the DC power supply 90 does not fall below the operation stop threshold value during the present starting, and the compressor 41 can be successfully started. In a case where the voltage of the DC power supply 90 decreases below the operation stop threshold value during the present starting, the compressor 41 is stopped in the same manner as in the previous starting, the compressor 41 is driven for a predetermined time with the power of the battery pack 29*a* or 29*b* and then stopped. After that, the compressor 41 is tried to be started again with the power of the DC power supply 90.

As described above, in a state in which an in-vehicle power supply as the DC power supply 90 is connected to the power input terminal 28 and the battery pack 29*a* or 29*b* is connected to the battery pack attachment part 22*a*, in a case where a power supply source is switched from the in-vehicle power supply to the battery pack 29*a* or 29*b* according to a detection result from the DC power supply voltage detection circuit 86*c*, the microcomputer 82 maintains the supply of power to the compressor 41 from the battery pack 29*a* or 29*b* until a predetermined time elapses regardless of whether the voltage of the DC power supply 90 is higher than the threshold value for switching to the in-vehicle power supply. As a result, it is possible to prevent that the compressor 41 cannot be driven, that is, the electric device 1 cannot be substantially operated, and thus a cooling failure can be suppressed. That is, the problem in the operation in the comparative example illustrated in (B) of FIG. 36 can be solved favorably. The effect of being able to prevent that the electric device cannot be substantially operated is the same even in a case where an output part is not the compressor 41 (for example, a motor other than the compressor) or in a case where the electric device is not a cold-hot storage. The in-vehicle power supply connection part 28 corresponds to a first power supply source in the present invention, and the battery pack attachment part 22a corresponds to a second power supply source in the present invention.

The predetermined time is longer than the waiting time required for protecting the compressor 41. Therefore, an interval for determining whether or not the DC power supply 90 can be used on the basis of a detection result from the DC power supply voltage detection circuit 86 is longer than the waiting time required for protecting the compressor 41.

The predetermined time may be a time until a user performs an operation of stopping the compressor 41, that is, a time until the user presses the power button 65. In other words, in a case where the microcomputer 82 determines that the DC power supply 90 cannot be used on the basis of the detection result from the DC power supply voltage detection circuit 86, the supply of power from the DC power supply 90 to the compressor 41 may be prohibited until the user performs an operation of stopping the compressor 41. In this case, in a case where it is detected that a plug is inserted into or detached from the power input terminal 28, an attempt may be made to start the compressor 41 with the power of the DC power supply 90.

In a case where the DC power supply 90 is connected to the power input terminal 28 but a power supply source is not the DC power supply 90, the microcomputer 81 may notify a user by causing the external power supply connection display part 61b or the like to blink. As a result, the user can recognize that the electric device 1 cannot be operated because the in-vehicle power supply used as the DC power supply 90 is not in good condition, or that the battery pack 29a or 29b is a power supply source, and thus convenience is high.

As a modification example of the operation in FIG. 37, in a case where the microcomputer 82 determines that the DC power supply 90 cannot be used on the basis of a detection result from the DC power supply voltage detection circuit 86, a power supply source may be switched to the battery pack 29a or 29b from the DC power supply 90 without stopping the driving of the compressor 41. Specifically, at the end of the period B, the relay 51 or S2 may be turned on without stopping the driving of the compressor 41, a power supply source may be switched to the battery pack 29a or 29b, and the driving of the compressor 41 may be continued.

FIG. 38 is a flowchart illustrating a main routine in the electric device 1. In a case where the power button 65 is pressed, the control power supply 83 is activated and the microcomputers 81 and 82 are started (51). The microcomputers 81 and 82 execute a power selection routine illustrated in FIG. 39 (S2). The microcomputer 81 reads a set temperature selected by the setting part 60 (S5), reads output signals (the first accommodation chamber 9 and the second accommodation chamber 10) from the first thermistor 55 and the second thermistor 56 (S6), and executes control in an operation mode selected by the setting part 60 (any of S7 to S10).

FIG. 39 is a flowchart illustrating the power selection routine (S2) in FIG. 38. In a case where power is supplied from the DC power supply 90 (Yes in S2a) and at least one of the battery packs 29a and 29b is connected (Yes in S2b), the microcomputer 82 executes a DC power state determination routine (S3). In a case where a battery priority flag is not in an ON state (No in S2c), the microcomputer 82 executes a charging routine illustrated in FIG. 41 (S4) and sets the power supply source to the DC power supply 90 (S2d). In a case where the battery priority flag is in an ON state (Yes in S2c), the microcomputer 82 sets the power supply source to the battery pack 29a or 29b (S2e). In a case where power is not supplied from the DC power supply 90 (No in S2a), the microcomputer 82 sets the power supply source to the battery pack 29a or 29b (S2e). In a case where neither of the battery packs 29a and 29b are connected (No in S2b), the microcomputer 82 sets the power supply source to the DC power supply 90 (S2d). In a case where the power supply source is determined, the power selection routine is ended.

FIG. 40 is a flowchart illustrating a DC power state determination routine (S3) in FIG. 39. The power state determination routine is a routine for setting an ON state and an OFF state of the battery priority flag. The battery priority flag is in an OFF state in an initial state. That is, the battery priority flag is set to an OFF state in a case where the power supply is turned of.

In a case where the battery priority flag is not in an ON state (No in S3a), when the voltage of the DC power supply 90 decreases below the threshold value for switching to the battery during starting of the motor of the compressor 41 (Yes in S3b), the microcomputer 81 sets the battery priority flag to an ON state (S3c), and ends the DC power state determination routine. In a case where the voltage of the DC power supply 90 does not decrease below the threshold value for switching to the battery during starting of the motor of the compressor 41 in S3b (No in S3b), the microcomputer 81 ends the DC power state determination routine without changing the battery priority flag from an OFF state.

In a case where the battery priority flag is in an ON state (Yes in S3a), when 15 minutes that is an example of a predetermined time has elapsed from setting of the battery priority flag to an ON state (Yes in S3d), the microcomputer 81 sets the battery priority flag to an OFF state (S3e), and ends the DC power state determination routine. In a case where 15 minutes has not elapsed from setting of the battery priority flag to an ON state in S3d (No in S3d), the microcomputer 81 ends the DC power state determination routine without changing the battery priority flag from an ON state.

The condition for proceeding to Yes in S3b and setting the battery priority flag to an ON state may be that a drive current for the compressor 41 cannot be detected instead of or in addition to a voltage of the DC power supply 90 decreasing below the threshold value for switching to the battery. In this case, it is detected that the motor of the compressor 41 cannot be started on the basis of a drive current for the compressor 41 and the battery priority flag is set to an ON state. In this case, the battery priority flag may be set to an ON state in a case where a state in which the drive current for the compressor 41 cannot be detected is detected for a predetermined time (for example, 30 seconds). Alternatively, the condition for proceeding to Yes in S3b and setting the battery priority flag to an ON state may be that the drive current for the compressor 41 is too large (exceeds a predetermined value). If the voltage of the DC power supply 90 is low, a current becomes large to secure power. Therefore, the fact that the drive current for the compressor 41 is excessive indicates that the voltage of the DC power supply 90 has not reached a required value.

The condition for proceeding to Yes in S3d and setting the battery priority flag to an OFF state may be that the voltage of the DC power supply 90 has increased to a voltage that can withstand starting of the compressor 41 (a predetermined voltage higher than the threshold value for switching to the in-vehicle power supply) or higher. This voltage is high enough not to fall below the threshold value for switching to the battery, for example, 15.5 V, even if a voltage drop occurs due to a starting current for the compressor 41.

FIG. 41 is a flowchart illustrating a specific operation of the charging routine (S4 in FIG. 38) in the electric device 1. The microcomputer 82 selects a connection port (port 1) of the battery pack 29a (S11), and if the battery pack 29a can be charged (Yes in S12), charges the battery pack 29a (S13). In a case where the charging of the battery pack 29a is completed (Yes in S14), the microcomputer 82 selects a connection port (port 2) of the battery pack 29b (S15), and if the battery pack 29b can be charged (Yes in S16), charges the battery pack 29b (S17). The microcomputer 82 recognizes that the charged battery packs 29a and 29b can be discharged (S19).

FIG. 42 is a flowchart illustrating a specific operation of the electric device 1 in the large room single mode (S7 in FIG. 38). The microcomputer 81 reads a set temperature of the first accommodation chamber 9 (S21) and reads an output signal from the first thermistor 55 (the current temperature of the first accommodation chamber 9) (S22). In a case where the current temperature of the first accommodation chamber 9 is higher than the set temperature+2° C. (Yes in S23), the microcomputer 81 sets a rotation speed of the compressor 41 to 2,500 rpm (S24). The microcomputer 81 turns on (opens) the first regulating valve 47a and turns off (closes) the second regulating valve 47b (S25), and then drives the compressor 41 (S26). In a case where the current temperature of the first accommodation chamber 9 is not higher than the set temperature+2° C. in S23 (No in S23), if the current temperature of the second accommodation chamber 10 is lower than the set temperature—2° C. (Yes in S27), the microcomputer 81 drives the first heating part 51 and stops the second heating part 52 (S28).

FIG. 43 is a flowchart illustrating a specific operation in the small room single mode (S8 in FIG. 38) of the electric device 1. The microcomputer 81 reads a set temperature of the second accommodation chamber 10 (S31), and reads an output signal from the second thermistor 56 (the current temperature of the second accommodation chamber 10) (S32). In a case where the current temperature of the second accommodation chamber 10 is higher than the set temperature+2° C. (Yes in S33), the microcomputer 81 sets a rotation speed of the compressor 41 to 2,000 rpm (S34). The microcomputer 81 turns on (opens) the second regulating valve 47b and turns off (closes) the first regulating valve 47a (S35), and then drives the compressor 41 (S36). In a case where the current temperature of the second accommodation chamber 10 is not higher than the set temperature+2° C. in S33 (No in S33), if the current temperature of the first accommodation chamber 9 is lower than the set temperature—2° C. (Yes in S37), the microcomputer 81 stops the first heating part 51 and drives the second heating part 52 (S38).

FIG. 44 is a flowchart illustrating a specific operation of the electric device 1 in the one-room mode (S9 in FIG. 38). The microcomputer 81 reads a set temperature in the one-room mode (S41), and reads an output signal from the first thermistor 55 (the current temperature of the first accommodation chamber 9) (S42). In a case where the current temperature of the first accommodation chamber 9 is higher than the set temperature+2° C. (Yes in S43), the microcomputer 81 sets a rotation speed of the compressor 41 to 3,000 rpm (S44). The microcomputer 81 turns on (opens) the first regulating valve 47a and the second regulating valve 47b (S45), and then drives the compressor 41 (S46). In a case where the current temperature of the first accommodation chamber 9 is not higher than the set temperature+2° C. in S43 (No in S43), if the current temperature of the first accommodation chamber 9 is lower than the set temperature—2° C. (Yes in S47), the microcomputer 81 drives the first heating part 51 and the second heating part 52 (S48). In S42, S43, and S47, an output signal from the second thermistor 56 (the current temperature of the second accommodation chamber 10) may be used as the current temperature, or an average of the current temperatures of the first accommodation chamber 9 and the second accommodation chamber 10 may be calculated from both of output signals from the first thermistor 55 and the second thermistor 56 and used.

FIG. 45 is a flowchart illustrating a specific operation of the electric device 1 in the two-room mode (S10 in FIG. 38). The microcomputer 81 reads set temperatures of the first accommodation chamber 9 and the second accommodation chamber 10 (S51), and reads output signals from the first thermistor 55 and the second thermistor 56 (the current temperatures of the first accommodation chamber 9 and the second accommodation chamber 10) (S52). In a case where the current temperature of the first accommodation chamber 9 is higher than the set temperature+2° C. (Yes in S53) and the current temperature of the second accommodation chamber 10 is higher than the set temperature+2° C. (Yes in S54), the microcomputer 81 sets a rotation speed of the compressor 41 to 3,000 rpm (S55). The microcomputer 81 turns on (opens) the first regulating valve 47a and the second regulating valve 47b (S56), and then drives the compressor 41 (S57). In a case where the current temperature of the second accommodation chamber 10 is not higher than the set temperature+2° C. in S54 (No in S54), the microcomputer 81 sets the rotation speed of the compressor 41 to 2,500 rpm (S58). The microcomputer 81 turns on (opens) the first regulating valve 47a and turns off (closes) the second regulating valve 47b (S59), and then drives the compressor 41 (S60). In a case where the current temperature of the second accommodation chamber 10 is lower than the set temperature—2° C. (Yes in S74), the microcomputer 81 stops the first heating part 51 and drives the second heating part 52 (S75).

In a case where the current temperature of the first accommodation chamber 9 is not higher than the set temperature+2° C. in S53 (No in S53), and in a case where the current temperature of the first accommodation chamber 9 is lower than the set temperature −2° C. (Yes in S61) and the current temperature of the second accommodation chamber 10 is higher than the set temperature+2° C. (S62), the microcomputer 81 sets the rotation speed of the compressor 41 to 2,000 rpm (S63). The microcomputer 81 turns off (closes) the first regulating valve 47a and turns on (opens) the second regulating valve 47b (S64), and then drives the compressor 41 (S65). On the other hand, the microcomputer 81 drives the first heating part 51 and stops the second heating part 52 (S66). In a case where the current temperature of the second accommodation chamber 10 is not higher than the set temperature+2° C. in S62 (No in S62), if the current temperature of the second accommodation chamber 10 is lower than the set temperature—2° C. (Yes in S67), the microcomputer 81 drives the first heating part 51 and the second heating part 52 (S68). In a case where the current temperature of the second accommodation chamber 10 is not lower than the set temperature −2° C. in S67, the microcomputer 81 drives the first heating part 51 and stops the second heating part 52 (S69).

In a case where the current temperature of the first accommodation chamber 9 is not lower than the set temperature −2° C. in S61 (No in S61), if the current temperature of the second accommodation chamber 10 is higher than the set temperature+2° C. (Yes in S70), and the microcomputer 81 sets the rotation speed of the compressor 41 to 2,000 rpm (S71). The microcomputer 81 turns off (closes) the first regulating valve 47a and turns on (opens) the second regulating valve 47b (S72), and then drives the compressor 41 (S73). In a case where the current temperature of the second accommodation chamber 10 is not higher than the set temperature+2° C. in S70 (No in S70), if the current temperature in the second accommodation chamber 10 is lower than the set temperature—2° C. (Yes in S74), the microcomputer 81 stops the first heating part 51 and drives the second heating part 52 (S75).

In the cooling control for the first accommodation chamber 9, the microcomputer 81 stops turning-on the first regulating valve 47a and driving the compressor 41 in a case where the current temperature of the first accommodation chamber 9 is lower than the set temperature by a predetermined value (for example, 2° C.). In order to prevent the first heating part 51 from being driven immediately after stopping turning-on of the first regulating valve 47a and driving of the compressor 41, a waiting time may be provided between stopping of turning-on of the first regulating valve 47a and driving of the compressor 41 and determination of whether or not to drive the first heating part 51.

Similarly, in the cooling control for the second accommodation chamber 10, the microcomputer 81 stops turning-on of the second regulating valve 47b and driving of the compressor 41 in a case where the current temperature of the second accommodation chamber 10 is lower than the set temperature by a predetermined value (for example, 2° C.). In order to prevent the second heating part 52 from being driven immediately after stopping turning-on of the second regulating valve 47b and driving of the compressor 41, a waiting time may be provided between stopping of turning-on of the second regulating valve 47b and driving of the compressor 41 and determination of whether or not to drive the second heating part 52.

In the heating control for the first accommodation chamber 9, the microcomputer 81 stops driving the first heating part 51 in a case where the current temperature of the first accommodation chamber 9 is higher than the set temperature by a predetermined value (for example, 2° C.). In order to prevent the cooling control for the first accommodation chamber 9 from being started immediately after the first heating part 51 is stopped, a waiting time may be provided between stopping of the first heating part 51 and determination of whether or not to start the cooling control for the first accommodation chamber 9.

Similarly, in the heating control for the second accommodation chamber 10, the microcomputer 81 stops driving the second heating part 52 in a case where the current temperature of the second accommodation chamber 10 is higher than the set temperature by a predetermined value (for example, 2° C.). In order to prevent the cooling control for the second accommodation chamber 10 from being started immediately after the second heating part 52 is stopped, a waiting time may be provided between stopping of the second heating part 52 and determination of whether or not to start the cooling control for the second accommodation chamber 10.

In FIGS. 42 to 45, 2,500 rpm is an example of the maximum drive intensity (first intensity) of the compressor 41 according to a size of the first accommodation chamber 9. 2,000 rpm is an example of the maximum drive intensity (second intensity) of the compressor 41 according to a size of the second accommodation chamber 10. 3,000 rpm is an example of the maximum drive intensity (third intensity) of the compressor 41 corresponding to a total size of the first accommodation chamber 9 and the second accommodation chamber 10. That is, the microcomputer 81 switches drive states (maximum drive intensity) of the compressor 41 according to a size of the accommodation chamber to be cooled. In a case of increasing a drive state, the microcomputer 81 may perform control of switching between an opening state and a closing state of the regulating valve 87 and switching between drives states, and in a case of decreasing the drive state, the microcomputer 81 may perform control of switching between drive states and then switching between an opening state and a closing state of the regulating valve 87.

FIG. 46 is a graph illustrating temporal changes in temperatures of the first accommodation chamber 9 and the second accommodation chamber 10 and a rotation speed of the compressor 41 in a case where an operation is performed in the two-room mode when a set temperature of the first accommodation chamber 9 is 10° C. and a set temperature of the second accommodation chamber 10 is −18° C. At the beginning of operation, temperatures of the first accommodation chamber 9 and the second accommodation chamber 10 are about 30° C., the control in S55 to S57 in FIG. 45 is performed, and the compressor 41 is driven at 3,000 rpm. As a result, the temperatures of the first accommodation chamber 9 and the second accommodation chamber 10 decrease. In a case where the temperature of the first accommodation chamber 9 reaches 8° C. around 8 minutes, the control in S71 to S73 in FIG. 45 is performed, the first accommodation chamber 9 is stopped to be cooled (transition to cooling of only the second accommodation chamber 10), and the rotation speed of the compressor 41 decreases to 2,000 rpm. In a case where the temperature of the first accommodation chamber 9 exceeds 12° C. around 15 minutes, the control in S55 to S57 in FIG. 45 is performed, the cooling of the first accommodation chamber 9 is resumed, and the rotation speed of the compressor 41 increases to 3,000 rpm. Thereafter, the same operation is repeatedly performed, the temperature of the first accommodation chamber 9 is kept around 10° C., and the temperature of the second accommodation chamber 10 decreases toward −18° C.

FIG. 47 is a graph illustrating temporal changes in temperatures of the first accommodation chamber 9 and the second accommodation chamber 10 and a rotation speed of the compressor 41 in a case where an operation is performed in the two-room mode when a set temperature of the first accommodation chamber 9 is 18° C. and a set temperature of the second accommodation chamber 10 is 10° C. At the beginning of operation, temperatures of the first accommodation chamber 9 and the second accommodation chamber 10 are about 30° C., the control in S55 to S57 in FIG. 45 is performed, and the compressor 41 is driven at 3,000 rpm. As a result, the temperatures of the first accommodation chamber 9 and the second accommodation chamber 10 decrease. In a case where the temperature of the second accommodation chamber 10 reaches 8° C. around 8 minutes, the control in S58 to S60 in FIG. 45 is performed, the second accommodation chamber 10 is stopped to be cooled (transition to cooling of only the first accommodation chamber 9), and the rotation speed of the compressor 41 decreases to 2,500 rpm. In a case where the temperature of the second accommodation chamber 10 exceeds 12° C. around 15 minutes, the control in S55 to S57 in FIG. 45 is performed, the cooling of the second accommodation chamber 10 is resumed, and the rotation speed of the compressor 41 increases to 3,000 rpm. Thereafter, the same operation is repeatedly performed, the temperature of the second accommodation chamber 10 is kept around 10° C., and the temperature of the first accommodation chamber 9 decreases toward −18° C.

FIG. 48 is a time chart illustrating a voltage input to the compressor 41, a rotation speed of the compressor 41, opening and closing signals for the first regulating valve 47a and the second regulating valve 47b, turning-on and turning-off of the first heating part 51 and the second heating part 52, and temperatures of the first accommodation chamber 9 and the second accommodation chamber 10. The first regulating valve 47a and the second regulating valve 47b are solenoid valves that apply a pulse signal only when switching between opening and closing.

At time point to, temperatures of the first accommodation chamber 9 and the second accommodation chamber 10 are 30° C., and the microcomputer 81 performs the control in S55 to S57 in FIG. 45. That is, the microcomputer 81 outputs a valve opening/closing signal for setting both the first regulating valve 47a and the second regulating valve 47b to an open state, and then drives the compressor 41 at 3,000 rpm. In a case where the temperature of the second accommodation chamber 10 reaches 8° C. at time point t1, the microcomputer 81 performs the control in S58 to S60 in FIG. 45. That is, the microcomputer 81 outputs a valve opening/closing signal for opening the first regulating valve 47a and closing the second regulating valve 47b, and then drives the compressor 41 at 2,500 rpm. In a case where the temperature of the second accommodation chamber 10 reaches 12° C. at time point t2, the microcomputer 81 performs the control in S55 to S57 in FIG. 45. That is, the microcomputer 81 outputs a valve opening/closing signal for setting both the first regulating valve 47a and the second regulating valve 47b to an open state, and then drives the compressor 41 at 3,000 rpm.

In a case where the temperature of the second accommodation chamber 10 reaches 8° C. at time point t3, the microcomputer 81 outputs a valve opening/closing signal for setting the first regulating valve 47a to an open state and setting the second regulating valve 47b to a closed state in the same manner as in the control at time point t1, and then drives the compressor 41 at 2,500 rpm. At time point t3, the cooling control for the second accommodation chamber 10 is temporarily stopped, but due to heat transfer to the first accommodation chamber 9 having a lower temperature, the temperature of the second accommodation chamber 10 also decreases after time point t3. At time point t4 after a predetermined period of time has elapsed from time point t3, the microcomputer 81 starts driving the second heating part 52 (S75 in FIG. 45). As a result, the temperature of the second accommodation chamber 10 begins to increase. In a case where the temperature of the second accommodation chamber 10 reaches 12° C. at time point t5, the microcomputer 81 stops the second heating part 52 and performs the control in S55 to S57 in FIG. 45. That is, the microcomputer 81 outputs a valve opening/closing signal for setting both the first regulating valve 47a and the second regulating valve 47b to an open state, and then drives the compressor 41 at 3,000 rpm. The microcomputer 81 performs the same control as during time points t3 to t5 during time points t6 to t8. According to the present embodiment, the following effects can be achieved.

(1) Since the control circuit board 80 on which the charging circuit 88 is mounted and the fan 49 are accommodated in the second body part 4, the charging circuit 88 can be efficiently cooled.

(2) The fan air generated by the fan 49 is branched into the first air passage 33 for cooling the cooling mechanism 40 (especially the condenser 42) and the second air passage 34 for cooling the control circuit board 80 by the branch part 32. Therefore, the cooling mechanism 40 and the control circuit board 80 can be cooled separately and efficiently with fresh air.

(3) By integrating the branch part 32 with the battery box 30, the influence of the provision of the branch part 32 on the assembly process can be suppressed.

(4) Since the first refrigerant pipe 45 is provided on the side surface of the first accommodation chamber 9 and the second refrigerant pipe 46 is provided on the side surface of the second accommodation chamber 10, compared with a configuration in which the refrigerant pipes are disposed on the bottom surface, temperatures can be individually regulated over a wide area including the upper parts of the first accommodation chamber 9 and the second accommodation chamber 10, and thus convenience can be improved. The first refrigerant pipe 45 is provided on three side surfaces of the first accommodation chamber 9, and the second refrigerant pipe 46 is provided on three side surfaces of the second accommodation chamber 10, and thus such an effect is remarkable.

(5) Since the first refrigerant pipe 45 is provided with the first regulating valve 47a and the second refrigerant pipe 46 is provided with the second regulating valve 47b, flows of a refrigerant in the first refrigerant pipe 45 and the second refrigerant pipe 46 can be individually regulated, and temperatures of the first accommodation chamber 9 and the second accommodation chamber 10 can be individually regulated. As a result, one of the first accommodation chamber 9 and the second accommodation chamber 10 can be set to be frozen, and the other can be set to be refrigerated, so that convenience can be improved.

(6) Since the first heating part 51 for heating the first accommodation chamber 9 and the second heating part 52 for heating the second accommodation chamber 10 are provided, heating as well as cooling can be performed, and thus convenience is improved.

One of the first accommodation chamber 9 and the second accommodation chamber 10 can be set to be frozen or refrigerated and the other can be set to be heated, or one can be set to be strongly heated and the other be set to be weakly heated, and thus convenience can be improved.

(7) The microcomputer 81 operates the first heating part 51 or the second heating part 52 as necessary during the process of controlling the temperatures of the first accommodation chamber 9 and the second accommodation chamber 10 to be lower than the outside air temperature. Thus, for example, in a case where a set temperature difference between the first accommodation chamber 9 and the second accommodation chamber 10 is large, and heat transfer to one of the first accommodation chamber 9 and the second accommodation chamber 10 having a lower set temperature causes the temperature of the other to further decrease below the set temperature, the temperature of the other can be prevented from deviating downward from the set temperature by heating the other.

(8) The microcomputer 81 operates the cooling mechanism 40 as necessary even in the process of controlling the temperatures of the first accommodation chamber 9 and the second accommodation chamber 10 to be higher than the outside air temperature. Thus, for example, in a case where a set temperature difference between the first accommodation chamber 9 and the second accommodation chamber 10 is large, and heat transfer from one of the first accommodation chamber 9 and the second accommodation chamber 10 having the higher set temperature causes the temperature of the other to exceed the set temperature and further increase, by cooling the other, it is possible to prevent the temperature of the other from deviating upward from the set temperature.

(9) Since the microcomputer 81 changes the maximum drive intensity of the compressor 41 according to a size of the accommodation chamber to be cooled, the compressor 41 can be driven with an intensity suitable for the size of the accommodation chamber, a load on the compressor 41 can be reduced, and the life of the compressor 41 can be extended. Specifically, for example, in a case where only the second accommodation chamber 10 is cooled, if a rotation speed of the compressor 41 is 2,500 rpm or 3,000 rpm, the rotation speed is too high (drive intensity is too high), and a phenomenon in which the refrigerant returns to the compressor 41 in a liquid state may occur. If the refrigerant returns to the compressor 41 in a liquid state, an extra load may be applied to the compressor 41 and thus the life of the compressor 41 may be shortened. According to the present embodiment, such problems can be suitably solved.

(10) Since the first regulating valve 47a and the second regulating valve 47b are respectively provided in the portions of the first refrigerant pipe 45 and the second refrigerant pipe 46 where the refrigerant flows in a gaseous state, a refrigerant is sent out to the first refrigerant pipe 45 and the second refrigerant pipe 46 by the single compressor 41, and thus it is possible to suppress unevenness in the flow of the refrigerant due to inclination even if the electric device 1 is in an inclined state. As a result, it is possible to prevent the refrigerant from unevenly flowing through either the first refrigerant pipe or the second refrigerant pipe 46, and thus to suppress cooling of either the first accommodation chamber 9 or the second accommodation chamber 10 from being insufficient. Therefore, it is possible to prevent temperatures of the first accommodation chamber 9 and the second accommodation chamber 10 from deviating from set temperatures.

(11) The microcomputer 81 controls a set temperature difference between the first accommodation chamber 9 and the second accommodation chamber 10 to be within a predetermined value. Thus, it is possible to prevent the set temperature difference from exceeding the maximum temperature difference between the first accommodation chamber 9 and the second accommodation chamber 10 that can be realized through the heat insulation effect of the partition plate 70 (or the partition plate 170). Consequently, it is possible to suppress the risk that the temperatures of the first accommodation chamber 9 and the second accommodation chamber 10 cannot reach the set temperatures.

(12) In a case where a set temperature of one of the first accommodation chamber 9 and the second accommodation chamber 10 is changed such that a set temperature difference exceeds a predetermined value, the microcomputer 81 automatically changes a set temperature of the other such that the set temperature difference is included in the predetermined value, and thus convenience is high.

(13) Since the partition plate 70 has a two-part configuration, it is more convenient to carry and store the partition plate than a single plate. Since the partition plate 170 is foldable, it is more convenient to carry and store the partition plate than a single plate.

(14) The partition plate 70 can be divided into the upper partition plate 71 and the lower partition plate 72, and as illustrated in FIG. 26, the lower partition plate 72 is attached and can also be used as a scattering prevention wall for the accommodation object 79 accommodated in the accommodation chamber 8, and thus convenience is high.

(15) The mating part 73 of the upper partition plate 71 and the lower partition plate 72 has a spigot structure, and the heat insulating material 74 extends to the inside of the spigot structure. Therefore, heat transfer between the first accommodation chamber 9 and the second accommodation chamber 10 can be suppressed. Similarly, the mating part 173 of the upper partition plate 171 and the lower partition plate 172 has a spigot structure, and the heat insulating material 174 extends to the inside of the spigot structure. Therefore, heat transfer between the first accommodation chamber 9 and the second accommodation chamber 10 can be suppressed.

(16) The rail member 18 is configured to guide attachment of the partition plate 70 (or the partition plate 170) via the recessed part 18b, and does not protrude inward from the inner surface of the accommodation chamber 8. Thus, it is possible to prevent a volume of the accommodation chamber 8 from decreasing due to the configuration for guiding the partition plate 70 (or the partition plate 170). Although the rail member 18 protrudes outward from the outer surface of the accommodation chamber 8, the first refrigerant pipe 45 and the second refrigerant pipe 46 are divided into left and right sides of the rail member 18 and wound around the accommodation chamber 8. Therefore, the influence of the rail member 18 on the disposition of the first refrigerant pipe 45 and the second refrigerant pipe 46 is restricted.

(17) In a state in which an in-vehicle power supply as the DC power supply 90 is connected to the power input terminal 28 and the battery pack 29a or 29b is connected to the battery pack attachment part 22a, in a case where a power supply source is switched from the in-vehicle power supply to the battery pack 29a or 29b according to a detection result from the DC power supply voltage detection circuit 86c, the microcomputer 82 maintains the supply of power from the battery pack 29a or 29b to the compressor 41 for a predetermined time. As a result, unlike a case where the power supply source is switched to the DC power supply 90 only on the condition that a voltage of the DC power supply 90 is higher than 12 V, it is possible to prevent that the compressor 41 cannot be driven, that is, the electric device 1 cannot be substantially operated due to repetition of unnecessary switching of a power supply source between the DC power supply 90 and the battery pack 29a or 29b and thus to suppress a cooling failure.

The electric device 1 sends out a refrigerant to the first refrigerant pipe 45 and the second refrigerant pipe 46 (cools the first accommodation chamber 9 and the second accommodation chamber 10) with the single compressor 41, but if it is attempted to send out the refrigerant to the first refrigerant pipe 45 and the second refrigerant pipe 46 at the same time (cool the first accommodation chamber 9 and the second accommodation chamber 10 at the same time), temperatures of the first accommodation chamber 9 and the second accommodation chamber 10 may deviate from set temperatures (both chambers cannot reach the set temperatures) due to dimensional errors in diameters of the first refrigerant pipe 45 and the second refrigerant pipe 46, a length difference caused by a difference in a structure in which the first refrigerant pipe 45 and the second refrigerant pipe 46 are laid, or dimensional errors of the two systems of capillaries connected to the first refrigerant pipe 45 and the second refrigerant pipe 46.

In order to deal with this problem, the electric device 1 can perform an alternating operation mode. The alternating operation mode is a mode in which alternating cooling is performed by repeatedly causing a refrigerant to flow through only the first refrigerant pipe 45 and the refrigerant to flow through only the second refrigerant pipe 46. In the alternating operation mode, turning-on (opening) of the first regulating valve 47a and turning-on (opening) of the second regulating valve 47b do not overlap.

FIG. 49 is a flowchart illustrating an operation in a two-room mode in which the alternating operation mode is added to the two-room mode in FIG. 45. In this flowchart, determination 1 (S521) and determination 2 (S522) for determining whether to transition to the alternating operation mode are added after S52 in FIG. 45. In a case where conditions of determination 1 (S521) and determination 2 (S522) are both satisfied (Yes in S521 and Yes in S522), the microcomputer 81 transitions to the alternating operation mode (S523). In a case where at least one of the conditions of determination 1 (S521) and determination 2 (S522) is not satisfied (No in S521 or No in S522), the microcomputer 81 proceeds to S53 in FIG. 45.

FIG. 50 is a diagram for describing a specific example of determination 1 (S521) in FIG. 49. Determination 1 is a first condition necessary for transitioning to the alternating operation mode, and is, for example, one of the following patterns. •Pattern 1: It is determined whether a set temperature of at least one of the first accommodation chamber 9 and the second accommodation chamber 10 is lower than a designated temperature (for example, 0° C.). •Pattern 2: It is determined whether set temperatures of both the first accommodation chamber 9 and the second accommodation chamber 10 are lower than a designated temperature (for example, 0° C.). If a result of determination 1 is Yes, the process proceeds to determination 2 (S522).

FIG. 51 is a diagram for describing a specific example of determination 2 (S522) in FIG. 49. Determination 2 is a second condition necessary for transitioning to the alternating operation mode, and is, for example, one of the following patterns. •Pattern 1: It is determined whether a temperature of at least one of the first accommodation chamber 9 and the second accommodation chamber 10 is lower than a designated temperature (for example, 0° C.). •Pattern 2: It is determined whether temperatures of both the first accommodation chamber 9 and the second accommodation chamber 10 are lower than a designated temperature (for example, 0° C.). •Pattern 3: It is determined whether simultaneous cooling in which a refrigerant is sent out to the first refrigerant pipe and the second refrigerant pipe 46 at the same time (cooling the first accommodation chamber 9 and the second accommodation chamber 10 at the same time) has been executed for a designated time (for example, 20 minutes). •Pattern 4: It is determined whether the outside air temperature exceeds a designated temperature (for example, 35° C.). Pattern 5: It is determined whether a drive current for the compressor 41 exceeds a designated current value (8 A, for example). •Pattern 6: It is determined whether an input voltage of the compressor 41 is less than a designated voltage value (12 V). •Pattern 7: It is determined whether a temperature difference between the first accommodation chamber 9 and the second accommodation chamber 10 exceeds a designated temperature difference (for example, 2° C.). In a case where a result of determination 2 is Yes, that is, in a case where the predetermined state is reached, even if both the temperatures of the first accommodation chamber 9 and the second accommodation chamber 10 have not reached the set temperatures, the simultaneous operation mode for simultaneous cooling transitions to the alternating operation mode (S523).

In determinations 1 and 2, the designated temperatures for the set temperatures of the first accommodation chamber 9 and the second accommodation chamber 10 and the designated temperature (predetermined temperature) for the current temperature are set to temperatures that can be reliably reached as temperatures of the first accommodation chamber 9 and the second accommodation chamber 10 even in the simultaneous operation mode. The designated temperature may be determined to be, for example, the outside air temperature −20° C. in relation to the outside air temperature.

FIG. 52 is a diagram illustrating a specific example of determination 3 (S80) in FIG. 53. Determination 3 is determination or setting regarding to which of the first refrigerant pipe 45 and the second refrigerant pipe 46 the refrigerant is sent out first in the alternating operation mode (which of the first accommodation chamber 9 and the second accommodation chamber 10 is cooled first), and is, for example, one of the following patterns. •Pattern 1: A refrigerant is sent out first to a refrigerant pipe corresponding to a higher temperature out of the first accommodation chamber 9 and the second accommodation chamber 10 (cooling is performed from a higher temperature room). •Pattern 2: A refrigerant is sent out first to the first refrigerant pipe 45 (cooled from the first accommodation chamber 9). •Pattern 3: A refrigerant is sent out first to the second refrigerant pipe 46 (cooled from the second accommodation chamber 10). In determination 3, in a case where the refrigerant is sent out first to the first refrigerant pipe (cooled from the first accommodation chamber 9), 1 is assigned to a flag, and in a case where the refrigerant is sent out first to the second refrigerant pipe 46 (cooling from the second accommodation chamber 10), 0 is assigned to the flag.

FIG. 53 is a flowchart illustrating a first pattern of the alternating operation mode (S523) in FIG. 49. In the first pattern of the alternating operation mode, in a case where a temperature difference between the first accommodation chamber 9 and the second accommodation chamber 10 exceeds a designated temperature difference (for example, 2° C.), a refrigerant pipe to which the refrigerant is sent out is changed (a room to be cooled). After determination 3 (S81), if the flag is 0 (Yes in S82), the microcomputer 81 reads set temperatures of the first accommodation chamber 9 and the second accommodation chamber 10 (S83), and reads output signals from the first thermistor 55 and the second thermistor 56 (the current temperature of the first accommodation chamber 9 and the second accommodation chamber 10) (S84). In a case where the current temperature of the second accommodation chamber 10 is lower than the set temperature (Yes in S85) and in a case where the current temperature of the first accommodation chamber 9 is lower than the set temperature (Yes in S86), the microcomputer 81 stops the compressor 41 (S87). In a case where the current temperature of the second accommodation chamber 10 is lower than the set temperature—2° C. (Yes in S88), the microcomputer 81 drives the second heating part 52 (S89), and in other cases (No in S88), stops the second heating part 52 (S90). The microcomputer 81 assigns 1 to the flag (S95), and checks whether or not determination 2 is satisfied (S96).

In a case where the temperature of the first accommodation chamber 9 is not lower than the set temperature in S86 (No in S86), the microcomputer 81 assigns 1 to the flag (S95), and checks whether or not determination 2 is satisfied (S96).

In a case where the current temperature of the second accommodation chamber is not lower than the set temperature in S85 (No in S85), if the current temperature of the second accommodation chamber 10 is not lower than the current temperature of the first accommodation chamber 9—2° C. (No in S91), the microcomputer 81 turns off (closes) the first regulating valve 47a and turns on (opens) the second regulating valve 47b (S92), sets the rotation speed of the compressor 41 to 2,000 rpm (S93), and drives the compressor 41 (S94). As a result, the refrigerant is sent out to the second refrigerant pipe 46 (the refrigerant is not sent out to the first refrigerant pipe 45). After that, the microcomputer 81 checks whether or not determination 2 is satisfied (S96). If the current temperature of the second accommodation chamber 10 is lower than the current temperature of the first accommodation chamber 9—2° C. in S91 (Yes in S91), the microcomputer 81 assigns 1 to the flag (S95) and checks whether or not determination 2 is satisfied (S96).

If the flag is 1 in S82 (No in S82), the microcomputer 81 reads set temperatures of the first accommodation chamber 9 and the second accommodation chamber 10 (S103), and reads output signals from the first thermistor 55 and the second thermistor 56 (the current temperatures of the first accommodation chamber 9 and the second accommodation chamber 10) (S104). In a case where the current temperature of the first accommodation chamber 9 is lower than the set temperature (Yes in S105) and in a case where the current temperature of the second accommodation chamber 10 is lower than the set temperature (Yes in S106), the microcomputer 81 stops the compressor 41 (S107). In a case where the current temperature of the first accommodation chamber 9 is lower than the set temperature—2° C. (Yes in S108), the microcomputer 81 drives the first heating part 51 (S109), and in other cases (No in S108), stops the first heating part 51 (S110). The microcomputer 81 assigns 0 to the flag (S115), and checks whether or not determination 2 is satisfied (S96).

In a case where the temperature of the second accommodation chamber 10 is not lower than the set temperature in S106 (No in S106), the microcomputer 81 assigns 0 to the flag (S115), and checks whether or not determination 2 is satisfied (S96).

In a case where the current temperature of the first accommodation chamber 9 is not lower than the set temperature in S105 (No in S105), if the current temperature of the first accommodation chamber 9 is not lower than the current temperature of the second accommodation chamber 10—2° C. (No in S111), the microcomputer 81 turns on (opens) the first regulating valve 47a and turns off (closes) the second regulating valve 47b (S112), sets the rotation speed of the compressor 41 to 2,500 rpm (S113), and drives the compressor 41 (S114). As a result, the refrigerant is sent out to the first refrigerant pipe 45 (the refrigerant is not sent out to the second refrigerant pipe 46). After that, the microcomputer 81 checks whether or not determination 2 is satisfied (S96). If the current temperature of the first accommodation chamber 9 is lower than the current temperature of the second accommodation chamber 10—2° C. in S111 (Yes in S111), the microcomputer 81 assigns 0 to the flag (S115) and checks whether or not determination 2 is satisfied (S96).

In a case where determination 2 is satisfied (Yes in S96), the microcomputer 81 returns to S82, and if determination 2 is not satisfied (No in S96), ends the alternating operation mode and returns to S51 in FIG. 49.

In FIG. 53, in a case where a cooling target is switched from the second accommodation chamber 10 to the first accommodation chamber 9, the microcomputer 81 may be perform control for switching opening and closing states of the regulating valve 47 and then increasing an output from (rotation speed of) the compressor 41, and in a case where a cooling target is switched from the first accommodation chamber 9 to the second accommodation chamber 10, the microcomputer 81 may perform control for decreasing an output from (rotation speed of) the compressor 41 and then switching opening and closing states of the regulating valve 47.

In FIG. 53, in a case where the set temperature of at least one of the first accommodation chamber 9 and the second accommodation chamber 10 is changed and determination 2 is satisfied to enter the alternating operation mode, the microcomputer 81 may cause a refrigerant to be sent out first to only a refrigerant pipe corresponding to one accommodation chamber with the higher current temperature. After that, the microcomputer 81 may change a refrigerant pipe to which a refrigerant is to be sent out when a slope of the temperature in the other accommodation chamber changes from negative to positive, or when the current temperature is reversed and a temperature difference reaches a predetermined value (for example, 2° C.) or more.

FIG. 54 is a flowchart illustrating a second pattern of the alternating operation mode (S523) in FIG. 49. In the second pattern of the alternating operation mode, the refrigerant pipes to which the refrigerant is to be sent out (rooms to be cooled) are switched according to time. In a case of cooling either the first accommodation chamber 9 or the second accommodation chamber 10, the rotation speed of the compressor 41 is set to 2,000 rpm, and one cooling time for the first accommodation chamber 9 having a large volume is longer than that of the second accommodation chamber 10 having a small volume. After determination 3 (S81), the microcomputer 81 starts a timer (S122).

In a case where the flag is 0 (Yes in S123) and the elapsed time of the timer has not exceeded 300 seconds that is an example of a second predetermined time (No in S124), the microcomputer 81 reads set temperatures of the first accommodation chamber 9 and the second accommodation chamber 10 (S125), and reads output signals from the first thermistor 55 and the second thermistor 56 (the current temperatures of the first accommodation chamber 9 and the second accommodation chamber 10) (S126).

In a case where the current temperature of the second accommodation chamber is lower than the set temperature (Yes in S127) and in a case where the current temperature of the first accommodation chamber 9 is lower than the set temperature (Yes in S128), the microcomputer 81 stops the compressor 41 (S129). In a case where the current temperature of the second accommodation chamber 10 is lower than the set temperature—2° C. (Yes in S130), the microcomputer 81 drives the second heating part 52 (S131), and in other cases (No in S130), stops the second heating part 52 (S132). The microcomputer 81 assigns 1 to the flag (S136), resets the timer (S137), and checks whether or not determination 2 is satisfied (S138).

In a case where the temperature of the first accommodation chamber 9 is not lower than the set temperature in S128 (No in S128), the microcomputer 81 assigns 1 to the flag (S136), resets the timer (S137), and checks whether determination 2 is satisfied (S138).

In a case where the current temperature of the second accommodation chamber is not lower than the set temperature in S127 (No in S127), the microcomputer 81 turns off (closes) the first regulating valve 47a and turns on (opens) the second regulating valve 47b (S133), sets the rotation speed of the compressor 41 to 2,000 rpm (S134), and drives the compressor 41 (S135). As a result, the refrigerant is sent out to the second refrigerant pipe 46 (the refrigerant is not sent out to the first refrigerant pipe 45). After that, the microcomputer 81 checks whether or not determination 2 is satisfied (S138).

In a case where the elapsed time of the timer exceeds 300 seconds in S124 (Yes in S124), the microcomputer 81 assigns 1 to the flag (S136), resets the timer (S137), and checks whether determination 2 is satisfied (S138).

In a case where the flag is 1 in S123 (Yes in S123) and the elapsed time of the timer has not exceeded 450 seconds that is an example of a first predetermined time (No in S144), the microcomputer 81 reads set temperatures of the first accommodation chamber 9 and the second accommodation chamber 10 (S145), and reads output signals from the first thermistor 55 and the second thermistor 56 (the current temperatures of the first accommodation chamber 9 and the second accommodation chamber 10) (S146).

In a case where the current temperature of the first accommodation chamber 9 is lower than the set temperature (Yes in S147) and in a case where the current temperature of the second accommodation chamber 10 is lower than the set temperature (Yes in S148), the microcomputer 81 stops the compressor 41 (S149). In a case where the current temperature of the first accommodation chamber 9 is lower than the set temperature—2° C. (Yes in S150), the microcomputer 81 drives the first heating part 51 (S151), and in other cases (No in S150), stops the first heating part 51 (S152). The microcomputer 81 assigns 0 to the flag (S156), resets the timer (S157), and checks whether or not determination 2 is satisfied (S138).

In a case where the temperature of the second accommodation chamber 10 is not lower than the set temperature in S148 (No in S148), the microcomputer 81 assigns 0 to the flag (S156), resets the timer (S157), and checks whether determination 2 is satisfied (S138).

In a case where the current temperature of the first accommodation chamber 9 is not lower than the set temperature in S147 (No in S147), the microcomputer 81 turns on (opens) the first regulating valve 47a and turns off (closes) the second regulating valve 47b (S153), sets the rotation speed of the compressor 41 to 2,000 rpm (S154), and drives the compressor 41 (S155). As a result, the refrigerant is sent output to the first refrigerant pipe 45 (the refrigerant is not sent out to the second refrigerant pipe 46). After that, the microcomputer 81 checks whether or not determination 2 is satisfied (S138).

In a case where the elapsed time of the timer exceeds 450 seconds in S144 (Yes in S144), the microcomputer 81 assigns 0 to the flag (S156), resets the timer (S157), and checks whether determination 2 is satisfied (S138).

In a case where determination 2 is satisfied (Yes in S138), the microcomputer 81 returns to S123, and in a case where determination 2 is no longer satisfied (No in S138), ends the alternating operation mode and returns to S51 in FIG. 49.

In the second pattern of the alternating operation mode, the rotation speed of the compressor 41 in a case of cooling the first accommodation chamber 9 may be set to 2,500 rpm, the rotation speed of the compressor 41 in a case of cooling the second accommodation chamber 10 may be set to 2,000 rpm, and one cooling time may be the same in a case of cooling either the first accommodation chamber 9 or the second accommodation chamber 10. The pattern changed as described above is a third pattern of the alternating operation mode.

FIG. 55 is a graph illustrating temporal changes in temperatures of the first accommodation chamber 9 and the second accommodation chamber 10 and a rotation speed of the compressor 41 in a case where set temperatures of both the first accommodation chamber 9 and the second accommodation chamber 10 are −18° C., and an operation associated with transition from the simultaneous operation mode to the third pattern of the alternating operation mode is performed in the two-room mode. At 0 minutes, the temperatures of both the first accommodation chamber 9 and the second accommodation chamber 10 are 30° C. The microcomputer 81 is in the simultaneous operation mode in a period from 0 minutes to 20 minutes, sets the rotation speed of the compressor 41 to 3,000 rpm, and simultaneously cools the first accommodation chamber 9 and the second accommodation chamber 10. The microcomputer 81 transitions to the alternating operation mode when the temperature of the second accommodation chamber that is a small room becomes lower than 0° C. at 20 minutes. In the alternating operation mode, the microcomputer 81 starts cooling the first accommodation chamber 9 (large room) of which the temperature is high, and then switches cooling target rooms every 300 seconds. As a result, the temperatures of the first accommodation chamber 9 and the second accommodation chamber 10 approach the set temperature of −18° C. The microcomputer 81 sets the rotation speed of the compressor 41 to 2,500 rpm when cooling only the first accommodation chamber 9 and to 2,000 rpm when cooling only the second accommodation chamber 10.

In FIG. 55, the cooling of the second accommodation chamber 10 is stopped at 20 minutes, but the temperature drop of the second accommodation chamber 10 continues until about 22 minutes. This is due to heat exchange between the low-temperature refrigerant remaining in the second refrigerant pipe 46 and the second accommodation chamber 10. Similarly, even in a case where the cooling of the first accommodation chamber 9 is stopped, the temperature drop of the first accommodation chamber 9 continues for several minutes. As described above, even if the cooling of one room is stopped, the temperature drop of the one room continues for several minutes after the cooling is stopped. The same applies to FIGS. 56 and 57 as well.

FIG. 56 is a graph illustrating temporal changes in temperature of the first accommodation chamber 9 and the second accommodation chamber 10 and a rotation speed of the compressor 41 in a case where set temperatures of both the first accommodation chamber 9 and the second accommodation chamber 10 are −18° C., and an operation associated with transition from the simultaneous operation mode to the second pattern of the alternating operation mode is performed in the two-room mode. At 0 minutes, the temperatures of both the first accommodation chamber 9 and the second accommodation chamber 10 are 25° C. The microcomputer 81 is in the simultaneous operation mode in a period from 0 minutes to 15 minutes, sets the rotation speed of the compressor 41 to 3,000 rpm, and simultaneously cools the first accommodation chamber 9 and the second accommodation chamber 10. The microcomputer 81 transitions to the alternating operation mode when the temperatures of the first accommodation chamber 9 and the second accommodation chamber 10 become lower than 0° C. at 15 minutes. In the alternating operation mode, the microcomputer 81 starts cooling the second accommodation chamber 10, sets one cooling time to 300 seconds for the second accommodation chamber 10 and to 450 seconds for the first accommodation chamber 9, and switches cooling target rooms. As a result, the temperatures of the first accommodation chamber 9 and the second accommodation chamber 10 approach the set temperature of −18° C. The microcomputer 81 sets the rotation speed of the compressor 41 to 2,000 rpm both when cooling only the first accommodation chamber 9 and when cooling only the second accommodation chamber 10.

FIG. 57 is a graph illustrating temporal changes in temperature of the first accommodation chamber 9 and the second accommodation chamber 10 and a rotation speed of the compressor 41 in a case where a set temperature of the first accommodation chamber 9 is −18° C., a set temperature of the second accommodation chamber 10 is −5° C., and an operation associated with transition from the simultaneous operation mode to further another pattern of the alternating operation mode is performed in the two-room mode. At 0 minutes, the temperatures of both the first accommodation chamber 9 and the second accommodation chamber 10 are 25° C. The microcomputer 81 is in the simultaneous operation mode in a period from 0 minutes to 20 minutes, sets the rotation speed of the compressor 41 to 3,000 rpm, and simultaneously cools the first accommodation chamber 9 and the second accommodation chamber 10. The microcomputer 81 transitions to the alternating operation mode when the temperature of the second accommodation chamber 10 that is a small room becomes lower than the set temperature (−5° C.) at 20 minutes. In the alternating operation mode, the microcomputer 81 first cools only the first accommodation chamber 9, and if the temperature of the second accommodation chamber 10 exceeds the set temperature+2° C., switches to cooling only the second accommodation chamber 10. If the temperature of the second accommodation chamber 10 becomes lower than the set temperature, the microcomputer 81 switches to cooling only the first accommodation chamber 9. If the temperature of the first accommodation chamber 9 reaches the set temperature while only the first accommodation chamber 9 is being cooled, the microcomputer 81 stops cooling the first accommodation chamber 9, and if the temperature of the second accommodation chamber 10 does not exceed the set temperature+2° C., does not cool the second accommodation chamber 10 (stops the compressor 41). If the temperature of the second accommodation chamber 10 exceeds the set temperature+2° C., the microcomputer 81 cools only the second accommodation chamber 10. The microcomputer 81 sets the rotation speed of the compressor 41 to 2,500 rpm when cooling only the first accommodation chamber 9 and to 2,000 rpm when cooling only the second accommodation chamber 10.

By executing the alternating operation mode as described above, the electric device 1 can make temperatures of the first accommodation chamber 9 and the second accommodation chamber 10 reliably reach set temperatures and control temperatures of the first accommodation chamber 9 and the second accommodation chamber 10 with high accuracy even if there are dimensional errors in diameters of the first refrigerant pipe 45 and the second refrigerant pipe 46, a length difference caused by a difference in a structure in which the first refrigerant pipe 45 and the second refrigerant pipe 46 are laid, or dimensional errors of the two systems of capillaries connected to the first refrigerant pipe and the second refrigerant pipe 46.

FIG. 58 is a graph illustrating temporal changes in temperatures of the first accommodation chamber 9 and the second accommodation chamber 10 and a rotation speed of the compressor 41 in a case where a set temperature of the first accommodation chamber 9 is 60° C., a set temperature of the second accommodation chamber 10 is 30° C., and cooling of the second accommodation chamber 10 using the compressor 41 is stopped by controlling a temperature of the second accommodation chamber 10 in the two-room mode.

FIG. 59 is a graph illustrating temporal changes in temperatures of the first accommodation chamber 9 and the second accommodation chamber 10 and a rotation speed of the compressor 41 in a case where a set temperature of the first accommodation chamber 9 is 60° C., a set temperature of the second accommodation chamber 10 is 30° C., and cooling of the second accommodation chamber 10 using the compressor 41 is stopped by controlling a time from the start of the cooling in the two-room mode.

In both FIGS. 58 and 59, the microcomputer 81 controls to keep the temperature of the second accommodation chamber 10 at 30° C. by cooling the second accommodation chamber 10 when the temperature of the second accommodation chamber 10 is approaching 60° C. over a set temperature of 30° C. under the influence of the temperature of the first accommodation chamber 9 being 60° C.

In the case of FIG. 58, in a case where the temperature of the second accommodation chamber 10 exceeds 32° C. (30° C. +2° C.), cooling of only the second accommodation chamber 10 is started, and if the temperature of the second accommodation chamber 10 reaches 28° C. (30° C.−2° C.) while only the second accommodation chamber 10 is being cooled, the cooling of the second accommodation chamber 10 is stopped (the compressor 41 is stopped). However, even if cooling of the second accommodation chamber 10 is stopped as described above, since the temperature of the second accommodation chamber 10 continues to drop for several minutes, the second heating part 52 is driven due to the temperature drop of the second accommodation chamber 10 with respect to the set temperature. Therefore, cooling and heating of the second accommodation chamber 10 are repeated, which is not preferable in terms of power consumption.

In the case of FIG. 59, in a case where the temperature of the second accommodation chamber 10 exceeds 32° C. (30° C. +2° C.), cooling of only the second accommodation chamber 10 is started and stopped continuously for one minute (predetermined time). By restricting the time for cooling only the second accommodation chamber 10, it is possible to prevent the second accommodation chamber 10 from being too cold with respect to the set temperature, to reduce the driving of the second heating part 52, and thus to reduce power consumption.

FIG. 60 is a flowchart illustrating an operation in a two-room mode in which time control is added to the two-room mode in FIG. 45. The time control is to intermittently operate the compressor 41 in a case where the number of cooling target room is one and a set temperature of the room exceeds a predetermined temperature. Hereinafter, processes added to FIG. 45 will be mainly described. In FIG. 60, 20° C. is an example of normal temperature. An outside air temperature may be used instead of 20° C.

In a case where the current temperature of the first accommodation chamber 9 is higher than the set temperature+2° C. (Yes in S53) and the current temperature of the second accommodation chamber 10 is not higher than the set temperature+2° C. (No in S54), if the set temperature of the first accommodation chamber 9 is higher than 20° C. (Yes in S541), the microcomputer 81 sets the rotation speed of the compressor 41 to 2,500 rpm (S542), turns on (opens) the first regulating valve 47a and turns off (closes) the second regulating valve 47b (S543), drives the compressor 41 for a designated time (S544), stops the compressor 41 for a designated time (S545), and returns to S51. In a case where the set temperature of the first accommodation chamber 9 is equal to or lower than 20° C. in S541 (No in S541), the microcomputer 81 proceeds to S58 in FIG. 45.

In a case where the current temperature of the first accommodation chamber 9 is lower than the set temperature—2° C. (Yes in S61) and the current temperature of the second accommodation chamber 10 is higher than the set temperature+2° C. (Yes in S62), if the set temperature of the second accommodation chamber 10 is higher than 20° C. (Yes in S621), the microcomputer 81 sets the rotation speed of the compressor 41 to 2,000 rpm (S622), turns off (closes) the first regulating valve 47a and turns on (opens) the second regulating valve 47b (S623), drives the compressor 41 for a designated time (S624), drives the first heating part 51 and stops the second heating part 52 (S625), stops the compressor 41 for a designated time (S626), and returns to S51. In a case where the set temperature of the second accommodation chamber 10 is equal to or lower than 20° C. in S621 (No in S621), the microcomputer 81 proceeds to S63 in FIG. 45.

In a case where the current temperature of the first accommodation chamber 9 is not higher than the set temperature+2° C. and not lower than the set temperature—2° C. (No in S53 and No in S61), and the current temperature of the second accommodation chamber is higher than 20° C. (Yes in S701), if the set temperature of the second accommodation chamber 10 is higher than 20° C. (Yes in S701), the microcomputer 81 sets the rotation speed of the compressor 41 to 2,000 rpm (S702), turns off (closes) the first regulating valve 47a and turns on (opens) the second regulating valve 47b (S703), drives the compressor 41 for a designated time (S704), stops the compressor 41 for a designated time (S705), and returns to S51. In a case where the set temperature of the second accommodation chamber 10 is equal to or lower than 20° C. in S701 (No in S701), the microcomputer 81 proceeds to S71 in FIG. 45.

(A) of FIG. 61 is a waveform diagram of a drive current for the compressor 41 before and after an operation is resumed in a case where an operation of the compressor 41 is performed, stopped for one minute, and then resumed. (B) of FIG. 61 is a waveform diagram of a drive current for the compressor 41 before and after an operation is resumed in a case where an operation of the compressor 41 is performed, stopped for two minutes, and then resumed. As illustrated in (A) of FIG. 61, in a case where the compressor 41 is stopped for one minute, a starting current for the compressor 41 at the time of resuming an operation is as large as 12.2 A. In contrast, as illustrated in (B) of FIG. 61, in a case where the stop time of the compressor 41 is two minutes, the starting current for the compressor 41 is relatively suppressed to 5.2 A when the operation is resumed. Therefore, it is desirable that a designated time for stopping the compressor 41 in S545, S626, and S705 in FIG. 60 is two minutes or longer.

FIG. 62 is a graph illustrating temporal changes in temperatures of the first accommodation chamber 9 and the second accommodation chamber 10 and a rotation speed of the compressor 41 in a case where a set temperature of the first accommodation chamber 9 is 60° C., a set temperature of the second accommodation chamber 10 is 30° C., and cooling of the second accommodation chamber 10 using the compressor 41 is performed by repeatedly performing an operation for one minute and stoppage for two minutes in the two-room mode. At 0 minutes, temperatures of both the first accommodation chamber 9 and the second accommodation chamber 10 are 60° C. From here, the microcomputer 81 controls to decrease the temperature of the second accommodation chamber 10 to 30° C. by cooling the second accommodation chamber 10 when the temperature of the second accommodation chamber 10 is difficult to decrease due to the influence of the temperature of the first accommodation chamber 9 being 60° C. In this case, by repeating an operation for one minute and stoppage for two minutes, a starting current for the compressor 41 can be suppressed, and the temperature drop of the second accommodation chamber 10 can be slowed down to prevent the second accommodation chamber 10 from being too cold with respect to the set temperature. Therefore, it is possible to reduce the driving of the second heating part 52 and reduce power consumption. After the temperature of the second accommodation chamber 10 reaches the set temperature, as in FIG. 59, control to start cooling only the second accommodation chamber 10 if the temperature of the second accommodation chamber 10 exceeds 32° C. (30° C. +2° C.) and continuously stop the second accommodation chamber 10 for one minute is repeatedly performed.

As illustrated in FIGS. 63 to 66, the electric device 1 has a storage unit (additional part) 200 that can be attached to and detached from the right side surface. The main frame 11 has a groove part 36 as a first engaged part on the right side part. The right outer box 13 has a pair of projection parts (protrusions) 37 as second engaged parts on both front and rear ends of the lower right side surface. The groove part 36 and the projection parts 37 are disposed at positions spaced apart from each other, and constitute a locking part for locking the storage unit 200.

As illustrated in FIGS. 68 to 70, the storage unit 200 includes a bag 201, a belt 221, a hook part 222 as a first engaging part, a pair of hook-and-loop fasteners 224, and a pair of ring parts 226 as a second engaging part, and four buttons 230. The belt 221 is, for example, three nylon belts (nylon bands) sewn together to form an H shape. The hook part 222 is made of resin, for example, and provided to bridge a pair of upper ends of the belt 221. Specifically, the upper end of the belt 221 is passed through a through-hole of the hook part 222, folded back, and sewn. The hook-and-loop fasteners 224 are provided (sewn) on the left and right parts of the belt 221, respectively. The ring parts 226 are elastic rings (rubber rings), for example, and are provided at a pair of lower ends of the belt 221, respectively. Specifically, the lower end of the belt 221 is passed through the ring part 226, folded back, and sewn. The four buttons 230 are provided on the belt 221 and are located above and below each of the pair of hook-and-loop fasteners 224.

As illustrated in FIG. 70, the bag 201 has a storage part 202, a grip part 203, hook-and-loop fasteners 204 to 206, cloth parts 208 and 209, and four buttons 210. The storage part 202 is made of cloth, for example, has a fastener-type opening and closing mechanism, and has a size capable of storing the partition plate 70 as illustrated in (A) of FIG. 67. The storage part 201 may be replaced with a larger storage part 201A as illustrated in (D) of FIG. 67. As illustrated in FIG. 70, the grip part 203 for carrying is made of the same material as the belt 221, for example, and is provided on the upper surface of the storage part 202. A pair of hook-and-loop fasteners 204 are provided (sewn) on the back surface of the storage part 202. The four buttons 210 are provided on the back surface of the storage part 202 and are located above and below each of the pair of hook-and-loop fasteners 204. The hook-and-loop fastener 205 and the cloth part 208 are provided (sewn) on the rear surface of the storage part 202. The cloth part 208 continues below the hook-and-loop fastener 205. The cloth part 209 continues below the cloth part 208. The hook-and-loop fastener 206 continues below the cloth part 209.

In a case where the bag 201 is attached to the belt 221, the pair of hook-and-loop fasteners 204 of the bag 201 and the pair of hook-and-loop fasteners 224 provided on the belt 221 are brought into surface contact with each other and detachably coupled (adhered) to each other. The four buttons 210 of the bag 201 and the four buttons 230 provided on the belt 221 are detachably coupled to each other. The laterally extending portion of the belt 221 is sandwiched between the cloth parts 208 and 209 and folded back at a boundary line between the cloth parts 208 and 209, so that the hook-and-loop fasteners 205 and 206 are brought into surface contact with each other and are detachably coupled (adhered) to each other.

In a case where the storage unit 200 is attached to the electric device 1, the hook part 222 is engaged (hooked) with the groove part 36 and the ring part 226 is engaged (hooked) with the projection part 37 as illustrated in FIG. 63 in a state in which the second lid 7 is open as illustrated in FIG. 4. A separation distance between the groove part 36 and the projection part 37, a vertical length of the belt 221, and a diameter of the ring part 226 have a dimensional relationship in which the ring part 226 is hooked on the projection part 37 in a state of being stretched beyond its natural length. Thus, in a case where the storage unit 200 is attached to the electric device 1, tension (tensile force) is applied to the belt 221 in the up-down direction due to the elastic force of the ring part 226. Consequently, the bag 201 is suppressed from wobbling and the bag 201 is stably held.

In a state in which the groove part 36 and the hook part 222 are engaged with each other, the second lid 7 in a closed state prevents the hook part 222 from coming off. This is because, as illustrated in (A) of FIG. 66, a distance L1 from the upper end of the hook part 222 to the portion of the second lid 7 facing the upper end in a in synchronization with the groove part 36 and the hook part 222 engaged is less than a thickness (vertical length) L2 of the hook part 222 (L1<L2). Since the second lid 7 prevents the hook part 222 from coming off, it is possible to suppress separation of the storage unit 200 from the electric device 1 due to vibration or the like.

Since the storage unit 200 is attachable to and detachable from the electric device 1, it is possible to add an accommodation function other than the heat insulation or cold insulation space (the first accommodation chamber 9 and the second accommodation chamber 10), and thus convenience is high. By attaching the storage unit 200 to the electric device 1, small items such as a battery pack and a bottle opener can be stored in place of the bag 201, and thus it is convenient to carry small items that do not require heating or cooling. The detached partition plate 70 can be stored in the bag 201, and thus it is convenient to carry and place the detached partition plate 70.

As illustrated in FIG. 71, in addition to the storage unit 200, accessory cases 231 to 233 and an S-shaped hook 237 are attachable to and detachable from the electric device 1. The second lid 7 has a hooking part (groove part) 91 capable of hooking (locking) the accessory case 231, a hooking part 102 (groove part) capable of hooking (locking) the accessory case 233, and hooking parts (through holes) 93 and 94 capable of hooking (locking) the S-shaped hook 237. The first lid 6 has a hooking part (groove part) 92 capable of hooking (locking) the accessory case 232, and hooking parts (through holes) 95 and 96 capable of hooking (locking) the S-shaped hook 237. The accessory cases 231 to 233 are convenient as temporary storerooms. The S-shaped hook 237 is convenient for hooking small items. Although the accessory case 231 can be hooked on the groove part 36 as illustrated in FIG. 72, the storage unit 200 cannot be attached in this case.

As illustrated in FIGS. 73 and 74, in the electric device 1, a storage unit (additional part) 250 is attachable to and detachable from the movable handle 20. The movable handle 20 has a grip 20a and a bridge part 20b. The storage unit 250 has a bag 251 and two belts 253. Each belt 253 has one end sewn to the bag 251 and extends to surround the bridge part 20b between the belt and the rear surface of the bag 251, and a hook-and-loop fastener 254 provided (sewn) on the other end side of the bag 251 is brought into surface contact with a hook-and-loop fastener (not illustrated) provided (sewn) on the rear surface of the bag 251 and detachably coupled (adhered) to each other. Button-to-button coupling may be used instead of or in addition to hook-and-loop fastener. A finger insertion space 20c is secured between the bag 251 and the grip 20a, and the use of the movable handle 20 is not hindered. The storage unit 250 also achieve the same effects as the storage unit 200 (addition of the accommodation function). The electric device 1 may be equipped with both storage units 200 and 250.

FIGS. 75 to 81 relate to an electric device 1A according to another embodiment of the present invention. The electric device 1A differs from the electric device 1 in that storage units 300, 400, and 500 as additional parts are attachable and detachable. The following description will focus on the differences.

As illustrated in FIGS. 75 and 76, the electric device 1 has the storage unit (additional part) 300 attachable to and detachable from its front surface. The main frame 11 has a pair of groove parts 38 as first engaged parts at both left and right ends of the front side part. The left outer box 12 has a pair of projection parts (protrusions) 39 as second engaged parts on both left and right ends of the lower front surface. The groove part 38 and the projection parts 39 are disposed at positions spaced apart from each other, and constitute a locking part for locking the storage unit 300.

The storage unit 300 has a bag 301, a belt 321, a pair of hook parts 322 as first engaging parts, a pair of hook-and-loop fasteners 324, a pair of ring parts 326 as second engaging parts, and four buttons 330. The belt 321 is, for example, three nylon belts (nylon bands) sewn together to form an H shape. The pair of hook parts 322 are made of resin, for example, and are provided at a pair of upper ends of the belt 321, respectively. Specifically, the upper end of the belt 321 is passed through a through-hole of the hook part 322, folded back, and sewn. The hook-and-loop fasteners 324 are provided (sewn) on the left and right parts of the belt 321, respectively. The ring parts 326 are elastic rings (rubber rings), for example, and are provided at a pair of lower ends of the belt 321, respectively. Specifically, the lower end of the belt 321 is passed through the ring part 326, folded back, and sewn. The four buttons 330 are provided on the belt 321 and are located above and below each of the pair of hook-and-loop fasteners 324.

The bag 301 has the same configuration as that of the bag 201 except that the bag 301 does not have a grip part. However, the bag 301 may have a handle. Attachment of the bag 301 to the belt 321 may be performed in the same manner as attachment of the bag 201 to the belt 221.

Figure 2:
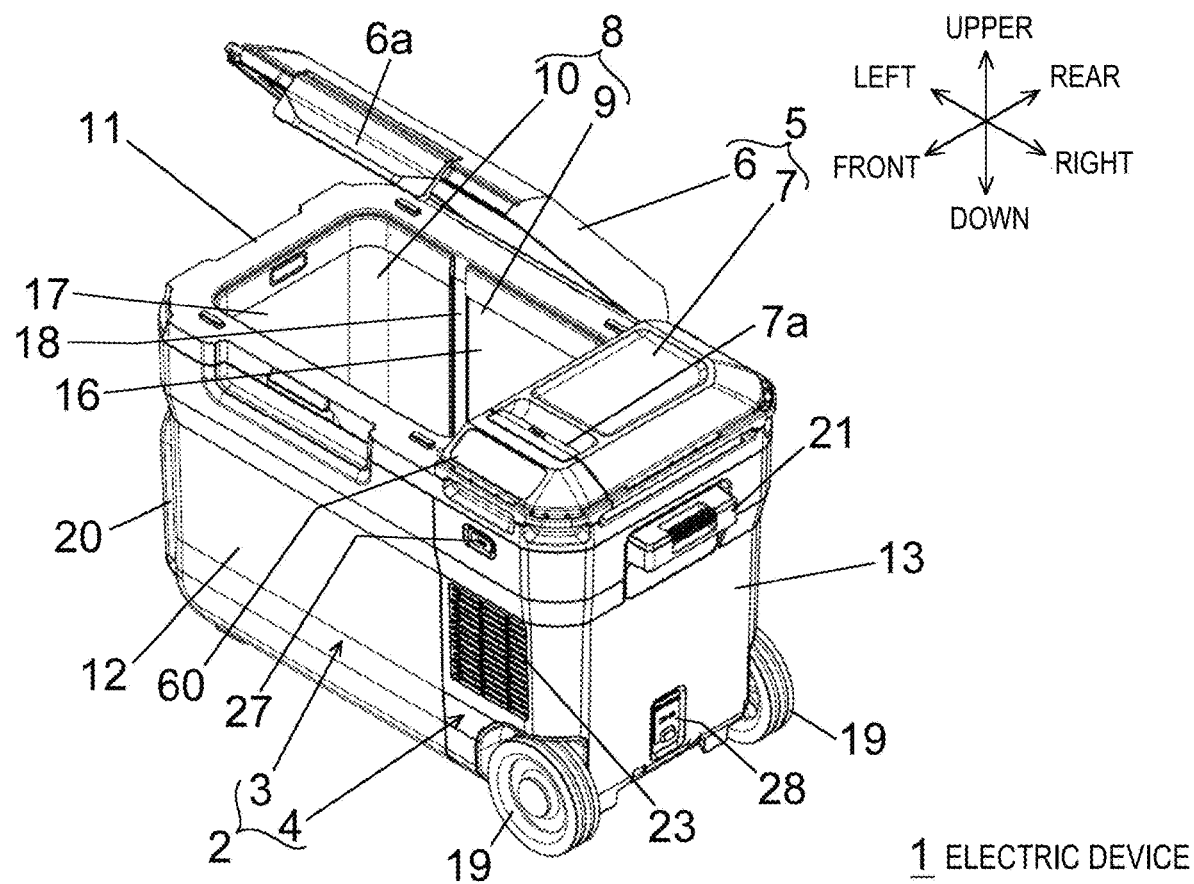
FIG. 2 is a perspective view of the electric device 1 viewed from the front upper right, and is a perspective view illustrating a state in which a partition plate 70 is detached from the state in FIG. 1.

In a case where the storage unit 300 is attached to the electric device 1A, the hook part 322 is engaged (hooked) with the groove part 38 and the ring part 326 is engaged (hooked) with the projection part 39 as illustrated in FIG. 76 in a state in which the first lid 6 is open as illustrated in FIG. 2. A separation distance between the groove part 38 and the projection part 39, a vertical length of the belt 321, and a diameter of the ring part 326 have a dimensional relationship in which the ring part 326 is hooked on the projection part 39 in a state of being stretched beyond its natural length. Thus, in a case where the storage unit 300 is attached to the electric device 1A, tension (tensile force) is applied to the belt 321 in the up-down direction due to the elastic force of the ring part 326. Consequently, the bag 301 is suppressed from wobbling and the bag 301 is stably held.

In a state in which the groove part 38 and the hook part 322 are engaged with each other, the first lid 6 in a closed state prevents the hook part 322 from coming off. This is for the same reason that the second lid 7 in a closed state prevents the hook part 222 from coming off in a state in which the groove part 36 is engaged with the hook part 222 as described above. Since the first lid 6 prevents the hook part 322 from coming off, it is possible to suppress separation of the storage unit 300 from the electric device 1A due to vibration or the like.

Since the storage unit 300 is attachable to and detachable from the electric device 1, it is possible to add an accommodation function other than the heat insulation or cold insulation space (the first accommodation chamber 9 and the second accommodation chamber 10), and thus convenience is high. By attaching the storage unit 300 to the electric device 1A, small items such as a battery pack and a bottle opener can be stored in place of the bag 301, and thus it is convenient to carry small items that do not require heating or cooling. The removed partition plate 70 can be stored in the bag 301, and thus it is convenient to carry and place the detached partition plate 70.

As illustrated in FIGS. 77 and 78, the electric device 1A has the storage unit 200 attachable to and detachable from the right surface, the storage unit 300 attachable to and detachable from the front surface, and the storage unit 400 attachable to and detachable from the rear surface (back surface). Attachment of the storage units 200 and 300 is as described above. The storage unit 400 has the same configuration as that the storage unit 300, and can be attached to the rear surface of the electric device 1A in the same manner as the storage unit 300 attached to the front surface of the electric device 1A. The main frame 11 also has a pair of groove parts 38 as first engaged parts on the rear side part. The groove part 38 is engaged with a hook part (first engaging part) 422 of the storage unit 400. The left outer box 12 also has a pair of projection parts (protrusions) 39 as second engaged parts on both left and right ends of the lower rear surface. The projection part 39 is engaged with a ring part (second engaging part) 426 of the storage unit 400.

The belt 221 of the storage unit 200 and the belt 321 of the storage unit 300 are connected to each other via a connection part 240. The belt 221 of the storage unit 200 and the belt 421 of the storage unit 400 are connected to each other via a connection part 241. That is, the storage units 200, 300, and 400 are connected to each other via the connection parts 240 and 241. However, the connection parts 240 and 241 may be omitted, and the storage units 200, 300 and 400 may be separated from each other.

As illustrated in FIGS. 79 to 81, the electric device 1A has a storage unit 500 attachable to and detachable from its upper surface. The first lid 6 has a pair of downward facing groove parts 97 as first engaged parts at both left and right ends of the front side part, and downward facing groove parts 98 as second engaged parts at the center of the rear side part. The groove parts 97 and 98 are disposed at positions spaced apart from each other and constitute locking parts for locking the storage unit 500.

The storage unit 500 has a bag 501, a belt 521, hook parts 522, a hook-and-loop fastener 524, and buttons 530. The hook parts 522 are respectively provided at the front end of the bifurcated belt 521 and the rear end of the belt 521. The hook part 522 on the front side is hooked on the groove part 97. The hook part 522 on the rear side is hooked on the groove part 98. The hook-and-loop fastener 524 and the buttons 530 are provided on the belt 521 for attachment of the bag 501. The bag 501 has hook-and-loop fasteners and buttons (not illustrated) corresponding to the hook-and-loop fastener 524 and buttons 530 on the rear surface. The storage unit 500 also achieve the same effects as the storage unit 200 (addition of the accommodation function).

The second lid 7 has a downward facing groove part 99 as a first engaged part on the front side part, and a pair of downward facing groove parts 100 as second engaged parts at both left and right ends of the rear side part. Although not illustrated, a storage unit having a configuration similar to the storage unit 500 is attachable to and detachable from the electric device 1A by using the groove parts 99 and 100.

FIG. 82 is a perspective view of an electric device 1B according to still another embodiment of the present invention. The following description will focus on differences from the electric device 1. The electric device 1B has groove parts 101 as first engaged parts at both left and right ends of the front side part of the first lid 6. The left outer box 12 has a pair of projection parts (protrusions) 39 as second engaged parts at both left and right ends of the lower front surface.

A belt 621 is, for example, three nylon belts (nylon bands) sewn together to form an H shape. A pair of hook parts 622 are made of resin, for example, and are provided at the pair of upper ends of the belt 621, respectively. Specifically, the upper end of the belt 621 is passed through a through-hole of the hook part 622, folded back, and sewn. Hook-and-loop fasteners 624 are provided (sewn) on the left and right parts of the belt 621, respectively. Ring parts 626 are elastic rings (rubber rings), for example, and are provided at a pair of lower ends of the belt 621, respectively. Specifically, the lower end of the belt 621 is passed through the ring part 626, folded back, and sewn. Four buttons 630 are provided on the belt 621 and located at the top and bottom of the pair of hook-and-loop fasteners 624. A bag (not illustrated) having the same configuration as that of the bag 301 in FIG. 75 can be attached to the belt 621, and can constitute a storage unit.

In a case where this storage unit is attached to the electric device 1B, the hook part 622 is engaged (hooked) with the groove part 101 and the ring part 626 is engaged (hooked) with the projection part 39 in a state in which the first lid 6 is closed. A separation distance between the groove part 101 and the projection part 39, a vertical length of the belt 621, and a diameter of the ring part 626 have a dimensional relationship in which the ring part 626 is hooked on the projection part 39 in a state of being stretched beyond its natural length, and thus tension (tensile force) is applied to the belt 621 in the up-down direction due to the elastic force of the ring part 626. As a result, a bag (not illustrated) attached to the belt 621 is suppressed from wobbling, and the bag is stably held. The belt 621 prevents the first lid 6 from being unintentionally opened due to overturning, vibration, or the like of the electric device 1B.

FIG. 83 is a perspective view of the inside of the electric device 1 in a state in which the accommodation chamber 8 is divided into three by using the partition plates 70a and 70b (three-room mode), viewed from the front upper right. Here, a flow path of a refrigerant will be described. A structure and control other than the flow path of the refrigerant are basically as described above. A refrigerant flowing out of the compressor 41 flows into the regulating valve 703 via the condenser 42. The regulating valve 703 is connected to the first refrigerant pipe 45 as a first cooling part, the second refrigerant pipe 46 as a second cooling part, and the fifth refrigerant pipe 701 as a fifth cooling part. The refrigerant that has flowed into the regulating valve 703 flows out to three flow paths at most. That is, the refrigerant that has flowed into the regulating valve 703 through one flow path is divided into a maximum of three flow paths (the first refrigerant pipe 45, the second refrigerant pipe 46, and the fifth refrigerant pipe 701) and flows out. The regulating valve 703 includes a third regulating valve capable of controlling the flow of the first refrigerant pipe 45, a fourth regulating valve capable of controlling a flow in the second refrigerant pipe 46, and a fifth regulating valve capable of controlling a flow in the fifth refrigerant pipe 701 inside thereof. Each of these regulating valves can switch between an open state and a closed state in response to a signal from the microcomputer 81, and can control whether or not the refrigerant flows through each refrigerant pipe by switching between the open state and the closed state. Specific details of the control are as described above.

The first refrigerant pipe 45 is provided on at least the side surface of the first accommodation chamber 9 as described above, and cools the first accommodation chamber 9. The second refrigerant pipe 46 is provided on at least the side surface of the second accommodation chamber 10 as described above, and cools the second accommodation chamber 10. The fifth refrigerant pipe 701 is provided on the side surface and the bottom surface of the third accommodation chamber 704 to cool the third accommodation chamber 704. The first refrigerant pipe 45, the second refrigerant pipe 46, and the fifth refrigerant pipe 701 are independent of each other. That is, the first refrigerant pipe 45 is provided to mainly cool the first accommodation chamber 9, the second refrigerant pipe 46 is provided to mainly cool the second accommodation chamber 10, and the fifth refrigerant pipe 701 is provided to cool the third accommodation chamber 704.

Since the first refrigerant pipe 45 and the second refrigerant pipe 46 extend in the same manner as in FIG. 13, a description thereof will be omitted. The fifth refrigerant pipe 701 extends along a rear-side member 706 from the upper end to the lower end of the rear surface of the rear-side member 706. The fifth refrigerant pipe 701 extends toward a front-side member 705 while being folded back on a bottom-side member (not illustrated) left and right after repeating reciprocation of being folded back on the rear side surface of the rear-side member 706 left and right six times. The fifth refrigerant pipe 701 that reaches the front-side member 705 extends from the lower end toward the upper end while being folded back left and right on the front-side member 705. The fifth refrigerant pipe 701 extending from the lower end to the upper end on the front-side member 705 is connected to the regulating valve 702. The regulating valve 702 is connected such that the first refrigerant pipe 45, the second refrigerant pipe 46 and the fifth refrigerant pipe 703 are merged. The refrigerant merged at the regulating valve 702 is discharged from one refrigerant pipe 44 and flows into the compressor 41. As described above, by disposing the three refrigerant pipes to extend independently to the three accommodation chambers, it is possible to independently control each of the accommodation chambers in a case where it is desired to use the three-room mode.

Although the present invention has been described above by using the embodiments as examples, it will be understood by those skilled in the art that various modifications can be made to each constituent and each processing process of the embodiments within the scope of the claims. Modification examples will be described below.

The first accommodation chamber 9 and the second accommodation chamber 10 may have the same size. The first refrigerant pipe 45 and the second refrigerant pipe 46 may be separate from the right-side member 16 and the left-side member 17. Instead of a configuration in which, in the setting part 60, by pressing the execution button 67, set temperatures of the first accommodation chamber 9 and the second accommodation chamber 10 are determined and an operation is started, a configuration in which set temperatures are determined and an operation is started even if the execution button 67 is not pressed may be employed. For example, a configuration may be employed in which set temperatures are determined and an operation is started in a case where three seconds (predetermined time) have elapsed since the right room temperature setting button 62 or the left room temperature setting button 63 was last pressed. In this case, the execution button 67 may be omitted.

Materials of the belt, the bag, the hook part, the ring part, and the like in the storage unit may be changed as appropriate. In the embodiments of attaching and detaching the storage unit, instead of the cooling mechanism 40 using the compressor 41, another cooling mechanism such as a Peltier element may be provided.

A connectable number of battery packs, a rated output voltage of a battery pack, a voltage of the DC power supply 90, various times, various threshold values, and the like, which are exemplified as specific numerical values in the embodiments, do not limit the scope of the invention, and may be changed freely according to required specifications.

REFERENCE SIGNS LIST 1, 1A, 1B Electric device
2 Main body
3 First body part
4 Second body part
5 Lid
6 First lid
6a Grip part
7 Second lid
7a Grip part
8 Accommodation chamber (accommodation part)
8a Bottom surface
9 First accommodation chamber (first accommodation part)
9a First side surface
9b Second side surface
10 Second accommodation chamber (Second accommodation part)
10a First side surface
10b Second side surface
11 Main frame
11b Boss
11c, 11d Opening
12 Left outer box
12a Boss
13 Right outer box
15 Bottom member
16 Right-side member
16a Outwardly bent part
17 Left-side member
17a Outwardly bent part
18 Rail member
18a Notch
18b Recessed part
18c, 18d Groove part
19 Caster
20 Movable handle (carry handle)
20a Grip 20b Bridge part
20c Finger insertion space
21 grip part
22 Battery pack accommodation chamber
22a Battery pack attachment part
23 Intake port
24 Exhaust port
25 First hinge mechanism
26 Second hinge mechanism
27 USB terminal
28 Power input terminal (in-vehicle power supply connection part)
29 Battery pack
30 Battery box
30a Boss
30b Drain hole
31 Battery terminal
32 Branch part
33 First air passage
34 Second air passage
35 Leg
36 Groove part (first engaged part)
37 Projection part (second engaged part)
38 Groove part (first engaged part)
39 Projection part (second engaged part)
40 Cooling mechanism
41 Compressor (cooler)
42 Condenser
43 Capillary tube
44 Refrigerant pipe
44a Branch part
45 First refrigerant pipe (first cooling part)
45a Gas reservoir
46 Second refrigerant pipe (second cooling part)
46a Gas reservoir
47 Regulating valve
47a First regulating valve
47b Second regulating valve
48 Compressor drive circuit
49 Fan
50 Heating mechanism
51 First heating part
52 Second heating part
55 First thermistor (first temperature sensor)
56 Second thermistor (second temperature sensor)
57 First holder
58 Second holder
60 Setting part
61 Display part
61a Battery state display part
61b External power supply connection display part
61c USB device power display part
61d Error display part
61e Right room temperature display part
61f Left room temperature display part
62 Right room temperature setting button
63 Left room temperature setting button
64 Mode switching button (room switching button)
65 Power button
66 USB device energization switching button
67 Execution button
70 Partition plate
71 Upper partition plate
72 Lower partition plate
73 Mating part
74 Heat insulating material
79 Accommodation object
80 Control circuit board
81 Microcomputer (operation control part)
82 Microcomputer (charging control part)
83 Control power supply
84 Rotation speed setting circuit
85 Shunt resistor
86a, 86b Battery voltage detection circuit
86c DC power supply voltage detection circuit
87 Regulating valve
88 Charging circuit
89 Shunt resistor
90 DC power supply
91 to 96 Hooking part
97 to 101 Groove part
102 Hooking part
147a First regulating valve
147b Second regulating valve
170 Partition plate
171 Upper partition plate
172 Lower Partition plate
173 Mating part
174 Heat insulating material
175 Hinge mechanism
200 Storage unit (additional part)
201, 201A Bag
202 Storage part
203 Grip part
204 to 206 Hook-and-loop fastener
208, 209 Cloth part
210 Button
221 Belt
222 Hook part (first engaging part)
224 Hook-and-loop fastener
226 Ring part (second engaging part)
230 Button
231 to 233 Accessory case
237 S-shaped hook
240, 241 Connection part
250 Storage unit (additional part)
251 Bag
253 Belt
254 Hook-and-loop fastener
300 Storage unit (additional part)
301 Bag
321 Belt
322 Hook part (first engaging part)
324 Hook-and-loop fastener
326 Ring part (second engaging part)
330 Button
400 Storage unit (additional part)
401 Bag
421 Belt
422 Hook part (first engaging part)
426 Ring part (second engaging part)
500 Storage unit (additional part)
501 Bag
521 Belt
522 Hook part
524 Hook-and-loop fastener
530 Button
621 Belt
622 Hook part
624 Hook-and-loop fastener
630 Button

The invention claimed is:

1. An electric device comprising:
a main body, having a first accommodation chamber and a second accommodation chamber;
a lid, capable of being opened and closed with respect to the main body;
a cooling mechanism that cools the first accommodation chamber and the second accommodation chamber;
a control part that includes a microcomputer, which controls the cooling mechanism; and
a setting part that includes a setting button, which allows a user to individually make set temperatures of the first accommodation chamber and the second accommodation chamber be set between a highest set temperature and a lowest set temperature respectively, wherein
the control part is configured to set the set temperatures based on an operation of the setting part and control a set temperature difference between the set temperature of the first accommodation chamber and the set temperature of the second accommodation chamber to be within a predetermined value, wherein the user performs an operation to set the set temperature of the first accommodation chamber in the setting part, and when an operation is performed to cause the set temperature difference to exceed a predetermined value, the set temperature of the first accommodation chamber is not changed even if the operation is performed.

2. The electric device according to claim 1, further comprising:
a display part that is controlled by the control part and individually displays the set temperatures of the first accommodation chamber and the second accommodation chamber, wherein
the control part does not display the set temperature at which the set temperature difference exceeds the predetermined value, even if an operation is performed on the setting part such that the set temperature difference exceeds the predetermined value.

3. The electric device according to claim 1, further comprising:
a heating mechanism that heats the first accommodation chamber and the second accommodation chamber;
wherein the control part is configured to control the heating mechanism.

4. The electric device according to claim 1, further comprising:
a partition plate, configured to be detachable from the main body, and
the first accommodation chamber and the second accommodation chamber are separated by the partition plate.

5. The electric device according to claim 4, wherein
when the first accommodation chamber and the second accommodation chamber are used as one accommodation chamber without the partition plate, the setting part is configured to allow the user to set the set temperature of the one accommodation chamber between the highest set temperature and the lowest set temperature.

6. The electric device according to claim 5, further comprising:
a display part, controlled by the control part to individually display the set temperatures of the first accommodation chamber and the second accommodation chamber, and to display the set temperature of the one accommodation chamber.

7. An electric device comprising:
a main body, having a first accommodation chamber and a second accommodation chamber;
a lid, capable of being opened and closed with respect to the main body;
a cooling mechanism that cools the first accommodation chamber and the second accommodation chamber;
a control part that includes a microcomputer, which controls the cooling mechanism; and
a setting part that includes a setting button, which allows a user to individually make set temperatures of the first accommodation chamber and the second accommodation chamber be set between a highest set temperature and a lowest set temperature respectively, wherein
the control part is configured to set the set temperatures based on an operation of the setting part and control a set temperature difference between the set temperature of the first accommodation chamber and the set temperature of the second accommodation chamber to be within a predetermined value, wherein the user performs an operation to set the set temperature of the first accommodation chamber in the setting part, and when an operation is performed to cause the set temperature difference to exceed a predetermined value, along with the operation, the set temperature of the first accommodation chamber is set, and the set temperature of the second accommodation chamber is automatically changed.

8. The electric device according to claim 7, wherein further comprising:
a display part that is controlled by the control part and individually displays the set temperatures of the first accommodation chamber and the second accommodation chamber, wherein
the control part is configured to be operated by the user to set the set temperature of the first accommodation chamber to the setting part, when an operation is performed such that the set temperature difference exceeds the predetermined value, in accordance with the operation, a set temperature display of the first accommodation chamber is switched, and a set temperature display of the second accommodation chamber is automatically switched.

9. The electric device according to claim 7, further comprising:
a heating mechanism that heats the first accommodation chamber and the second accommodation chamber;
wherein the control part is configured to control the heating mechanism.

10. The electric device according to claim 7, further comprising:
a partition plate, configured to be detachable from the main body, and
the first accommodation chamber and the second accommodation chamber are separated by the partition plate.

11. The electric device according to claim 7, further comprising:
a display part that is controlled by the control part and individually displays the set temperatures of the first accommodation chamber and the second accommodation chamber, wherein
the control part does not display the set temperature at which the set temperature difference exceeds the predetermined value, even if an operation is performed on the setting part such that the set temperature difference exceeds the predetermined value.

12. The electric device according to claim 10, wherein
when the first accommodation chamber and the second accommodation chamber are used as one accommodation chamber without the partition plate, the setting part is configured to allow the user to set the set temperature of the one accommodation chamber between the highest set temperature and the lowest set temperature.

13. The electric device according to claim 12, wherein a display part, controlled by the control part to individually display the set temperatures of the first accommodation chamber and the second accommodation chamber, and to display the set temperature of the one accommodation chamber.

\* \* \* \* \*